(12) United States Patent
Sancricca et al.

(10) Patent No.: US 12,361,368 B2
(45) Date of Patent: Jul. 15, 2025

(54) SYSTEM FOR INTERNATIONAL GOODS AND COMMODITIES TRADING AND MANAGEMENT AND RELATED METHODS

(71) Applicant: Secro, Inc., Wilmington, DE (US)

(72) Inventors: Michele Sancricca, Charleston, SC (US); Piotr Cichocki, Szczecin (PL); Luke Francis Zadkovich, London (GB); Edward William Floyd, New York, NY (US)

(73) Assignee: SECRO, INC., Wilmington, DE (US)

( * ) Notice: Subject to any disclaimer, the term of this patent is extended or adjusted under 35 U.S.C. 154(b) by 467 days.

(21) Appl. No.: 17/744,289

(22) Filed: May 13, 2022

(65) Prior Publication Data

US 2023/0368122 A1    Nov. 16, 2023

(51) Int. Cl.
*G06Q 10/0831* (2023.01)
*G06Q 20/02* (2012.01)
(Continued)

(52) U.S. Cl.
CPC ....... *G06Q 10/0831* (2013.01); *G06Q 20/027* (2013.01); *G06Q 20/38215* (2013.01);
(Continued)

(58) Field of Classification Search
USPC .......................................................... 705/71
See application file for complete search history.

(56) References Cited

U.S. PATENT DOCUMENTS 7,835,971 B2   11/2010   Stockton et al.
8,688,461 B1    4/2014   Richards et al.
(Continued)

FOREIGN PATENT DOCUMENTS

CN   111179082 A   5/2020
CN   111475521 A   7/2020
(Continued)

OTHER PUBLICATIONS

K. Narayanam et al. "Blockchain Based e-Invoicing Platform for Global Trade," 2020 IEEE International Conference on Blockchain (Blockchain), Rhodes, Greece, 2020, pp. 385-392, doi: 10.1109/Blockchain50366.2020.00056. (Year: 2020).*
(Continued)

*Primary Examiner* — Eduardo Castilho
(74) *Attorney, Agent, or Firm* — RPG Law Group; Richard P. Gilly

(57) ABSTRACT

A system and related methods for executing and managing international trades, particularly in goods and commodities, makes use of blockchain- or other security-based architecture. The system architecture is able to be implemented so as to be compliant with regulations and regulatory authority to minimize potential fraud, forgery, or other security breaches which may affect the integrity of the associated trading transactions. The computer-implemented system, programming, and associated methods process data related to all phases of international goods and commodities trades, including drafting, negotiation, and execution of contracts as digitally negotiated instruments or electronic transferable records, as well as electronic bills of lading. The system includes features to limit access, verify and authenticate users, and provides limited access to databases and various templates to facilitate the generation, execution, and management of trading transactions from inception to completion.

12 Claims, 56 Drawing Sheets

(51) Int. Cl.
  *G06Q 20/38* (2012.01)
  *G06Q 20/40* (2012.01)
  *G06Q 30/04* (2012.01)

(52) U.S. Cl.
  CPC ..... *G06Q 20/3825* (2013.01); *G06Q 20/3829* (2013.01); *G06Q 20/4014* (2013.01); *G06Q 20/407* (2013.01); *G06Q 30/04* (2013.01); *G06Q 2220/00* (2013.01)

(56) References Cited

U.S. PATENT DOCUMENTS

| | | | | |
|---|---|---|---|---|
| 10,579,952 | B2* | 3/2020 | Raghavan | G06Q 10/0833 |
| 10,819,504 | B2 | 10/2020 | Shi et al. | |
| 11,004,028 | B2 | 5/2021 | Broveleit | |
| 11,176,550 | B2* | 11/2021 | Vintila | G06Q 40/02 |
| 11,307,775 | B2* | 4/2022 | Fang | G06Q 10/08 |
| 11,347,814 | B2* | 5/2022 | Ruschin | G06Q 10/00 |
| 11,868,998 | B2* | 1/2024 | Bodorik | G06Q 10/00 |
| 2005/0033671 | A1* | 2/2005 | Hahn-Carlson | G06Q 20/40 705/40 |
| 2019/0130394 | A1* | 5/2019 | Stollman | G06Q 20/389 |
| 2019/0139136 | A1 | 5/2019 | Molinari et al. | |
| 2019/0173854 | A1* | 6/2019 | Beck | H04L 67/10 |
| 2019/0303893 | A1 | 10/2019 | Ramasamy et al. | |
| 2019/0363897 | A1* | 11/2019 | Papadimitriou | G06F 21/45 |
| 2020/0076612 | A1* | 3/2020 | Adluri | G06Q 10/10 |
| 2020/0410439 | A1* | 12/2020 | Blackburn | G06Q 20/065 |
| 2021/0004772 | A1 | 1/2021 | Dolan et al. | |
| 2021/0286936 | A1 | 9/2021 | Choudhari | |
| 2022/0335421 | A1* | 10/2022 | Ma | G06Q 20/405 |
| 2023/0231725 | A1* | 7/2023 | Ammar | G06Q 10/083 713/176 |

FOREIGN PATENT DOCUMENTS

| | | | | |
|---|---|---|---|---|
| CN | 112258100 | A | 1/2021 | |
| EP | 3617969 | A1 * | 3/2020 | G06Q 10/08 |
| EP | 3955181 | A1 | 2/2022 | |
| KR | 102158276 | B1 | 9/2020 | |
| TW | 202008245 | A | 1/2020 | |
| WO | WO-0055774 | A2 * | 9/2000 | G06Q 10/0875 |
| WO | 2014158092 | A1 | 10/2014 | |
| WO | WO-2019134780 | A1 * | 7/2019 | G06F 21/64 |
| WO | WO-2020176475 | A1 * | 9/2020 | G06Q 10/08 |

OTHER PUBLICATIONS

Marenković et al. "Blockchain Technology Perspectives in Maritime Industry," 2021 44th International Convention on Information, Communication and Electronic Technology (MIPRO), Opatija, Croatia, 2021, pp. 1414-1419, doi: 10.23919/MIPRO52101.2021.9596776. (Year: 2021).*

G. Hong "Electronic Bill of Lading's Title Transfer in International E-commerce," 2012 Second International Conference on Business Computing and Global Informatization, Shanghai, China, 2012, pp. 354-356, doi: 10.1109/BCGIN.2012.98. (Year: 2012).*

Plomaritou, Evi, and Ioannis Voudouris "The Relationships of Bill of Lading, Charterparty and Other Transport Documents," Journal of Economics, 2019, Management and Trade 24 (6): 1-8. https://doi.org/10.9734/jemt/2019/v24i630182. (Year: 2019).*

T. Chen, Y. Yu and Z. Duan, "Data Access & Sharing Approach for Trade Documentations Based on Blockchain Technology," 2019 3rd International Conference on Electronic Information Technology and Computer Engineering (EITCE), Xiamen, China, 2019, pp. 1732-1736, doi: 10.1109/EITCE47263.2019.9095045. (Year: 2019).*

United Nations "UNCITRAL Model Law on Electronic Transferable Records," retrieved from https://uncitral.un.org/en/library/publications, 2018, United Nations Publication ISBN 978-92-1-133861-4 (Year: 2018).*

F. K. Elmay, K. Salah, R. Jayaraman and I. A. Omar, "Using NFTs and Blockchain for Traceability and Auctioning of Shipping Containers and Cargo in Maritime Industry," in IEEE Access, vol. 10, pp. 124507-124522, 2022, doi: 10.1109/ACCESS.2022.3225000. (Year: 2022).* dcsa.org, "Standard for the Bill of Lading—A roadmap towards eDocumentation," retrieved from https://dcsa.org/wp-content/uploads/2020/12/20201208-DCSA-P4-DCSA-Standard-for-Bill-of-Lading-v1.0-FINAL.pdf, 2020, Internet Archive (Year: 2020).*

T. Li, J. Vos and Z. Erkin, "Decentralized Private Freight Declaration & Tracking with Data Validation," 2022 IEEE International Conference on Pervasive Computing and Communications Workshops and other Affiliated Events, Pisa, Italy,pp. 267-272, doi: 10.1109/PerComWorkshops53856.2022.9767444 (Year: 2022).* wcoomd.org, "Trade Trust: accelerating the digitalization of international trade" retrieved from https://web.archive.org/web/20220309010000/https://mag.wcoomd.org/magazine/wco-news-94/tradetrust-accelerating-the-digitalization-of-international-trade/ on Mar. 9, 2022, WCO News 94 Feb. 2021 (Year: 2021).* wcoomd.org, "Trade digitization on a global scale: how far are we?," rerieved from https://web.archive.org/web/20220302144252/https://mag.wcoomd.org/magazine/wco-news-97-issue-1-2022/trade-digitization/ (Year: 2022).*

IMDA Singapore, "Trade Trust Webinar Episode 1: Overview," transcription and screenshots of video retrieved from https://www.youtube.com/watch?v=NcR1M9NJ-PE, published on Jul. 22, 2020, Youtube.com (Year: 2020).*

Singapore Statutes Online: Electronic Transactions Act, Retrieved from https://web.archive.org/web/20210422120702/https://sso.agc.gov.sg/Act/ETA2010?ViewType=Pdf&_=20210320032845 on Apr. 29, 2021 (Year: 2021).*

The Statutes of the Republic of Singapore Electronic Transactions Act (Chapter 88) Informal Consolidation—version in force from Mar. 19, 2021—Retrieved from https://web.archive.org/web/20210422120702/https://sso.agc.gov.sg/Act/ETA2010?ViewType=Pdf&_=20210320032845 on Apr. 22, 2021 (Year: 2021).*

UK Electronic Trade Documents Act 2023, retrieved from https://www.legislation.gov.uk/ukpga/2023/38/enacted (not prior art, but cited to show a universal fact, i.e. that a claim is indefinite). See MPEP 2124. (Year: 2023).*

Plomaritou et al., "The digitalisation in chartering business: special reference to the role of e-bill of lading in the bulk and liner markets," Journal of Shipping and Trade vol. 7,1, 2022, : 28. doi:10.1186/s41072-022-00129-2 (Year: 2022).*

S. Chiliveri, J. Grandhi, M. Uttam Patil, L. E. P.R. and M. Ethirajan, "ProveDoc: A Blockchain Based Proof of Existence with Proof of Storage," 2019 International Conference on Information Technology (ICIT), Bhubaneswar, India, 2019, pp. 239-244, doi: 10.1109/ICIT48102.2019.00049. (Year: 2019).*

T. Li, J. Vos and Z. Erkin, "Decentralized Private Freight Declaration & Tracking with Data Validation," 2022 IEEE PerCom Workshops, Pisa, Italy, 2022, pp. 267-272, doi: 10.1109/PerComWorkshops538562022.9767444 (Year: 2022).*

R. G.S. and M. Dakshayini, "Block-chain Implementation of Letter of Credit based Trading system in Supply Chain Domain," 2020 International Conference on Mainstreaming Block Chain Implementation (ICOMBI), Bengaluru, India, 2020, pp. 1-5, doi: 10.23919/ICOMBI48604.2020.9203485. (Year: 2020).*

Y.-Y. Chen, H.-C. Lai, J.-L. Huang and M.-J. Hwang, "The Design and Implementation of a Blockchain-Based Logistics Platform for International Trade," 2021 22nd (APNOMS), Tainan, Taiwan, 2021, pp. 234-237, doi: 10.23919/APNOM852696.2021.9562503 (Year: 2021).*

"Matías Aránguiz; Andrea Margheri; Duoqi Xu; Bill Tran, ""International Trade Revolution with Smart Contracts,"" in The Digital Transformation of Logistics: Demystifying Impacts of the Fourth Industrial Revolution , IEEE, 2021, pp.169-184, doi: 10.1002/9781119646495.ch12 " (Year: 2021).*

Chhabra, P. "Collateral Registry, Secured Transactions Law and Practice," World Bank Group. United States of America, 2020 Retrieved from https://coilink.org/20.500.12592/fzszvv on Mar. 18, 2025. COI: 20.500.12592/fzszvv. (Year: 2020).*

(56) References Cited

OTHER PUBLICATIONS

Translation of Foreign Patent WO 2019134780 (Espacenet) (Year: 2019).*
CargoX, CargoX for Transport and Logistics, Feb. 14, 2018, https://cargox.io/solutions/for-transport-and-logistics/.
Wave BL, Wave BL: Digital Document Center, Apr. 13, 2021, https://wavebl.com/.
IBM, TradeLens Container Logistics Solution, 2018, https://www.ibm.com/blockchain/container-logistics?utm_content=SRCWW&p1=Search&p4=43700062919928723&p5=p&gclid=EAlalQobChMI0b3Xkbq_-QIVSOTICh0MQgC3EAAYASAAEgKZuvD_BwE&gclsrc=aw.ds.
Skadden, Arps, Slate, Meagher & Flom, LLP, An Introduction to Smart Contracts and Their Potential and Inherent Limitations, May 26, 2018.
International Search Report, PCT/US23/13621, Feb. 22, 2023.
Digital assets: electronic trade documents—consultation paper summary, Law Commission of the United Kingdom, country of publication: United Kingdom, https://lawcom.gov.uk/project/electronic-trade-documents, dated Apr. 30, 2021, 15 pages.
Electronic trade documents—Responses to consultation, Submitted to Law Commission Consultation on Electronic Trade Documents, country of publication: United Kingdom, Submitted date May 12, 2021, 480 pages.
Digital assets: electronic trade documents—a consultation paper 254, Law Commission of the United Kingdom, country of publication: United Kingdom, dated Apr. 30, 2021, 197 pages.
Electronic trade documents: Report and Bill, Law Com No. 405, HC 1188, Presented to Parliament pursuant to section 3(2) of the Law Commissions Act 1965, country of publication: United Kingdom, Ordered by the House of Commons to be printed on Mar. 15, 2022, 268 pages.
Electronic Trade Documents: Summary of final report, Law Commission of the United Kingdom, Mar. 16, 2022, country of publication: United Kingdom, 21 pages.
The Statutes of the Republic of Singapore, Bills of Lading Act 1992, 2020 revised edition, prepared and published by "The Law Revision Commission" under the authority of the revised edition of the laws act 1983, 11 pages.
The Statutes of the Republic of Singapore contracts, Rights of Third Parties Act 2001, 2020 revised edition, prepared and published by "The Law Revision Commission" under the authority of the revised edition of the laws act 1983, 13 pages.
Republic of Singapore, Government Gazette Acts Supplement, first published in the Government Gazette, Electronic Edition, on Mar. 12, 2021 at 5 pm, 16 pages.
The Statutes of the Republic of Singapore, Electronic Transactions Act (Chapter 88), (Original Enactment: Act 16 of 2010), revised edition 2011, Dec. 31, 2011, prepared and published by "The Law Revision Commission" under the authority of the revised edition of the laws act (Chapter 275), 46 pages.

* cited by examiner

How to identify a consignment/shipment?

Options to associate to a S&P agreement other children documents and items (such as shipments/consignments)

The contract manager will be able to create and modify as he goes the hierarchical structure so system will be able to perform multiple execution paths of the same contract

| Associations | S&P | Transportation Contract (CP) | Shipment | Consignment | BL |
|---|---|---|---|---|---|
| S&P | | 1 must | | | |
| Transportation Contract (CP) | 1 must | | | | |
| Shipment | 1 must | 1 must | | | |
| Consignment | 1 must | 1 must | 2 must | | 4 must number on BL must equal no. of consignments |
| BL | | | | 3 must | |

FIG. 5B (Continued)

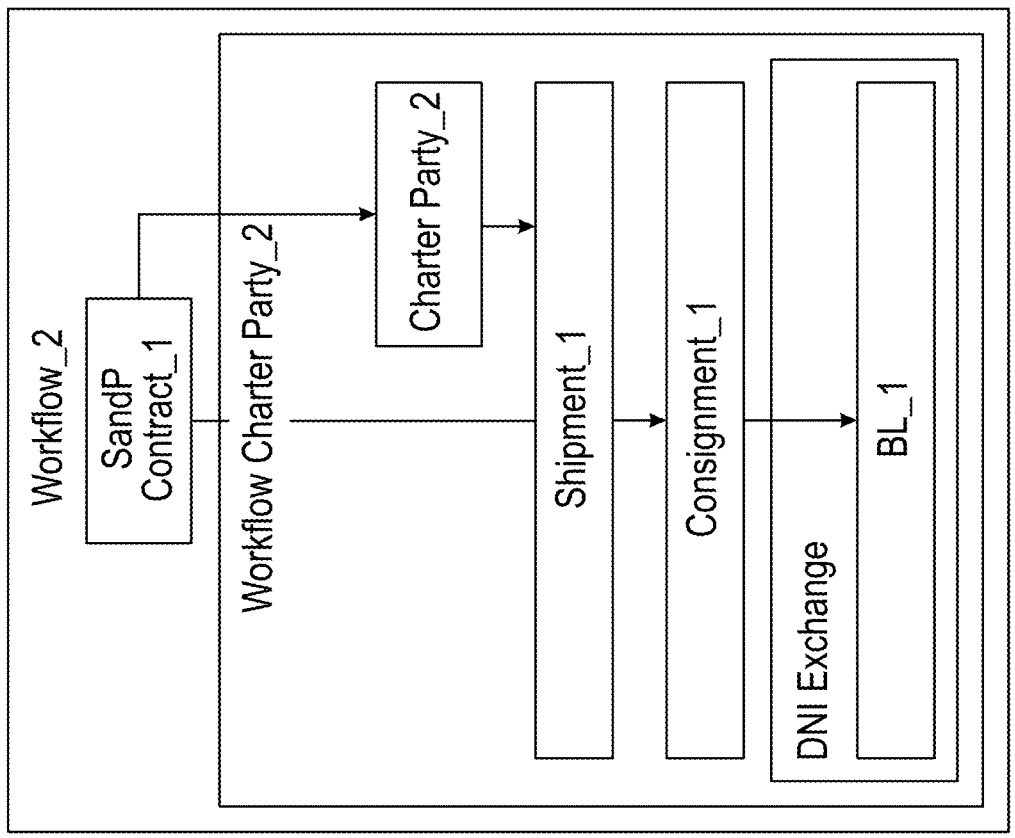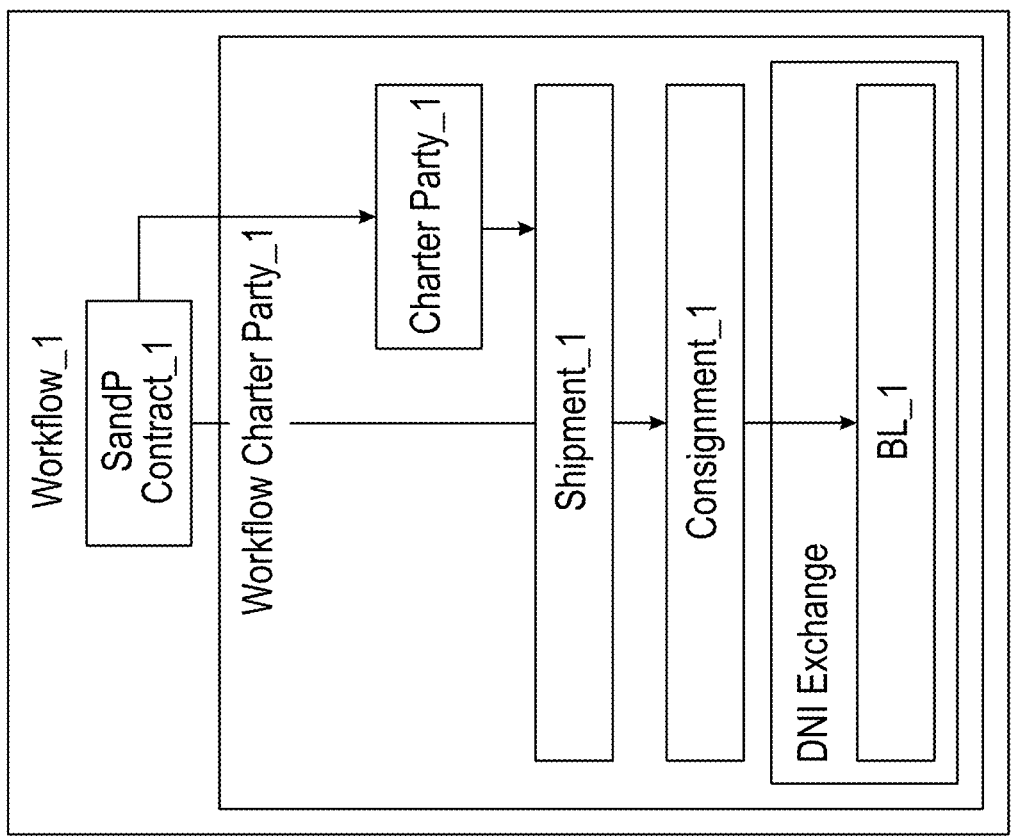
FIG. 6B

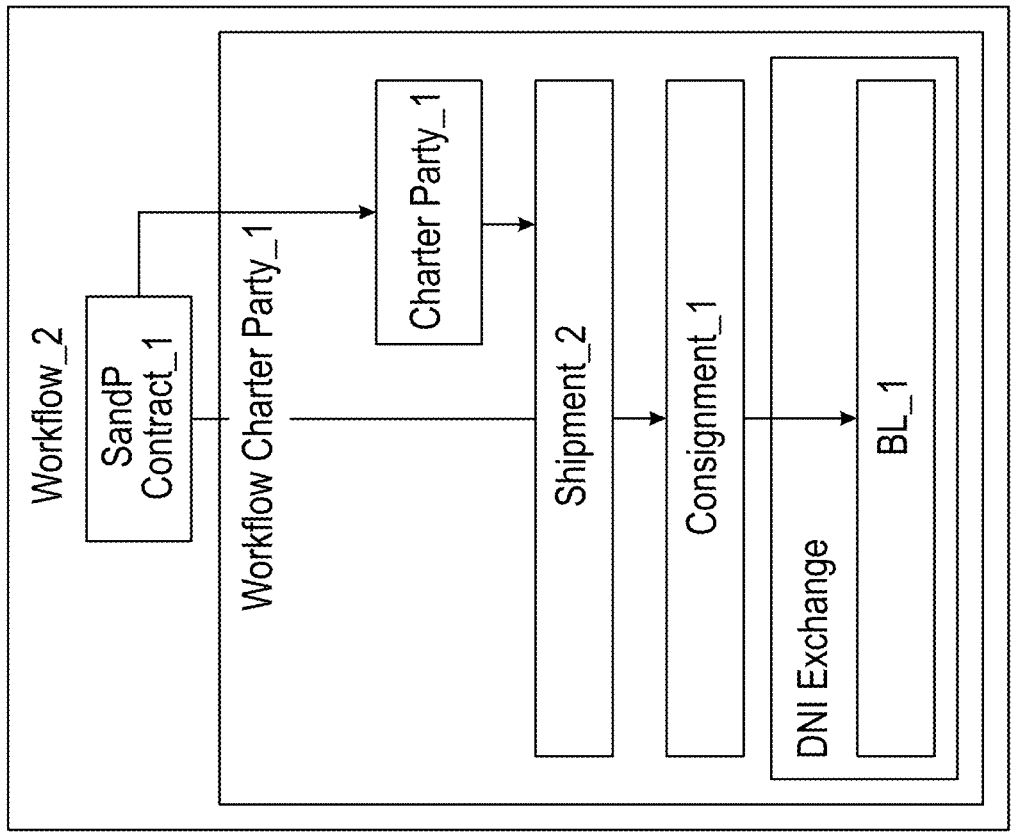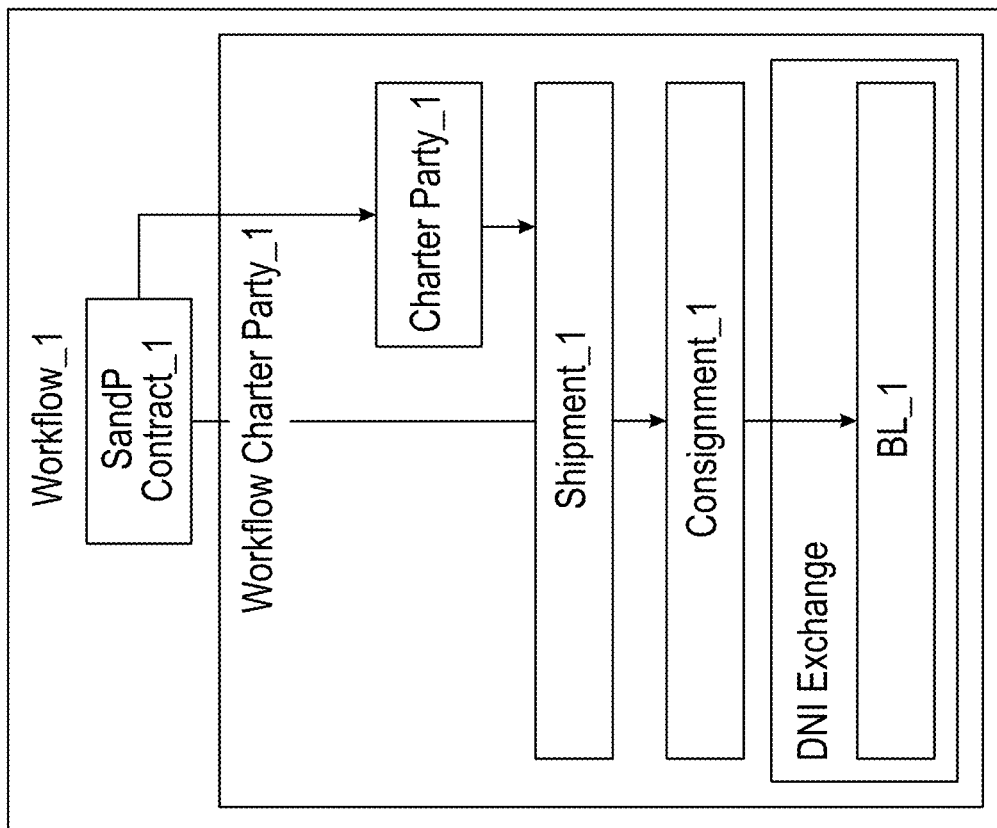
FIG. 6C

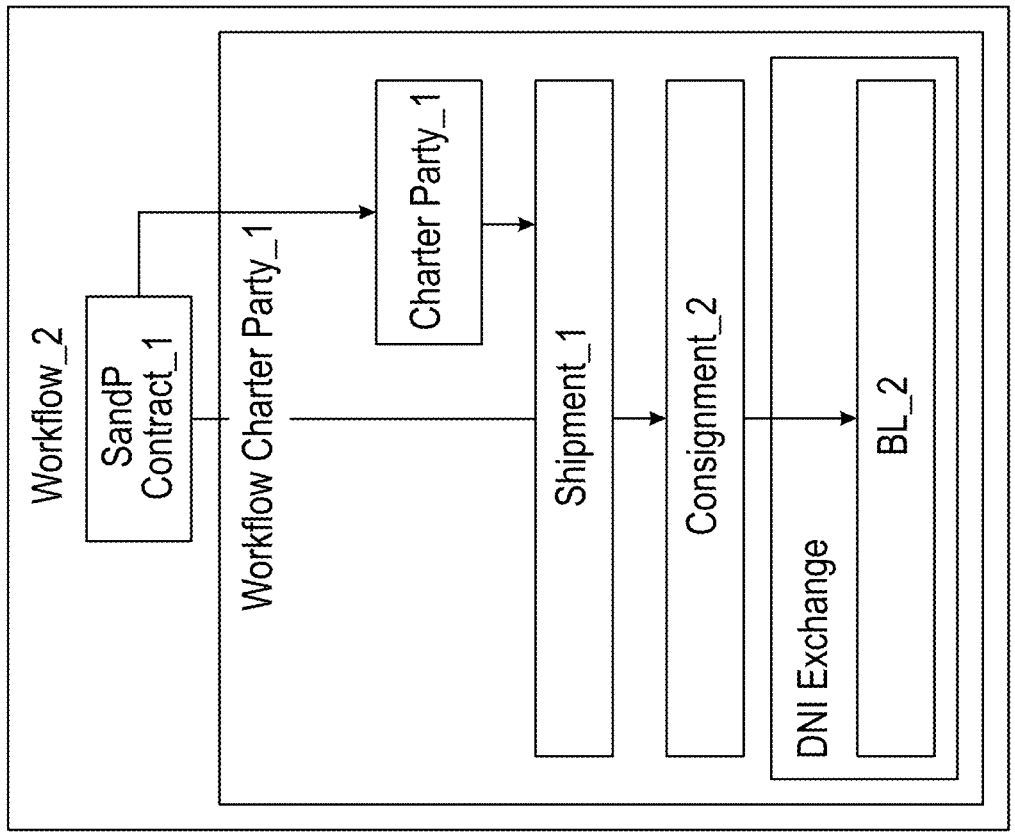
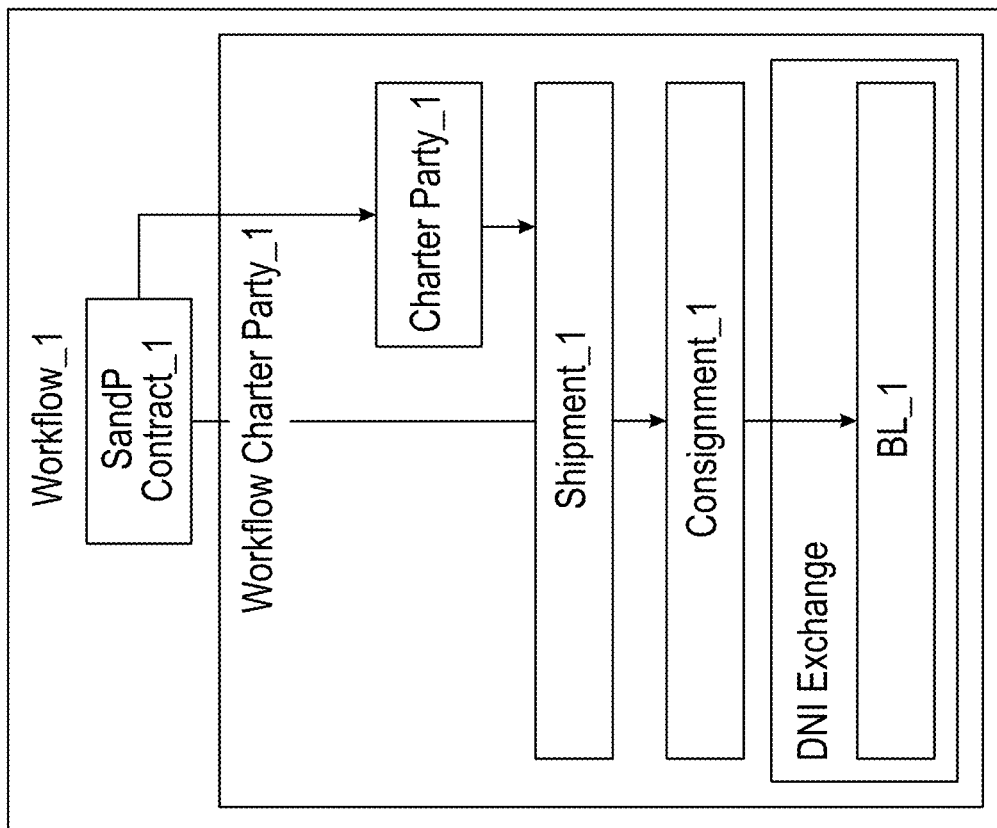
FIG. 6D

TABLE I

| Stage No. | Stage in System DNI process | System Programming Features which meet Digital Trade Laws Requirement(s) (such as the Singapore Electronic Transaction Act, amendments to the Singapore Electronic Transactions Act on 19 March, 2021 and the UK Electronic Trade Documents Act 2022) |
|---|---|---|
| 1. | System platform certification and endorsement – Certification process | The system platform certification and endorsement stage comprises of: -<br>(i) Application for encrypted Corporate Certificate;<br>(ii) Issuance of encrypted Corporate Certificate to system;<br>(iii) Storage of Certificate and PKI keys into cloud-based hardware security module;<br>(iv) Maintaining the validity of the Certificate and renewing every 2 years. |
| 2. | Identification – system customers' onboarding process (applies to carriers, shippers, endorsers) | This stage is to (i) identify the person(s) and (ii) indicate the person(s)' intentions in respect of the information contained in the electronic transferable record.<br>The KYC, KYB, AML and bank account verification are reliable methods that ensure (i) the person(s) are identifiable; (ii) their intentions in respect of the information contained in the electronic transferable record are verified and (ii) any electronic signature provided is a secure one. |
| 3. | Editing – part of system customers' signature process | The Shipper Legal Rep and Carrier Legal Rep are both required to authenticate the relevant signature(s) with two-factor identification ("2FA"), which is a widely adopted verification method that adds an additional layer of security to the authentication process by making it harder for attackers to gain access to the system. |

FIG. 11A

| Stage No. | Stage in System DNI process | System Programming Features which meet Digital Trade Laws Requirement(s) (such as the Singapore Electronic Transaction Act, amendments to the Singapore Electronic Transactions Act on 19 March 2021 and the UK Electronic Trade Documents Act 2022) |
|---|---|---|
|  |  | The Shipper and Carrier also drafts and finalize the DNI at this stage, which would include an indication as to time and place.<br>This is one of the steps leading towards: -<br>(a) Creating an electronic record that contains information that is accessible (meeting the Requirement for writing);<br>(b) Creating an electronic signature that identifies the person and indicates the person's intention in respect of the information contained therein (meeting the Requirement for signature);<br>(c) Creating a DNI draft that provides identification of the electronic transferable record that entitles its holder to request performance of the obligation indicated therein (meeting the Requirement for "singularity");<br>(d) Creating a DNI that identifies the person in control of that record (meeting the Requirement for "control");<br>(e) Preventing unauthorized replication of the DNI (meeting the Requirement for unauthorized replication). |
| 4. | Authentication of the system user – part of system customers' signature process | The DNI draft and signature(s) are submitted to encrypted, for authentication, signing using a User Key and verification.<br>This step provides: -<br>(a) Assurance of data integrity; |

FIG. 11B

| Stage No. | Stage in System DNI process | System Programming Features which meet Digital Trade Laws Requirement(s) (such as the Singapore Electronic Transaction Act, amendments to the Singapore Electronic Transactions Act on 19 March, 2021 and the UK Electronic Trade Documents Act 2022) |
|---|---|---|
| | | (d) A reliable assurance of the link between an electronic signature affixed on the record and the content of the record at the time the electronic signature was affixed;<br>(e) Prevention of unauthorized access to and use of the DNI; and<br>(b) Security of software. |
| 5. | NTrust digital signature process – part of system customers' signature process | A DNI is then issued with a certified Carrier signature |
| 6. | Possession – Storage process (system vault) | At this stage, system returns the signed, certified and validated DNI to the holder. The DNI is stored in the system vault of the holder and encrypted with the public key.<br>The front end of the system vault is a dedicated user interface in the system Application that can be accessed only by specific users belonging to the customer account that is in possession of the DNI; requires 2FA to access; requires written confirmation by the use of any action that is performed.<br>On the back end, the system vault is encrypted, password protected and DNI is stored in customer exclusive object storage located on the system cloud infrastructure (S3 storage).<br>These measures provide a reliable method to establish exclusive control of the DNI and to identify the person in control. |
| 7. | Management process | Endorsement process |

FIG. 11C

| Stage No. | Stage in System DNI process | System Programming Features which meet Digital Trade Laws Requirement(s) (such as the Singapore Electronic Transaction Act, amendments to the Singapore Electronic Transactions Act on 19 March, 2021 and the UK Electronic Trade Documents Act 2022) |
|---|---|---|
| | | See Stage 12 below.<br>Change of possession process (Release, transfer, surrender)<br>The DNI holder selects "transfer possession" on the menu option.<br>Document is decrypted by the holder, who assigns the DNI possession to another party.<br>The DNI is transferred to the system vault of a new holder and encrypted with the new holder public key. Nothing is left in the vault of the previous holder. Previous and new DNI records are kept in the blockchain ledger for auditing purposes.[1]<br>The holder of the DNI is the only one able to decrypt and open the document.<br>The applicable Requirements for writing, signing, transfer documents or instruments, possession or transfer of possession are satisfied by:<br>(a) The information contained in the DNI is accessible.<br>(b) The information required for endorsement is contained in the DNI.<br>(c) The electronic signature identifies the person and indicates intention. |
| | | |

FIG. 11D

[1] We note that there is a change of possession process for external parties not a member of system. Same comments apply.

| Stage No. | Stage in System DNI process | System Programming Features which meet Digital Trade Laws Requirement(s) (such as the Singapore Electronic Transaction Act, amendments to the Singapore Electronic Transactions Act on 19 March, 2021 and the UK Electronic Trade Documents Act 2022) |
|---|---|---|
| | | (d) There is "singularity" and exclusive "control" over the DNI. The integrity of the DNI is maintained.<br>(e) A reliable method is used to establish control of the DNI. The person with exclusive control over the DNI is identified.<br>(f) There is hardware and software security.<br>(g) There is the ability to prevent unauthorized access to and use of the system. |
| 8. | Open network (outside of system infrastructure and software) | The verification process for a non-system user involves (i) creation of account and acceptance of terms; (ii) 2FA identification of external party; (iii) verification of state of DNI, event, claims or transaction. Only the party holding the DNI downloaded (or original) from system will be entitled to verify the document. System Notary only provides evidence of the ownership of the document and timestamp (via document ID). The QR code will be used to verify the authenticity of the content and signature of the document via encrypted verification service. |
| 9. | Verification – Notary (system website page) | The applicable Requirements for signature, transfer of documents or instruments, possession or transfer of possession, satisfied by:<br>(a) The electronic signature identifies the person and indicates intention. |

FIG. 11E

| Stage No. | Stage in System DNI process | System Programming Features which meet Digital Trade Laws Requirement(s) (such as the Singapore Electronic Transaction Act, amendments to the Singapore Electronic Transactions Act on 19 March 2021 and the UK Electronic Trade Documents Act 2022) |
|---|---|---|
|  |  | (b) There is "singularity" and exclusive "control" over the DNI. The integrity of the DNI is maintained.<br>(c) A reliable method is used to establish control of the DNI. The person with exclusive control over the DNI is identified.<br>(d) This is a reliable assurance of the link between an electronic signature affixed on the record and the content of the record at the time the electronic signature was affixed.<br>(e) There is hardware and software security.<br>(f) There is the ability to prevent unauthorized access to and use of the system.<br>(g) The method used for verification is one used by an accredited body i.e. encrypted. |
| 10. | Re-issuing process | The re-issuance of the DNI involves a DNI signature process, cancellation of previous DNI, transfer and endorsement of DNI. The applicable Requirements for writing, signing, transfer documents or instruments, possession or transfer of possession, indorsement, amendment are satisfied by:<br>(a) The information contained in the DNI is accessible.<br>(b) The information required for endorsement is contained in the DNI. |

FIG. 11F

| Stage No. | Stage in System DNI process | System Programming Features which meet Digital Trade Laws Requirement(s) (such as the Singapore Electronic Transaction Act, amendments to the Singapore Electronic Transactions Act on 19 March, 2021 and the UK Electronic Trade Documents Act 2022) |
|---|---|---|
| | | (c) The electronic signature identifies the person and indicates intention.<br>(d) There is "singularity" and exclusive "control" over the DNI. The integrity of the DNI is maintained.<br>(e) A reliable method is used to establish control of the DNI. The person with exclusive control over the DNI is identified.<br>(f) There is a reliable assurance of the link between an electronic signature affixed on the record and the content of the record at the time the electronic signature was affixed.<br>(g) There is hardware and software security.<br>(h) There is the ability to prevent unauthorized access to and use of the system.<br>(i) The amended information (endorsement) is identified as such. |
| 11. | Endorsement process | The endorsement process under the system Application generates a new version of the DNI that has the exact same characteristics of the original one in terms of safety, encryption and PKI signature architecture. The user is prompted to enter endorsement details. System uses the PDF incremental updates function to append the endorsement notation to the existing DNI. In this regard, the holder gives system consent to retrieve the DNI from the vault, decrypt, perform incremental update and send it |

FIG. 11G

| Stage No. | Stage in System DNI process | System Programming Features which meet Digital Trade Laws Requirement(s) (such as the Singapore Electronic Transaction Act, amendments to the Singapore Electronic Transactions Act on 19 March, 2021 and the UK Electronic Trade Documents Act 2022) |
|---|---|---|
| | | to encrypted for signature. A DNI with a digitally signed and encrypted incremental update is issued, with encrypted provided endorser signature. The applicable Requirements are those under Sections for writing, signing, transfer documents or instruments, possession or transfer of possession, indorsement aresatisfied by:<br>(a) The information contained in the DNI is accessible.<br>(b) The information required for endorsement is contained in the DNI.<br>(c) The electronic signature identifies the person and indicates intention.<br>(d) There is "singularity" and exclusive "control" over the DNI. The integrity of the DNI is maintained.<br>(e) The person in control over the DNI is identified.<br>(f) There is a reliable assurance of the link between an electronic signature affixed on the record and the content of the record at the time the electronic signature was affixed.<br>(g) There is hardware and software security.<br>(h) There is the ability to prevent unauthorized access to and use of the system. |
| | | |

FIG. 11H

| Stage No. | Stage in System DNI process | System Programming Features which meet Digital Trade Laws Requirement(s) (such as the Singapore Electronic Transaction Act, amendments to the Singapore Electronic Transactions Act on 19 March, 2021 and the UK Electronic Trade Documents Act 2022) |
|---|---|---|
| | | (i) The amended information (endorsement) is identified as such. |
| 12. | Immutable record keeping | System maintains an immutable, auditable record on blockchain ledger of every action taken by any user and every stage change of the DNI would enable: -<br>(a) The assurance of data integrity;<br>(b) The security of software;<br>(c) The ability to have regular audits by an independent body. |

SYSTEM FOR INTERNATIONAL GOODS AND COMMODITIES TRADING AND
MANAGEMENT AND RELATED METHODS

FIELD

This disclosure relates to computer-implemented systems for managing commercial trading transactions, and, more particularly, to a system and related software platform for facilitating international goods and commodities trading and management, and related methods.

BACKGROUND

Current systems and related methods for managing international goods and commodities trading and management have automated or computerized certain discrete services associated with such trading, such as electronic bills of lading and authentication of credentials related to those involved in such transactions. However, the level of integration across the multiple steps associated with international goods and commodities trading, as well as the ease of use of associated computerized services for discrete aspects of such trading, are insufficiently integrated, not compliant with international norms for sufficient security or other auditable aspects of such trading, or such platforms are otherwise inefficient, not sufficiently secure, or suffer from other drawbacks and disadvantages.

SUMMARY

The computer-implemented system of this disclosure includes suitable programming to accomplish end-to-end integration of trading and transport functions within a controlled, secure, and collaborative environment as set forth herein. Among its program modules are routines related to electronic bills of lading and other trade documents such as sales and purchase agreements, financial guarantees or transportation service agreements, such programming permitting security, revisions, and other management and execution aspects associated with the aforementioned trade documents, and such programming being more efficient, user-friendly, and operating in a regulatory compliant manner.

In one possible implementation of this disclosure, a computer-implemented system and related methods are capable of securely processing electronic transferrable records, such as digital negotiable instruments, such electronic transferrable records associated with exchanging good, commodities, or both. The system includes programming and at least one processor capable of performing the associated steps. Those steps and the associated system programming include generating an encrypted corporate certificate and associated keys in response to system administrator input, storing the corporate certificate in computer-accessible storage, and requiring renewal of the certificate at least every two years from date of generation of the certificate. The system is capable of verifying persons permitted to invoke the processing of the electronic transferrable records by comparing inputted personal information to a security standard, wherein the verifying also includes two-factor authentication. The system is capable of establishing verified persons, the verified persons selected from the group consisting of a holder, a charter party, a shipper, a carrier, and an endorser.

Furthermore, the system is capable of securing electronic signatures of respective ones of the verified persons; generating a respective one of the digital negotiable instruments for a respective goods and commodities transaction in response to inputs from at least one of the shipper and the carrier. In certain implementations, those inputs corresponding to the steps of generating a DNI draft identified with a corresponding one of the electronic transferrable records, establishing a holder of the DNI draft, the holder being one of the verified users, requesting performance of obligations of the DNI draft, wherein generating the DNI draft includes identifying the verified persons authorized to control the associated electronic transferrable record, and preventing unauthorized replication of the DNI draft.

In such implementations, the system is capable of generating an executed DNI from the draft DNI, wherein the executed DNI has an associated encryption and signature key architecture, the executed DNI being generated by encrypting the draft DNI, restricting access to the encrypted DNI by generation of user keys associated with the draft DNI, and verifying signatures of the verified users associated with the draft DNI and the executed DNI;

The system programming is capable of storing the executed DNI in a customer exclusive object storage vault associated with a vault encryption key on S3 system cloud infrastructure, and endorsing the executed DNI in response to user input. As far as the endorsing step, the system programming is capable generating a new version of the executed DNI having the encryption and the signature key architecture identical to the architecture of the executed DNI; receiving as user input digital information corresponding to an endorser; and updating the executed DNI to append an electronic endorsement notation thereto upon execution by the endorser;

The system programming is capable of releasing, transferring, or surrendering of the executed DNI to create a new holder of the executed DNI and a previous holder of the executed DNI. These steps involve decrypting the executed DNI and assigning the executed DNI to the new holder in response to user input from the previous holder, and transferring the executed DNI to a second customer object storage vault corresponding to the new holder and generating a new holder private key associated with the new holder, wherein access to the executed DNI by the previous holder is terminated.

In still further aspects of the system and related methods, suitable programming, when executed, is capable of restricting access by users other than the verified users by preventing verification of the executed DNI by any of the verified users other than the holder. Similarly, system programming is capable of verifying authenticity of the executed DNI by performing notary steps, the notary steps comprising time-stamping of the executed DNI, and authenticating content and signature of the executed DNI by QR code.

In certain implementations of the present disclosure, system programming is capable of reissuing the executed DNI by performing the steps of cancellation of the electronic transferrable record corresponding to the executed DNI to create a cancelled DNI, generating a second draft DNI identical to the cancelled DNI; transferring the draft DNI to a second new holder upon generating a second executed DNI; and maintaining immutability of the electronic transaction records by use of a blockchain ledger recording every processing step done on corresponding ones of the electronic transferrable records.

This disclosure contemplates implementations of the system and related programming which may be certified or otherwise deemed compliant with standards for electronic transferable record handling, such as the Singapore Electronic Transactions Act, as amended in March 2021, or the UK Electronic Trade Documents Act of 2022.

BRIEF DESCRIPTION OF THE DRAWINGS

FIGS. 6A-6E are flow charts showing computer programming subroutines invoked and related to associated events to be managed by a suitable implementation of a system for international trading of goods and commodities and related management thereof;

FIGS. 11A-11I comprise a table setting out programming features of the system shown schematically in FIG. 10.

DETAILED DESCRIPTION

Figure 1:
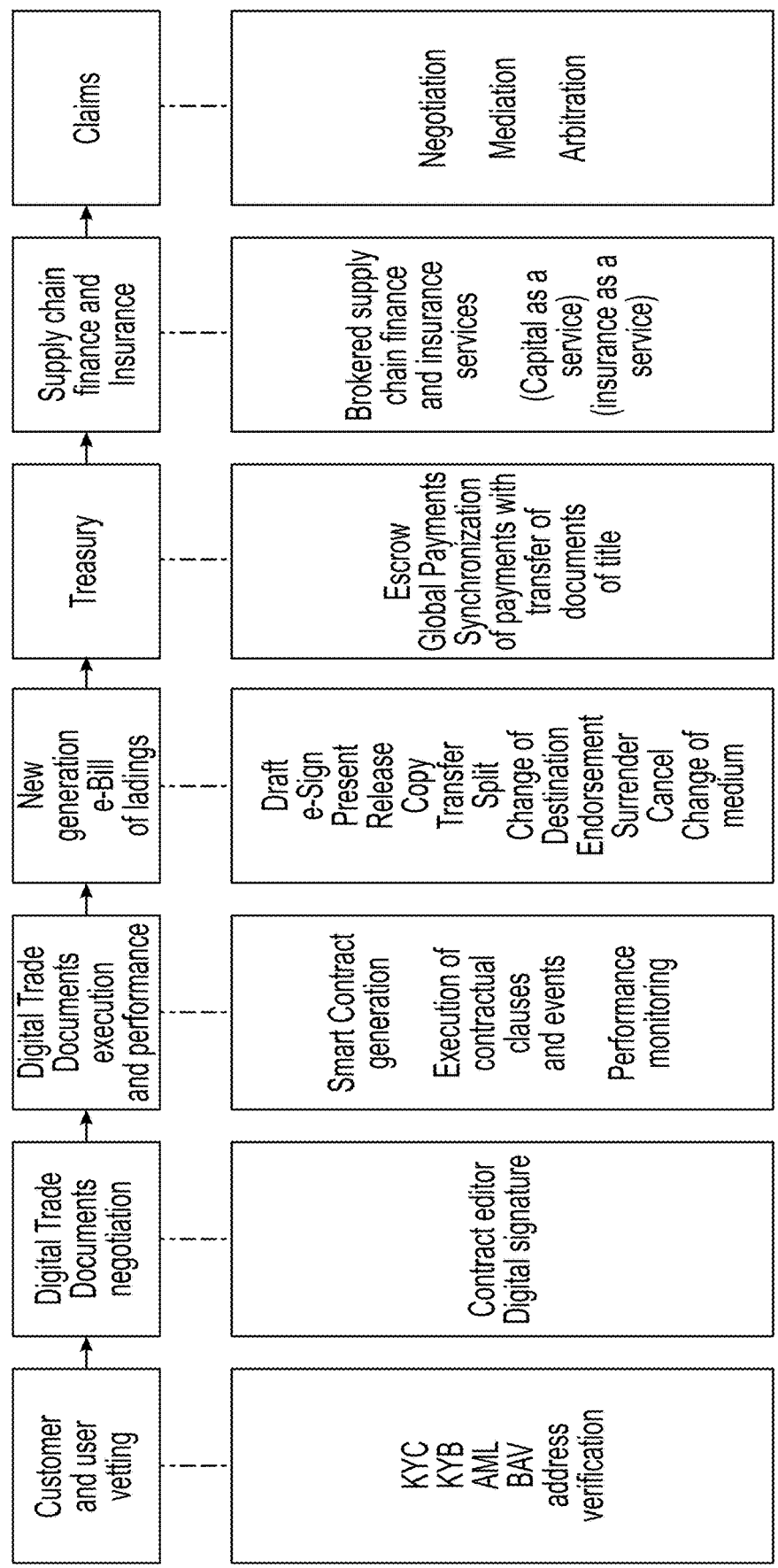
FIG. 1 is an architectural schematic of one potential implementation of a system and related methods for trading international goods and commodities and associated management thereof.

FIG. 1 shows an architectural schematic of one potential implementation of a system 21 for international goods and commodities trading and management.

Computer-implemented system 21 may comprise a suitable software platform which not only includes suitable programming for accomplishing the functions set out in FIG. 1, but integrates such functions through a suitable user interface. Furthermore, in certain implementations, the software platform and its related functional modules may be accessed through a commonly or generally available web browser and associated web applications without the need for end-users to install local software or procure new hardware locally. The user interface provided by system 21 is sufficient to monitor the full life cycle of such users contracts, digital negotiable instruments, and financial transactions which may be related to the goods and commodities being traded and managed by system 21.

Still further, system 21 enables the user to create and execute multiple contracts and digital negotiable instruments across any associated industry related to the goods and commodities to be managed by system 21; in other words, system 21 is industry-agnostic in terms of its trading and management functionalities. As such, in applications involving larger organizations with multiple types of goods and commodities or industry verticals, different departments or teams may benefit from the same functional modules of system 21 in terms of accomplishing workflows for their respective goods and commodities and transactions, as well as interactions with entities outside of the customer organization, such as vendors and those receiving goods and commodities as distributors or end-users of such goods and commodities. In this way, separate workflows from such separate teams within a single organization or across multiple organizations may procure transportation capacity suitable for the particular goods and commodities or industry, as well as related service agreements, agreements relating to the sale and purchase of goods and commodities, as well as asset leasing.

System 21 also includes within its functionality specialized services related to revenues and profitability of users who are sellers or originating sales and trades for goods and commodities under the system 21, increasing such users revenues and profitability. Services acceptable to sellers or other "upstream" users of the system involve arbitration for cross-border claims, supply chain financing, handling of global payments, and related treasury services. Furthermore, the implementations of system 21 and related methods of the present invention apply to transactions in goods or commodities of any type or nature, such as harvested, manufactured or assembled goods; or commodities such as raw materials, bulk materials, waste materials, and the like; therefore, the uses of the terms "goods," or "commodities," or "goods and commodities" herein are intended to relate to either goods and commodities or commodities (disjunctively), or to both (conjunctively), and thus broadly cover any type of freight, cargo, shipments, and the like of any kind or nature; accordingly, disclosed systems and methods are not limited to any particular type of good or commodity, nor to any geographic scope, and can encompass national and international shipments.

Contract Management

FIGS. 2A-2D are flow-chart schematics of one suitable implementation of system 21 making use of blockchain-based architecture for automated "smart" contract and electronic bill of lading management. As shown in FIGS. 2A-2D, contract and electronic bill of lading functionality may inhabit any of four architectural or programming layers of system 21, such as front-end or user layer 223, core system layer 225, and then layers preferably in back-end applications and functionality, such as back-end blockchain layer 227 and DNI layer 229.

Accordingly, with regard to programming for creating contract templates shown in reference block 221, authentication routines 231 are typically accessible from and executable in user layer 223. Associated authentication data and generation of associated keys, as well as creation of the associated contract templates (collectively functionality blocks 233), are associated with the core system layer 225.

The results of the foregoing operations are then transmitted by a suitable gateway 235 to blockchain ledger 237 in the back-end blockchain layer 227. To the extent further authentication or notarization services are required, blockchain ledger 237 may be transmitted from blockchain layer 227 to a suitable system notary service 239 in DNI layer 229.

Figure 2A:
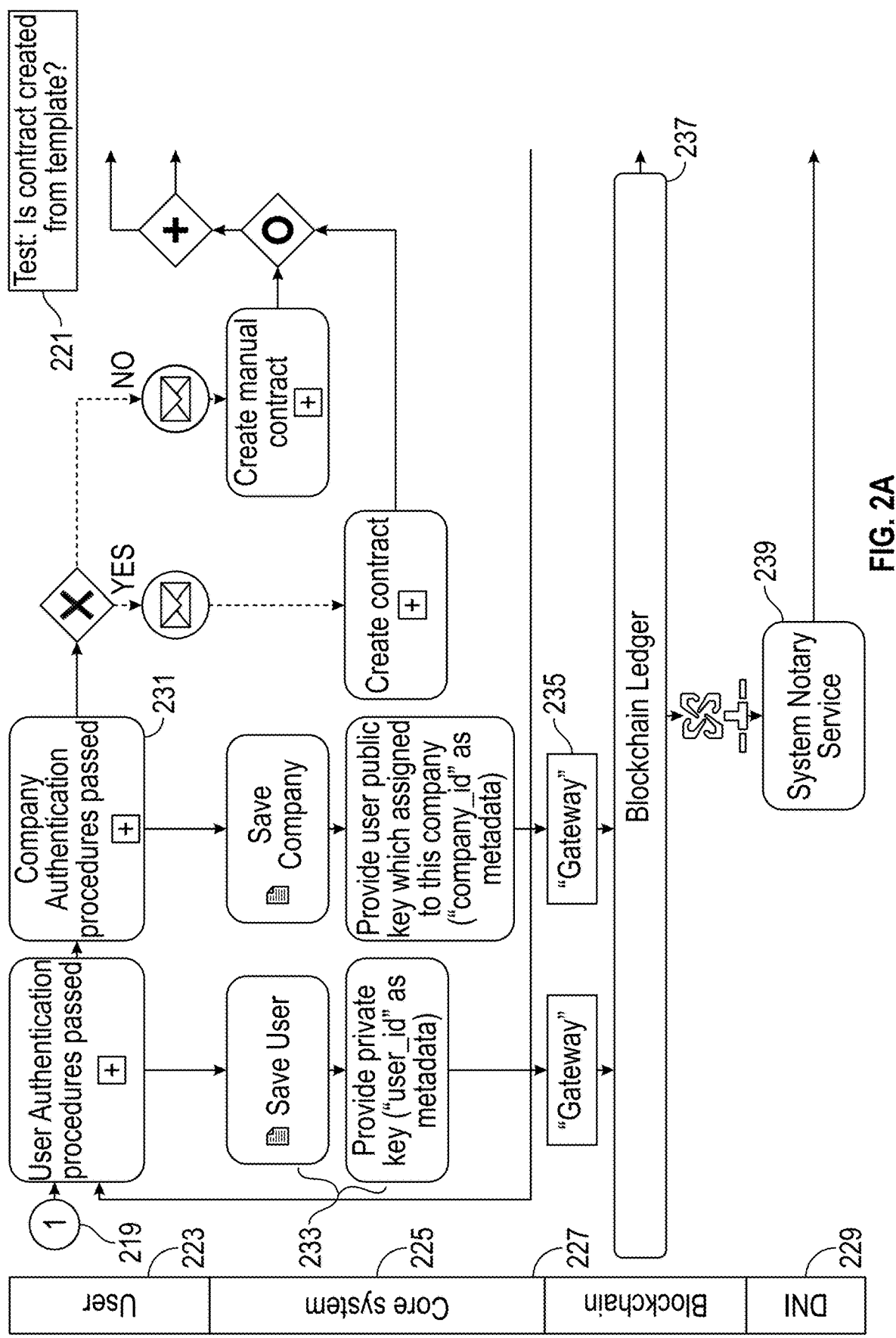
FIGS. 2A-2D are flow-chart schematics of one suitable implementation of the system of FIG. 1, making use of blockchain-based architecture.
Figure 2B:
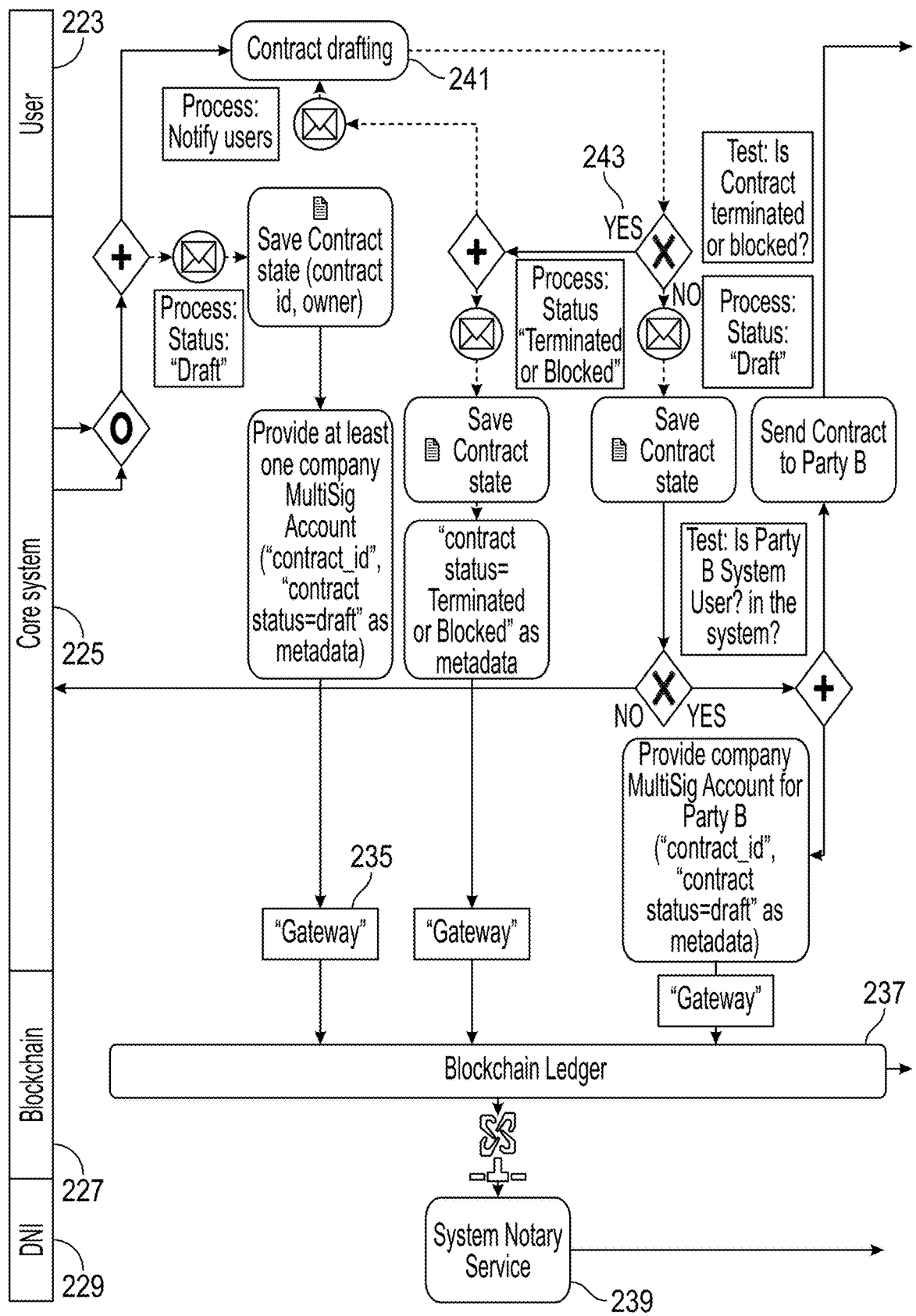

As seen in FIG. 2B, system 21 includes suitable programming to automate contract drafting (block 241), and routines and programming steps are suitably distributed in programming layers starting from front-end user layer 223, and proceeding to further, deeper system layers, such as core system 225, blockchain 227, and DNI layer 229, as discussed previously. In this case, contract drafting functionality and associated security and integrity during such processes may be provided by the foregoing layers and blockchain ledger 237.

For example, various subroutines 243 not only allow drafts of contracts at various points to be saved, but provide security to access such contract drafts to both the drafting party (party A), and the other party to the two-party contract (party B), such authenticated access termed herein "Multi-Sig account." Such MultiSig accounts are associated again with blockchain ledger 237 through suitable gateway 235.

Figure 2C:
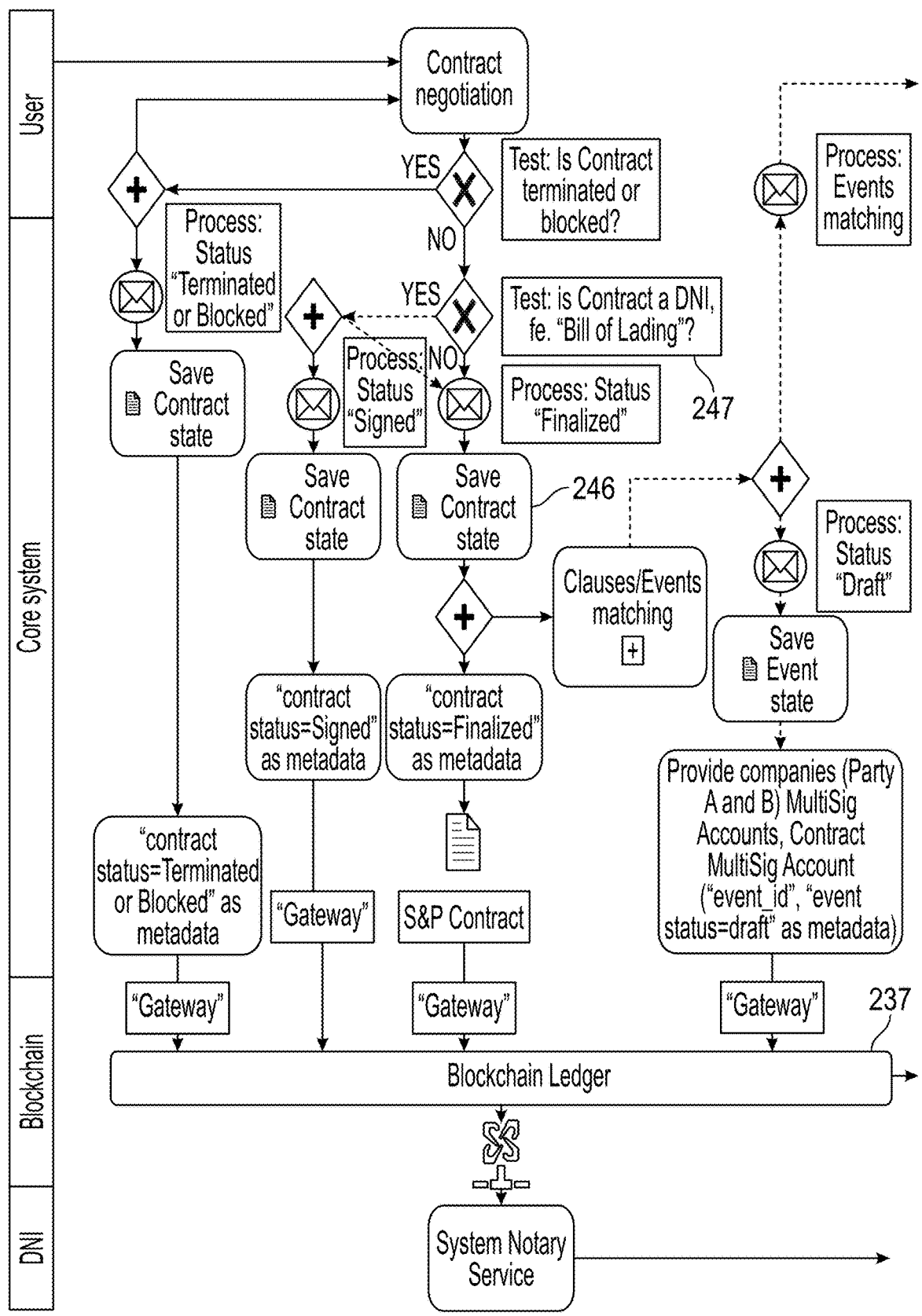

Referring to FIG. 2C, contracts either generated through programming of system 21 or manually uploaded to system 21 may be subject to automated tracking, management, security, and control during contract negotiation (block 245). As indicated by the schematic programming steps, suitable subroutines 247 relate to saving the state of the contracts (blocks 246) and determining whether the contract involves an electronic bill of lading (block 247).

Again, suitable security and controls are provided by recording contract status and contract types, as well as associated clauses and events related to contract negotiation in blockchain ledger 237.

Figure 2D:
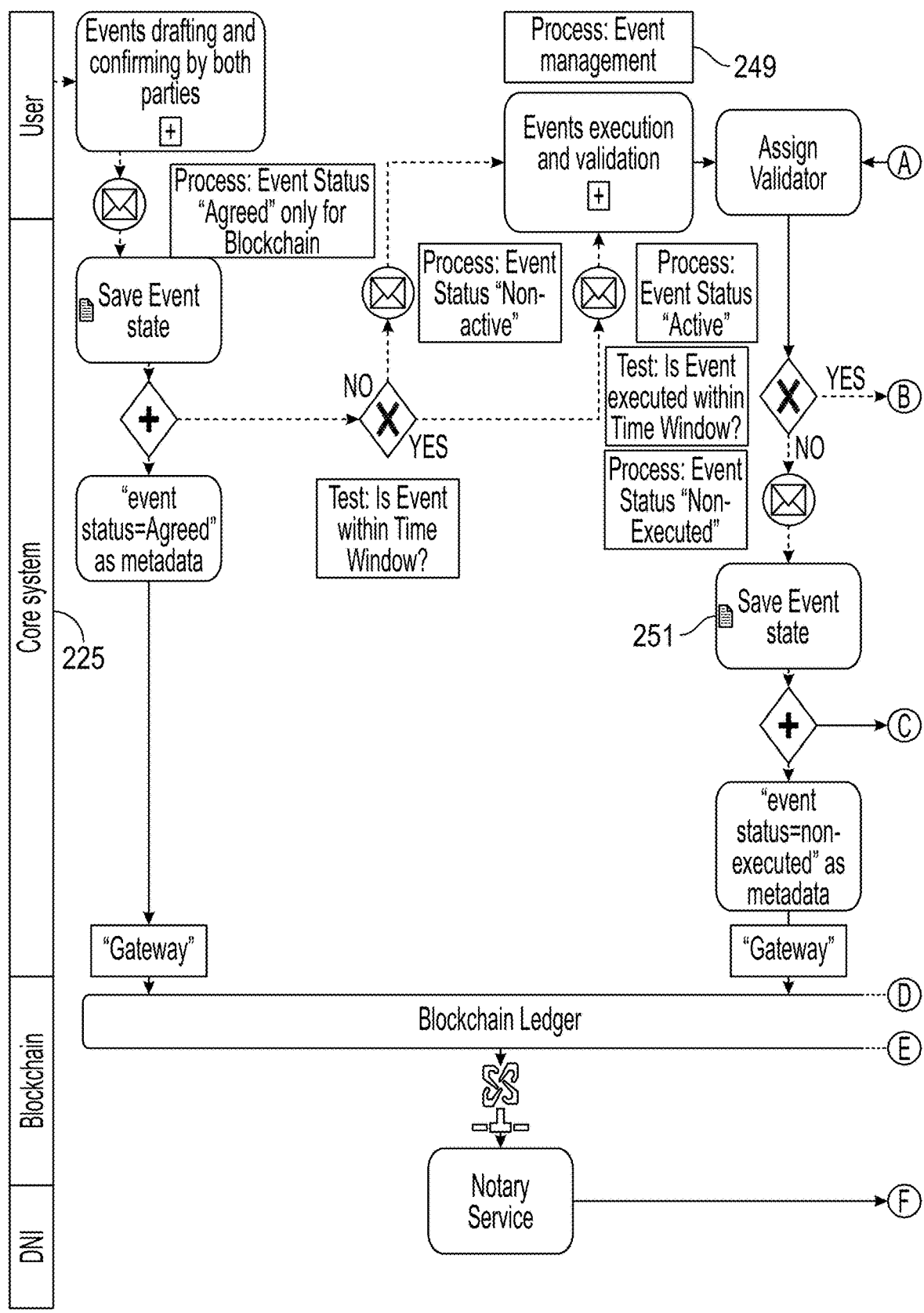
Figure 2D:
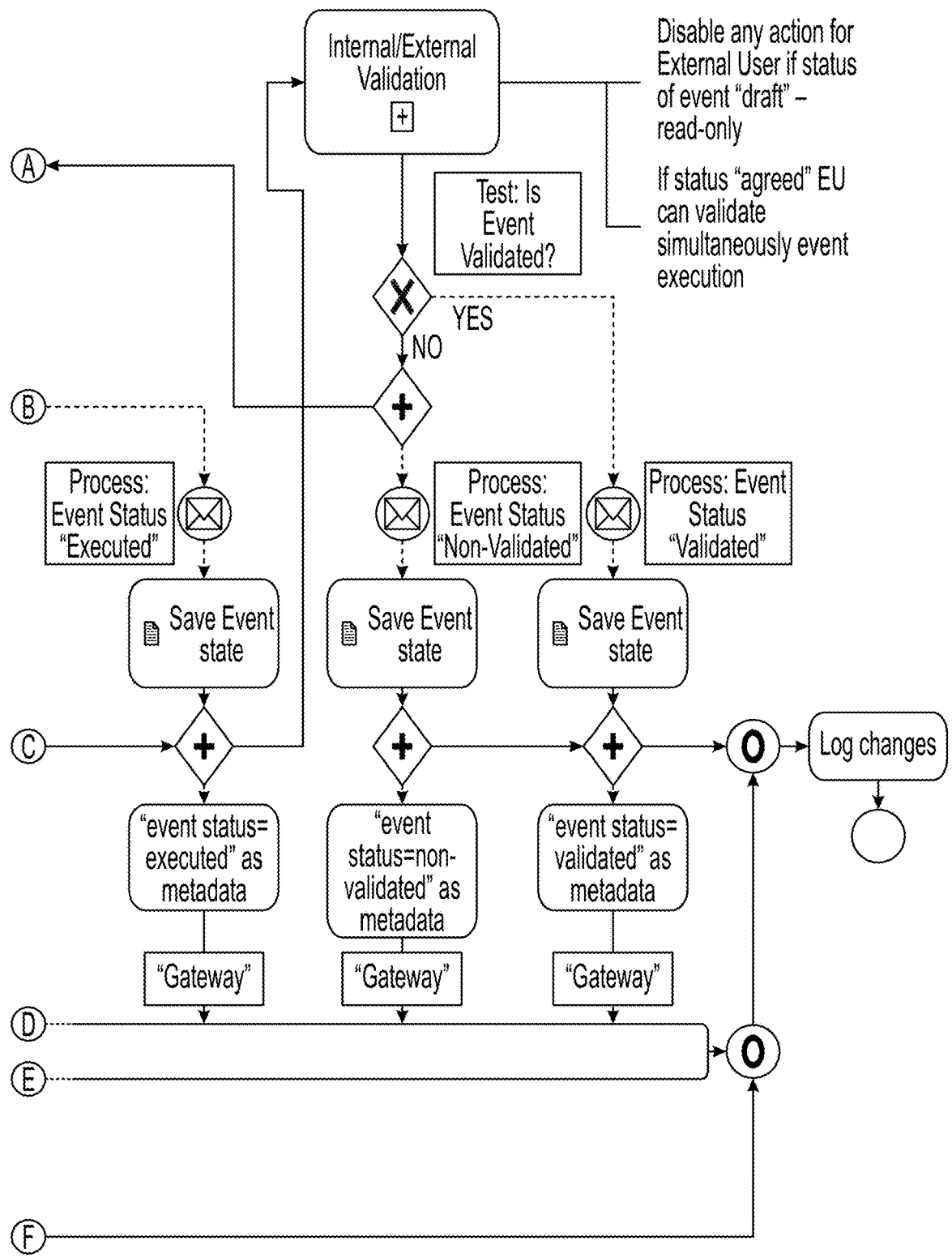

FIG. 2D shows a flowchart schematic of suitable programming (reference block 249) to record, manage, and control events, the operations associated with such subroutines 251 set out in various programming blocks of FIG. 2D. In view of the foregoing, contract events, contracts themselves, authorized users, the signatures of such authorized users, and interactions between such authorized users are timestamped by system 21 in the blockchain layer 227.

Electronic bills of lading (block 247; FIG. 2C) are processed by subroutines 246 and by use of MultiSig accounts or other blockchain artifacts. A plurality or "mosaic" of events are associated with respective contracts or electronic bills of lading, and the associated blockchains in blockchain layer 227 may be written using open-source frameworks, such as Symbol by NEM. In the illustrated embodiment, system 21 makes use of blockchain interoperability which is hybrid in the sense of allowing both the security of a private network, as well as the accessibility of a permissioned, open network, so that users of system 21 may access nodes of the foregoing functionality, subject to suitable security, and as a function of the application.

Figure 3:
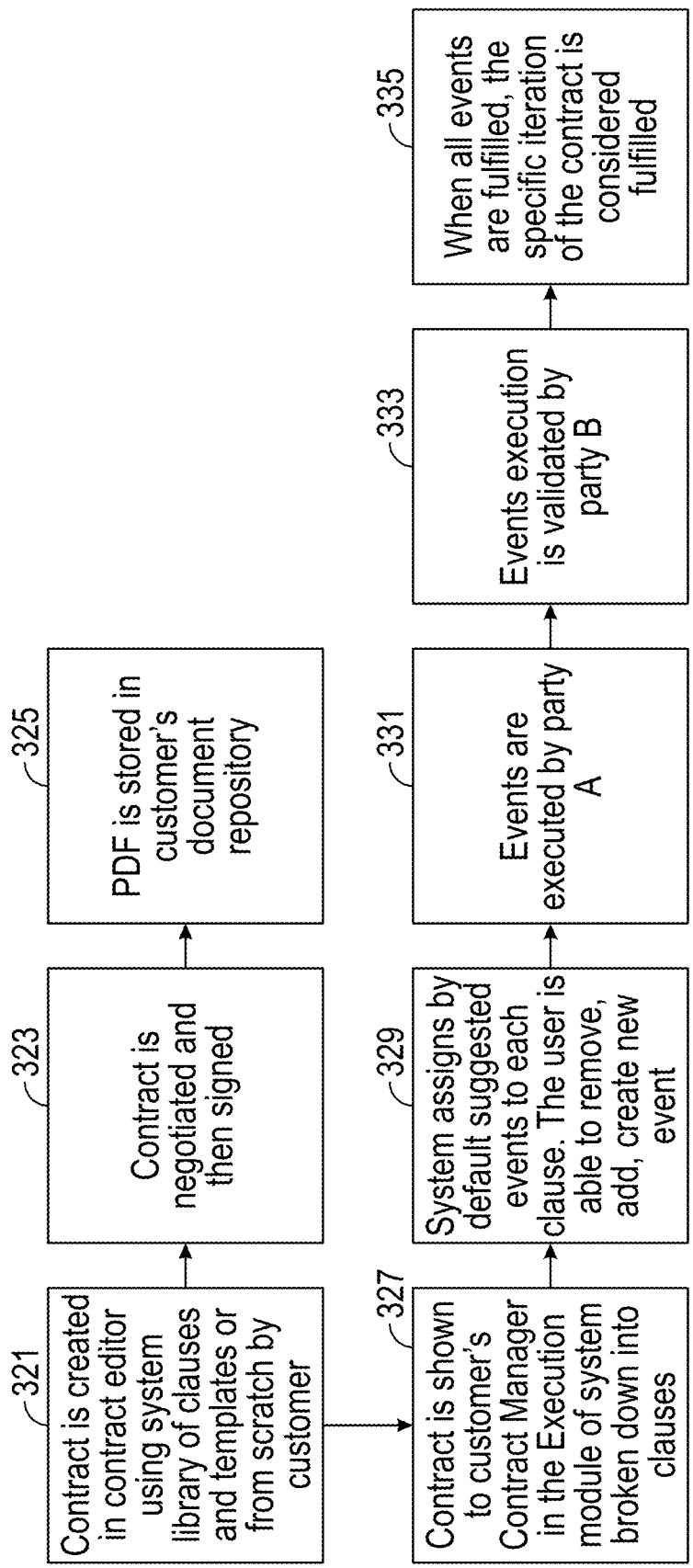
FIG. 3 is a flow chart of suitable programming and associated steps for contract creation, execution, and performance in one possible implementation of a system and related methods for international goods and commodities trading and management.

FIG. 3 is a flowchart of suitable programming and associated steps for contract creation, execution, and performance. The blockchain- and programming-layer-based decision trees and related schematics of FIGS. 2A-2D can be programmed in system 21 and understood as generalized programming steps with regard to contract creation, execution, and performance (reference blocks 321, 323, 325, 327, 329, 331, 333, 335). Suitable programming allows end users wishing to create a contract or generate a draft therefor to select from a library of the system a predetermined contract template. Alternatively, an end user may use programming in system 21 to import their own contract template or draft or otherwise generate their own document in a suitable editing feature of the system 21 (reference block 321). Contract templates include dynamic data fields which are configured to be tracked or otherwise searched or managed during execution phases of the underlying transaction. Once agreement is reached, system 21 facilitates signature acquisition by both parties using a suitable digital signature feature and the contract is suitably signed in the document repository (325).

Subsequent to execution, subroutines of system 21 (327, 329, 331, 333, 335) permit system users to keep track at a very granular level of clauses, terms, and conditions, generically referred to as "events," to monitor and manage performance of a contract during its execution through system 21. In one suitable implementation, the contractual clauses are converted into performance-related events, with the effect of legal terms and conditions being translated into actionable sequences of activities, milestones, and the like, corresponding to the actual transaction under management by system 21. The actionable sequence of activities is to be performed by one or more parties or related individuals in terms of the contract under management by system 21, and validation of performance or execution as provided by suitable programming in system 21 such that the contract is fulfilled (333, 335).

Figure 4A:
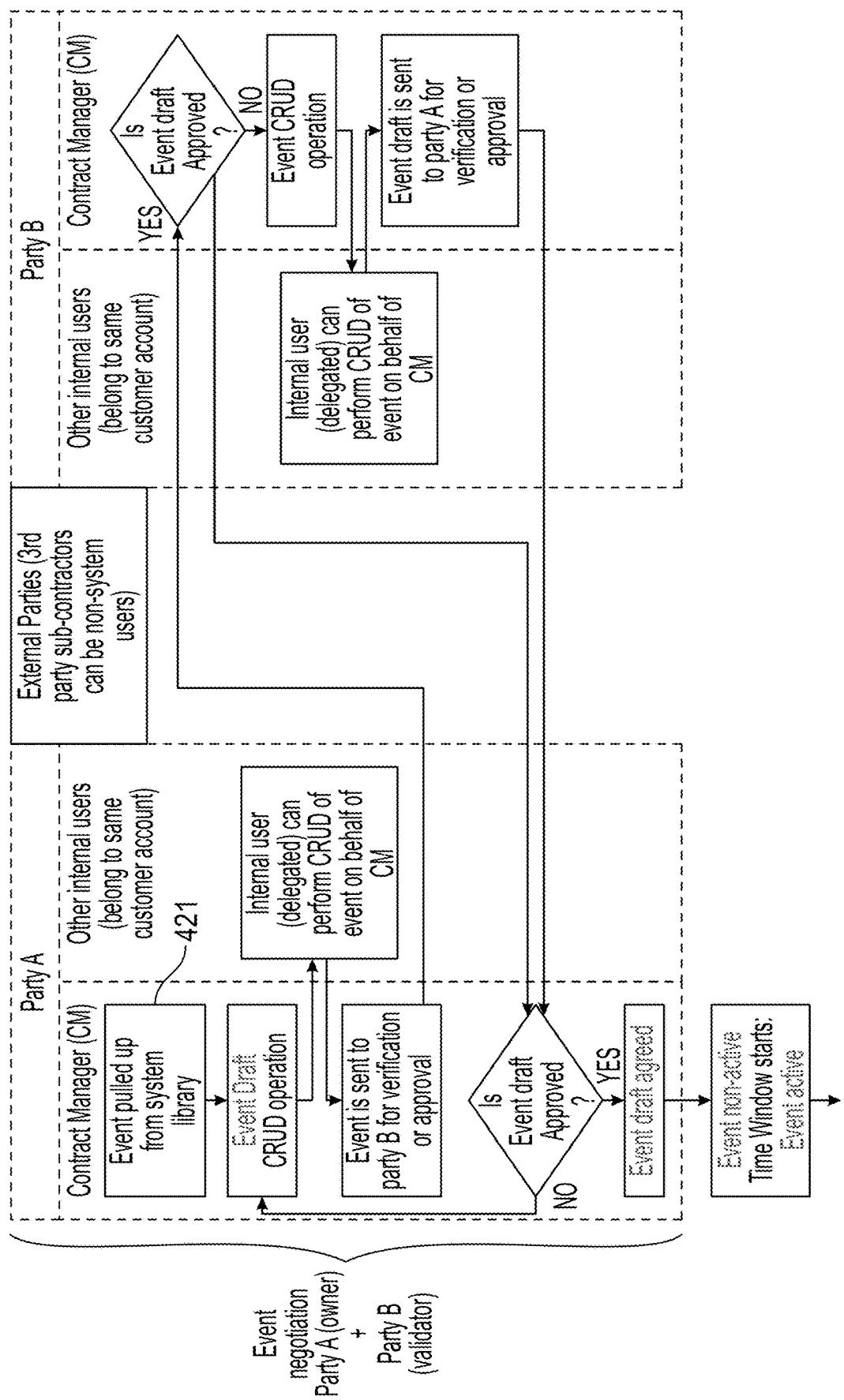
FIGS. 4A-4C are flow charts of operations and programming of a suitable computerized system for international goods and commodities trading and management and related methods.
Figure 4B:
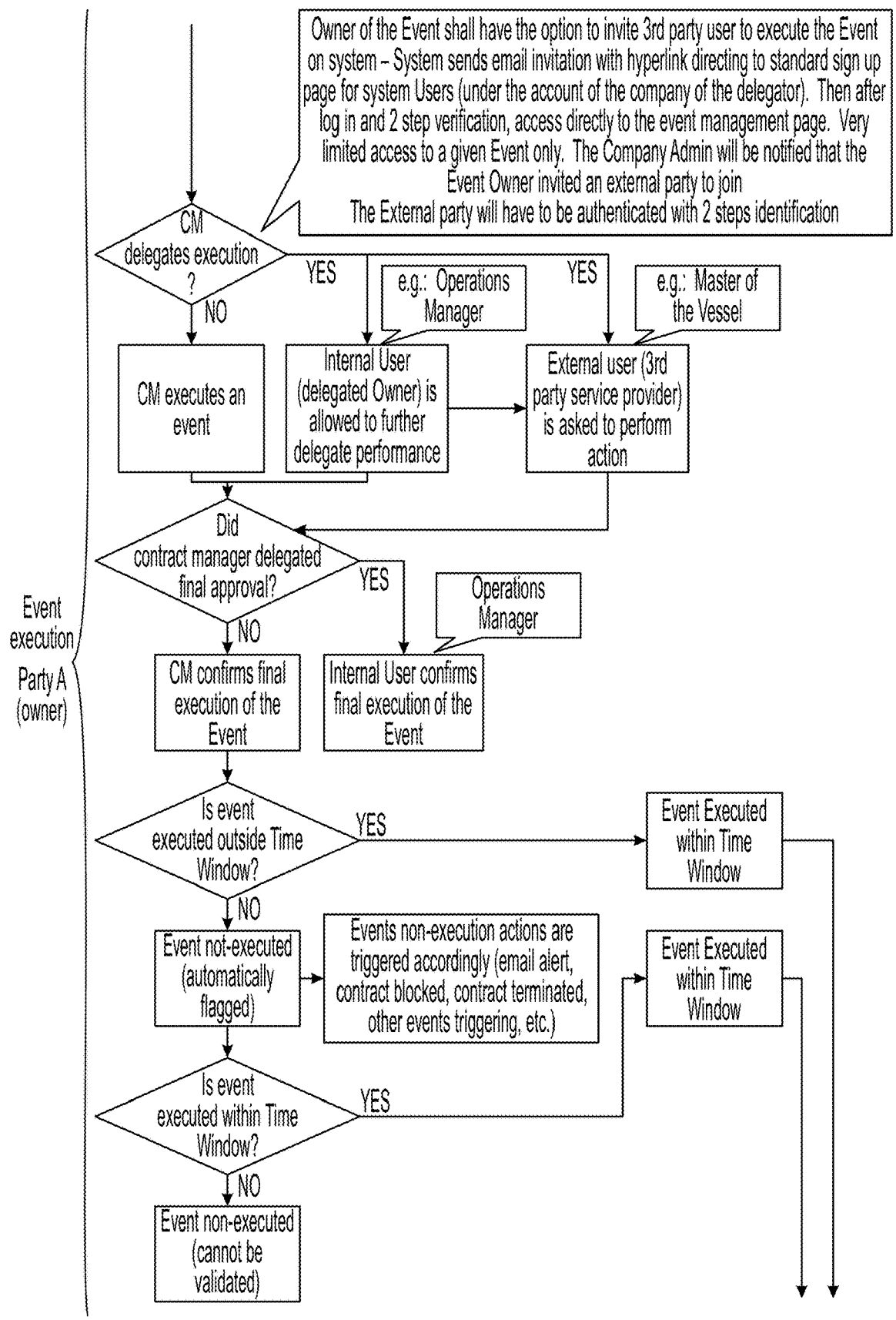
Figure 4C:
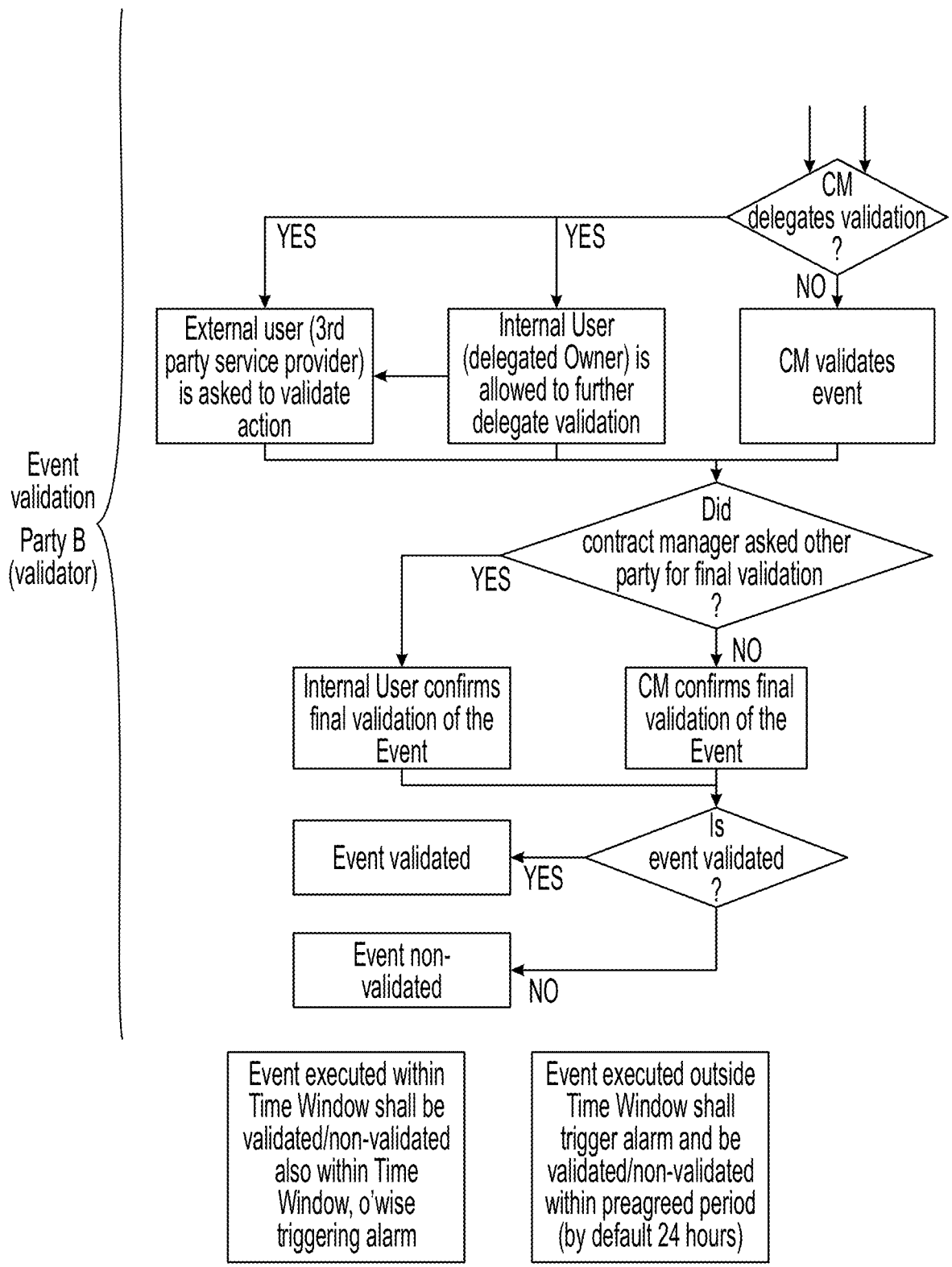

The management of events (329, 331, 333, 335, FIG. 3) may be performed by user-selection of programming subroutines by contract manager (CM) personnel, regardless of whether centralized or scattered across multiple organizations involved in the trading transaction, and by means of a suitable user interface to monitor and manage events in real time, including interparty communication systems like messaging and chat rooms, as well as secure document repository and live alerts via text messages and emails. The operations and programming of system 21 for such CM interactions with events are shown in flowcharts of FIGS. 4A-4C. Referring to FIGS. 4A-4C, contract managers and other users may access a suitable event (421) from the system database or library which can be further customized as needed to correspond to particular industry or customer-specific needs associated with the transaction under management. The event may be negotiated between two parties, owner and validator (FIG. 4A, generally). The interactive functionality shown in FIG. 4A may relate to any number of events, such as (1) providing certificates related to handling of the goods and commodities involved in the transaction; (2) inspecting cargo and transportation assets (such as vessels, trucks, airplanes, trains); (3) acknowledging receipt of cargo; (4) payments; or (5) the release of documentation and cargo. The events may correspond to contracts related to the physical movement of vessels as compared to their actual position, route, expected ports of call, estimated versus actual time of arrival, metrics related to over- and under-performance or other flags of fraud or breach relating to the transaction. As such, events-related programming shown in FIGS. 4A-4C includes functional programming modules for contract managers or other end users desiring to trade goods and commodities automated to establish correlations between sales and purchase agreements, contracts of carriage, bills of lading, consignments and shipments; and the events-related programming functions so that the events corresponding to terms and conditions are interrelated in terms of milestones or the transactions' performance.

The execution monitoring and event validation functionality is shown schematically in FIGS. 4B and 4C. The events, which correspond to clauses or subclauses of related contracts or commitments, are in the form of metadata fields. Such event metadata fields are saved in an encrypted database and used to trigger specific actions, such as tracking of a specific vessel based on IMO number or other transportation assets, using GPS systems. The fulfillment of each event can trigger subsequent events, payments, or other contingent actions and can be organized in sequence, power of execution, with Boolean operators (and/or/if/then), and may be associated with execution work flows, such as those in the illustrative flowcharts of FIGS. 4B and 4C.

Events can be of any nature suitable to the transaction, either selected from the library of events as discussed previously or created and inputted into system 21. As such, events can be in the nature of (1) simple notifications requiring acknowledgement; (2) requests for action, such as provided confirmation that certain actions or performance have occurred or validating the forgoing; (3) requests for evidence in the form of uploading of documents or other transmission of evidence of performance; (4) automatic triggers, including events caused by reporting of facts and circumstances related to the trading of goods and commodities, such as vessel positioning, arrival, or other contract performance parameters.

As set out in FIGS. 4A-4C, event status changes (active, inactive, executed, validated, and the like) are time stamped by suitable programming in the blockchain layer of system 21, such that a non-repeatable track or record establishing accountability of the associated parties has been created.

Sale and Purchase Contract Management

Figure 5A:
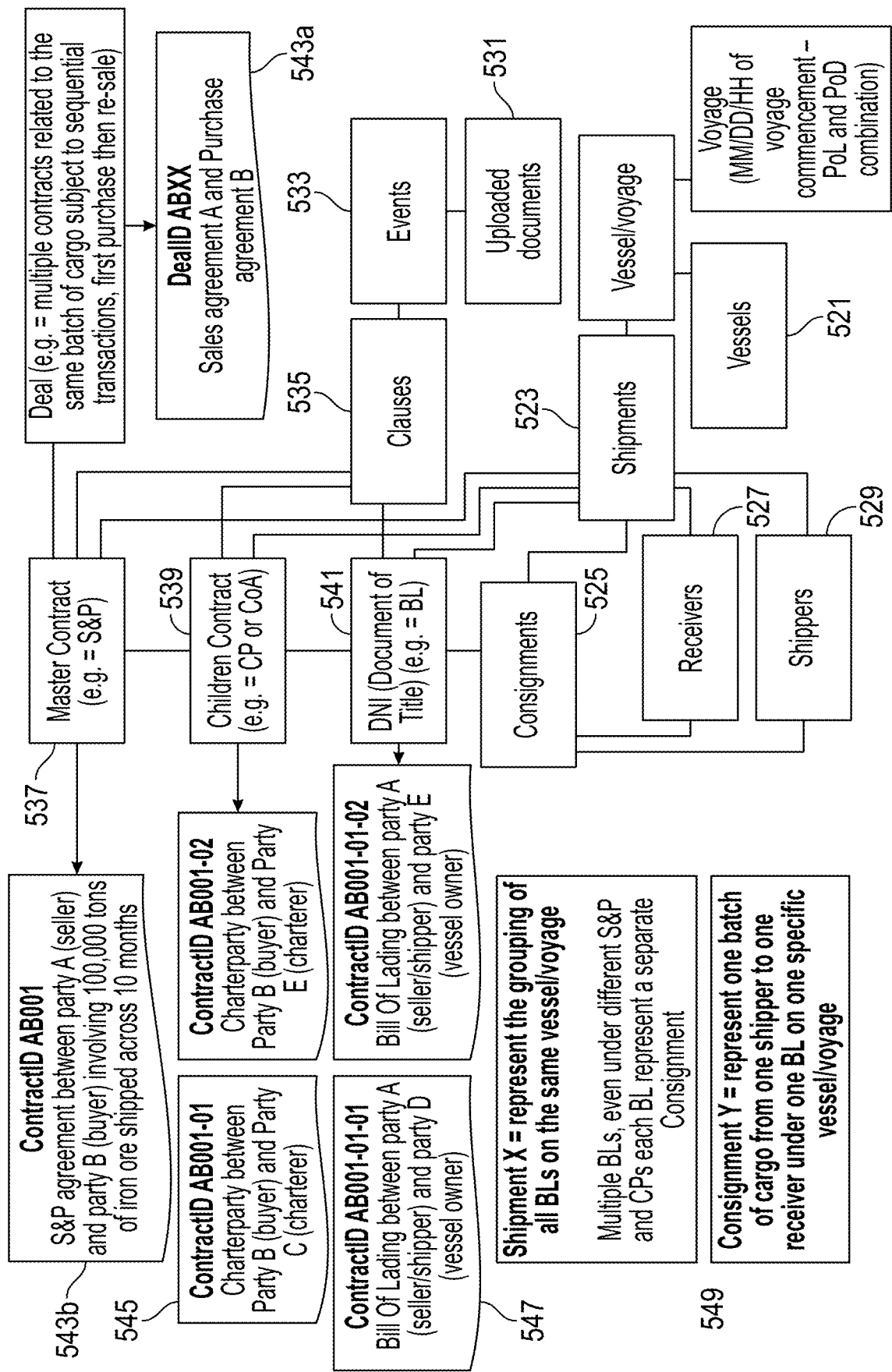
FIGS. 5A-5B are a schematic and related flow chart of another suitable implementation of a system and related methods for international goods and commodities trading and management.
Figure 5B:
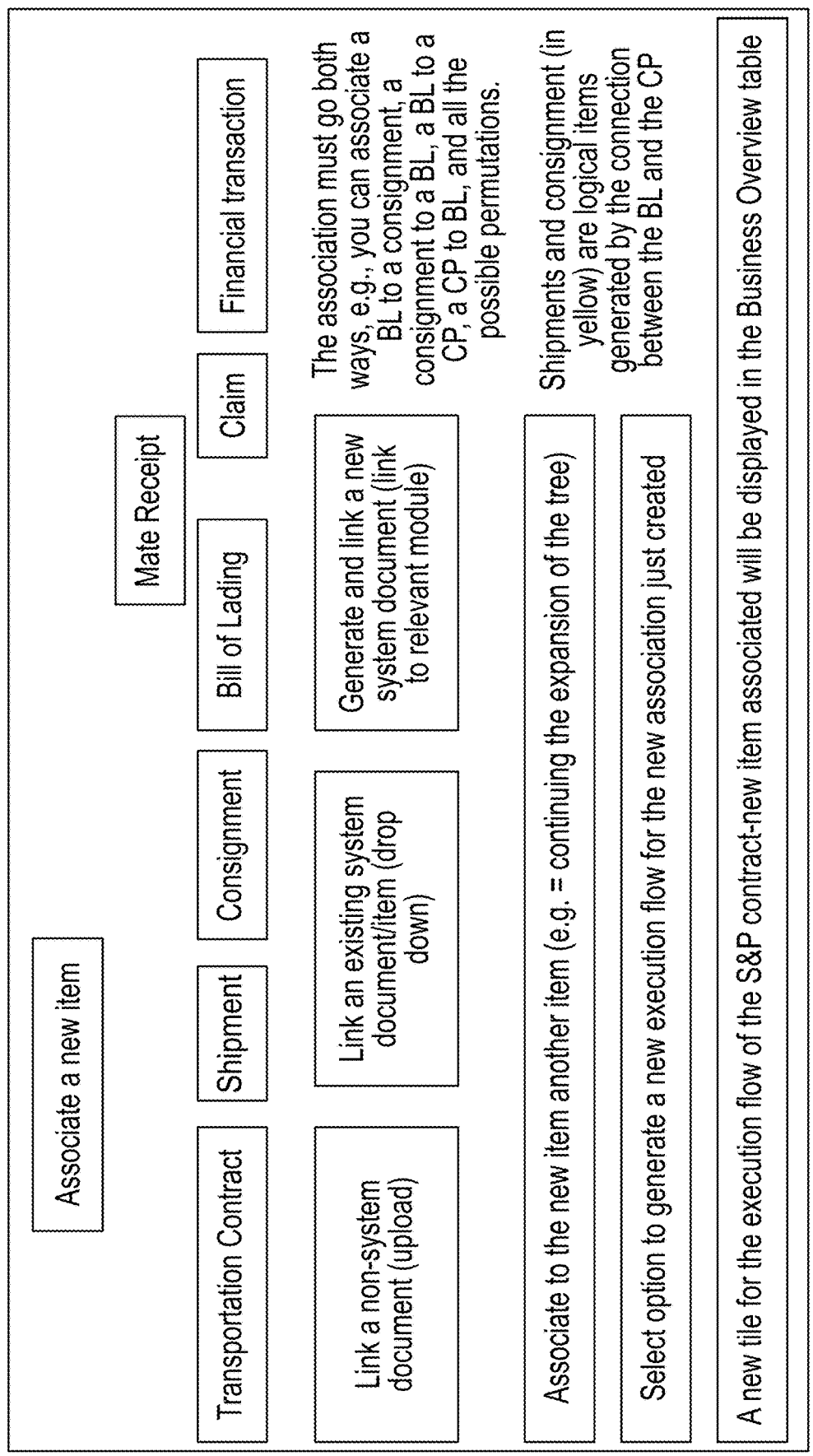

One of the basic forms of trade which is manageable under system 21 involves the sale and purchase contract, which may cover a substantial volume of cargo, including spanning more than one shipment, vessel, or associated transactions. As such, there may be one or more charter parties (C/Ps) under contract, and there may be one or more associated consignments associated with performance of a S&P contract. FIGS. 5A and 5B show a schematic and related flowchart, respectively, of contracts and associated data stored in system 21 and related to S&P contracts, and the monitoring and management of such data by either the contract manager or the charter party.

The associations between transportation assets such as vessels (521) or voyages, shipments (523), consignments (525), receivers (527), shippers (529), uploaded documents (531), events (533), and clauses (535), are recorded or established relative to each other through suitable tagging, address fields, or relational database management, such relationships being between each other as are set out by underlying master contract (537), subcontract or child contract (539), or title documents (541) of the DNI layer of system 21. Deals, representing the association of multiple sales and purchase contracts for the same batch of cargo (543a), contracts, subcontracts and DNI layer documents (537, 539, 541) may comprise any number of agreements, such as the S&P agreements (543b) between seller and buyer discussed previously, as well as related charter party arrangements (545) and associated bills of lading (547). Associations between all of the foregoing and the corresponding shipments (549) are likewise the subject of suitable subroutines related to contract execution, monitoring, performance, and completion provided by suitable programming of system 21. As shown in FIG. 5B, the foregoing aspects of contracts, such as clauses 535, events 533, and the underlying contract monitoring attributes discussed in 5A, are associated with each other through suitable programming subroutines such that a user may have multiple flows, referred to as multi-execution flows, for complex or branched shipments covered by one or more S&P agreements. Associations of the underlying contracts and events may link an electronic bill of lading to a consignment, a consignment to a bill of lading, a bill of lading to a charter party, a charter party to a bill of lading, sellers and others to any of the foregoing, and all possible permutations of the actors or parties involved in S&P agreements or other trade transactions which are processed by and subject to system 21 and its programming. Exemplary associations are shown schematically in FIG. 5B.

FIGS. 6A-6E are flowcharts showing computer programming subroutines invoked to associate events to be managed by system 21 with contracts, sellers, charter parties, and other events associated with sale and purchase contracts and which are processed through computer-driven multi-execution workflows which interrelate the various contractual documents and associated milestones or events in such S&P contracts. System 21 allows any number of combinations of S&P contracts to be generated and managed including (1) single sale and purchase contracts involving one or more charter parties; (2) single charter parties involving the generation of one or more shipments or vessel voyages; (3) single shipments with one or more consignments or bills of lading (electronic); and (4) single shipments with goods and commodities or related cargo under more than one charter party and under more than one salient purchase contract.

Figure 6A:
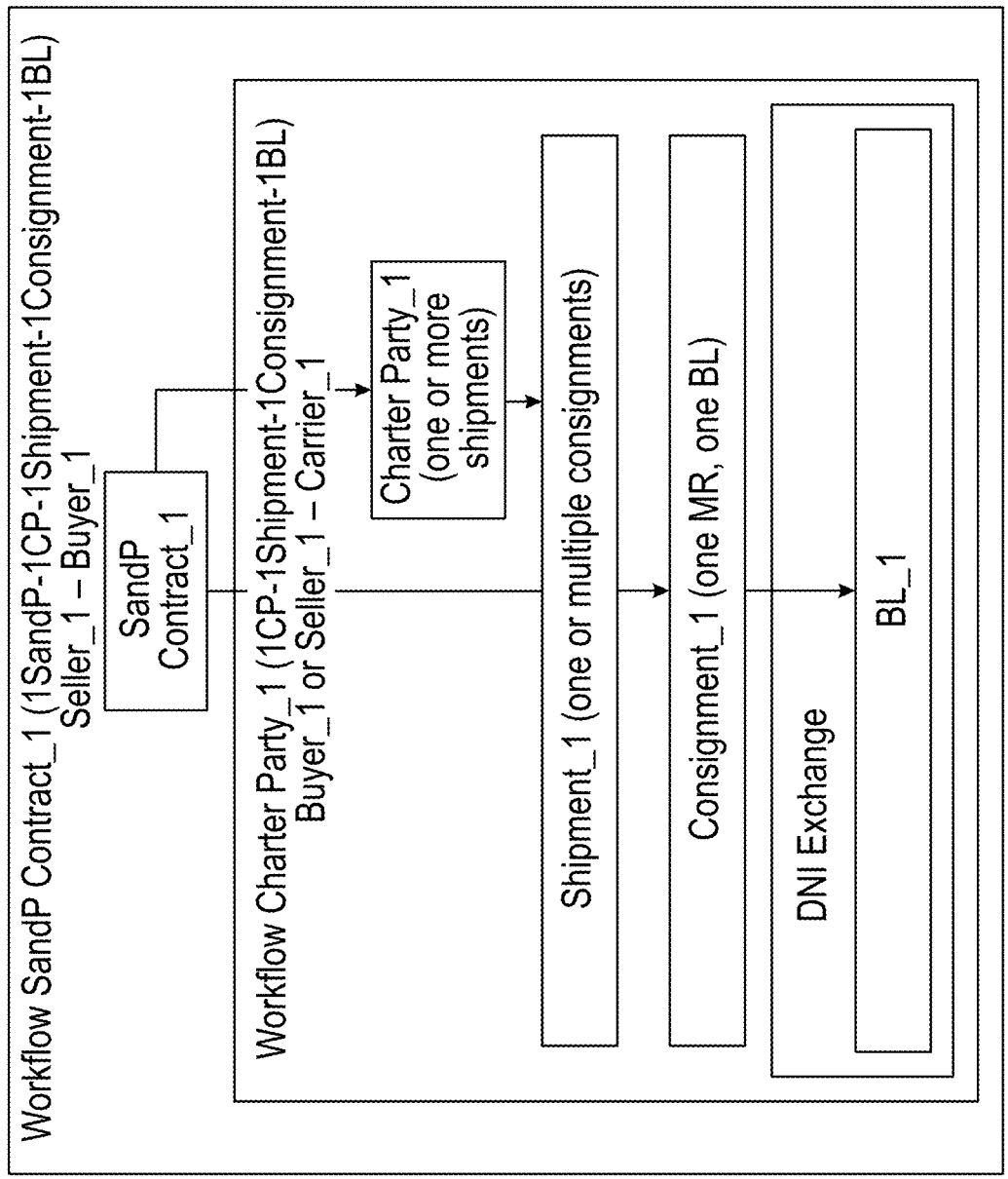
Figure 6E:
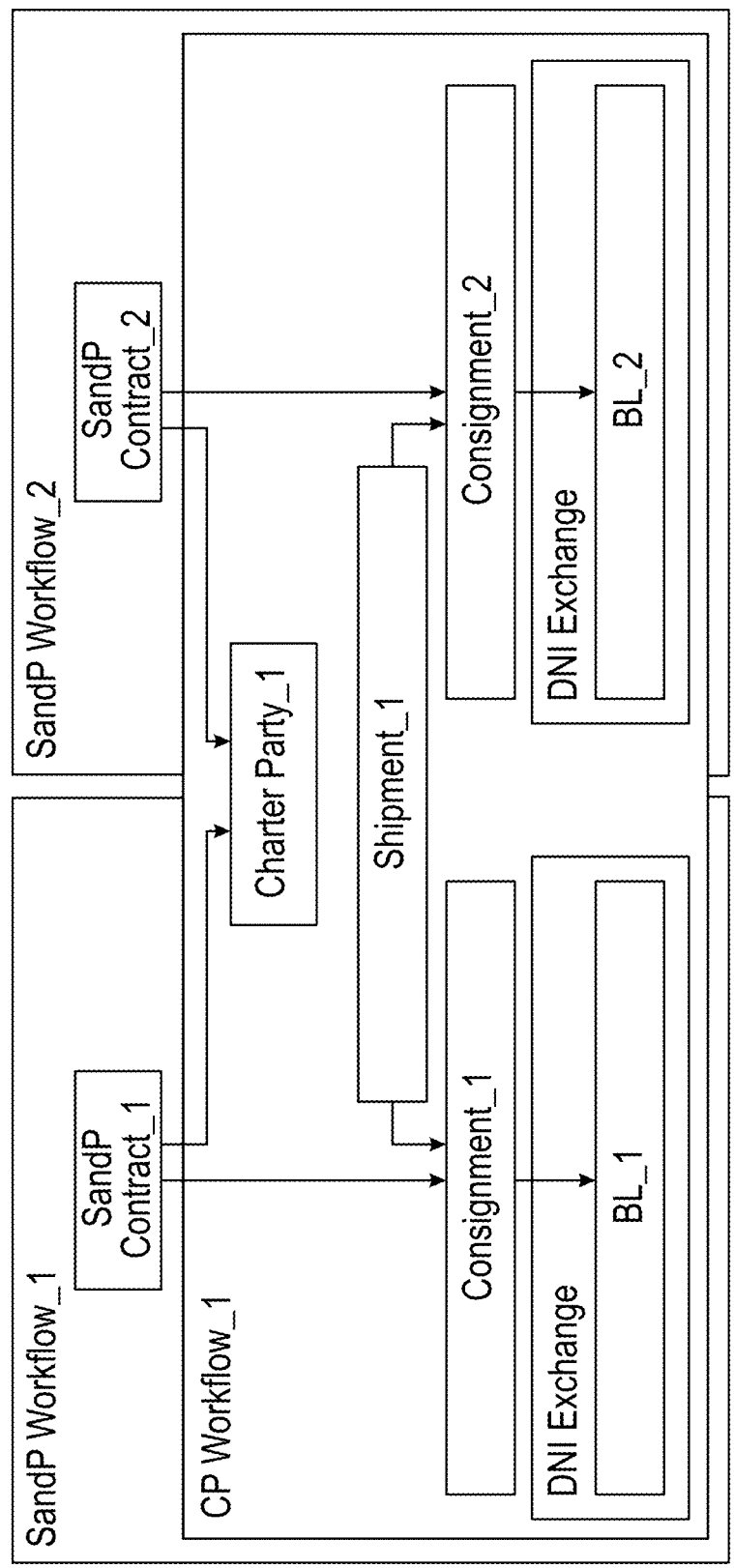

Thus, referring to FIG. 6A, a single S&P contract with a single charter party and single consignment may be generated by system 21, and associated events managed by its programming. FIG. 6B shows multiple charter parties, each with one shipment and consignment, and associations have been created which thereafter may be managed, monitored, and associated with events under the programming subroutines discussed previously with regard to contract execution and performance monitoring and management. FIG. 6C shows the associations and associated programming which can manage the case of two shipments in a single charter party (such as a contract of affreightment). FIG. 6D shows the case of two consignments in a single shipment and the associated events and relationships accomplished by suitable programming. FIG. 6E is a more complicated case of generating, monitoring, and otherwise assuring performance of two S&P contracts associated with a single shipment. From the foregoing, then, the foregoing schematics 6A-6E comprise a performance module of system 21 which guides the generation of events and associated monitoring by the contract manager, allowing such manager to associate a contract ID, a charter party ID, a shipment ID, a consignment ID, and associated events generated can be associated as required between the foregoing IDs.

Electronic Bill of Lading ("E-Bill of Lading")

FIGS. 7A-7H are schematic flowcharts of one possible implementation of an electronic bill of lading system. Electronic bills of lading are a form of digital negotiable instruments ("DNIs"). The generation of electronic bills of lading and other digital negotiable instruments proceeds through a certification process involving the issuance of PKI keys in suitable cloud-based hardware security modules and associated protocols and programming for maintaining the validity of such certificates during the course of the associated commercial transactions (reference block 723). Thereafter, customers are onboarded, such as carriers, shippers, and endorsers, by means of two-factor authentication using established protocols such as KYC, KYB, AML, and bank account verification (725). If authentication checks are passed, the associated users may access the system, create private keys in HSM, and certificates may be distributed in accordance with the requirements of the transaction or other regulatory requirements (729), including compliance with standards of Digital Trade Laws (Singapore, UK and others)

discussed subsequently herein. The certificates may be further linked after importation into the HSM module (731).

Figure 7A:
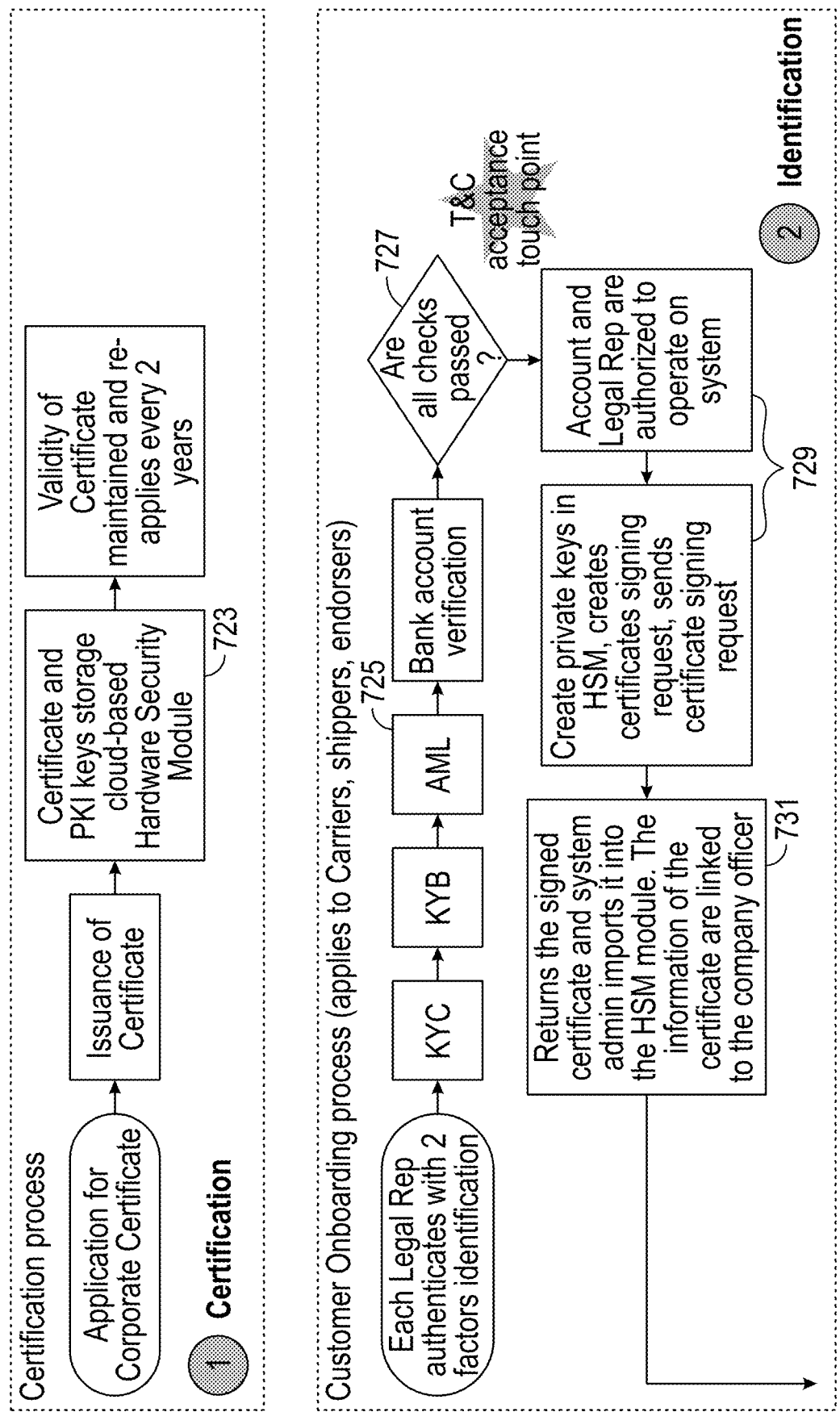
FIGS. 7A-7H are schematic flow charts of another possible implementation hereunder, of a system for international trading of goods and commodities, related methods, and an associated electronic bill of lading system and related functionality.
Figure 7B:
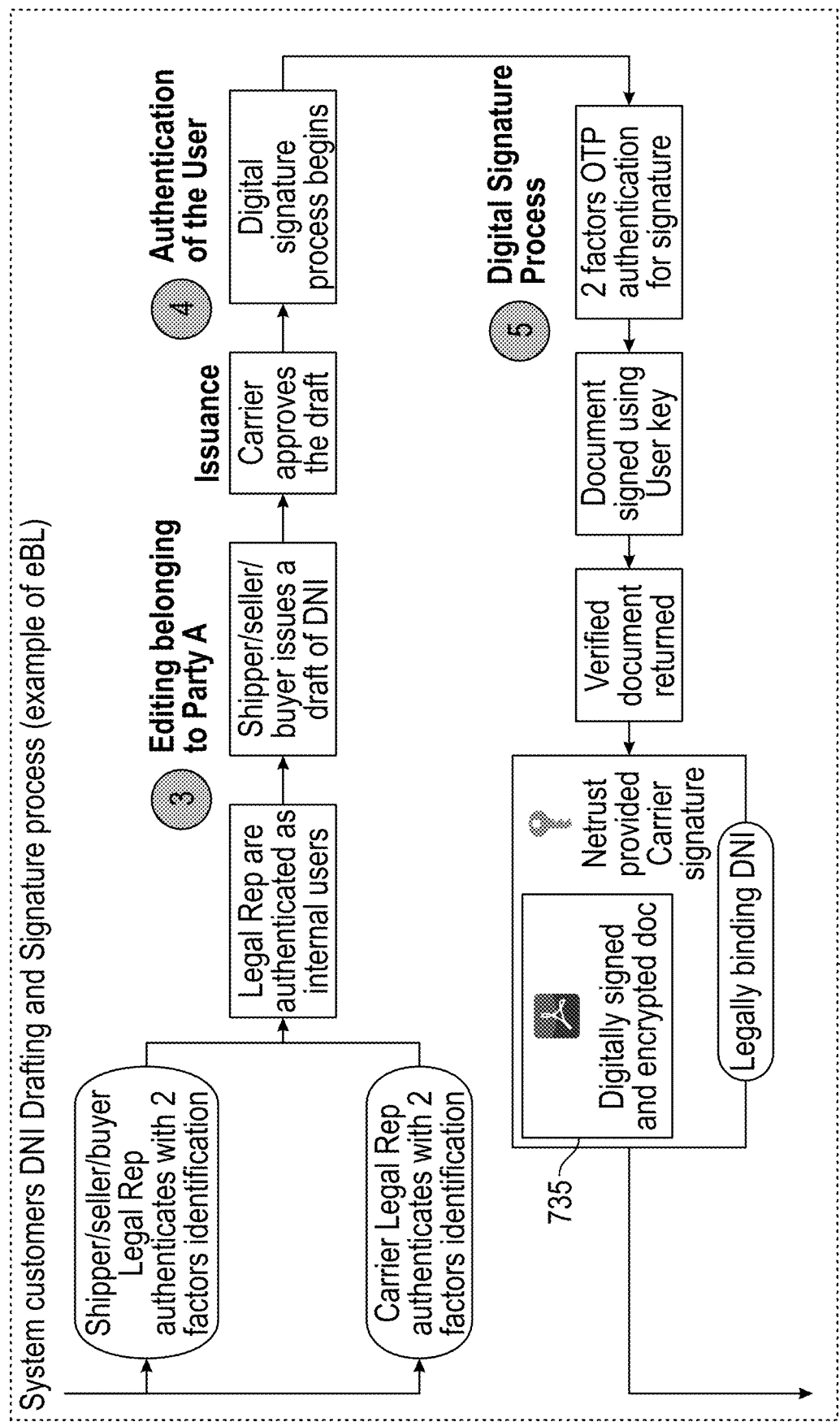

After completing the identification process associated with electronic bills of lading, additional customers sign off on the associated digital negotiable instruments, including the electronic bill of lading generated in previous steps, the details of which are set out in FIG. 7B, including reference blocks 733, with the result of a digitally signed and encrypted document 735.

System 21 and the programming associated with flowcharts 7A-7H are capable of managing multiple types of digital negotiable instruments, including ocean bills of lading for bulk and intermodal shipments, air bills of lading, house bills of lading, overland bills of lading, and warehouse bills of lading. In certain embodiments, the electronic bills of lading, as one type of DNI, are compliant with regulatory requirements, and thus provide integrity to all parties to the associated trading transaction. System 21, in the illustrated embodiment, is in full compliance with the Singapore Electronic Transaction Act, amendments to the Singapore Electronic Transactions Act on 19 Mar. 2021 and the UK Electronic Trade Documents Act 2022.

Such compliance means that the burden on private agreements and associated representations and warranties between a customer and customer's trading partners is reduced, and thus encourages adoption of electronic bills of lading more readily than prior to the disclosure and development of system 21 discussed herein.

System 21 and programming associated with FIGS. 7A-7H allow DNIs to be created, transferred between parties, and reproduced digitally with all the functions of typical paper bills of lading. The inclusion of encryption keys, blockchain-based subroutines and programming improve on the security of paper equivalents to DNIs and are less prone to frauds and forgery. Still further, DNIs, such as electronic bills of lading, allow for instantaneous transfer of associated goods and commodities, cargo, or other elements of the transaction, and thus facilitate the handling of more dynamic commercial transactions or those subject to unpredictable external forces. System 21 and programming associated with the e-bills of lading in FIGS. 7A-7H also provide the capability of interfacing with outside systems, including manual systems, by means of encrypted PDF files, exchanged as one or more digital tokens via application programming interfaces facilitating such conversion.

As shown in FIGS. 7A and 7B, customer's teams, providers, and partners are able to access programmed functionality to collaborate in the drafting of associated DNIs, such as electronic bills of lading, such DNIs potentially including customer's shipping instructions, mate receipt, and other documents needed to draft a suitable DNI. The various components may be accessed and manipulated and collaborated upon through a dedicated user interface provided by system 21, and making use of system-provided templates in applicable industry formats.

Once the DNI draft is ready (733), a customer can present it to the carrier for approval and issuance of the final DNI. Customer's authorized carriers will have access to the functionalities associated with DNI creation and management in FIGS. 7A-7H, which will improve the efficiency and reduce costs.

The digital signature process begins after carrier approval of the DNI, resulting in a digitally-signed encrypted document (735).

Figure 7C:
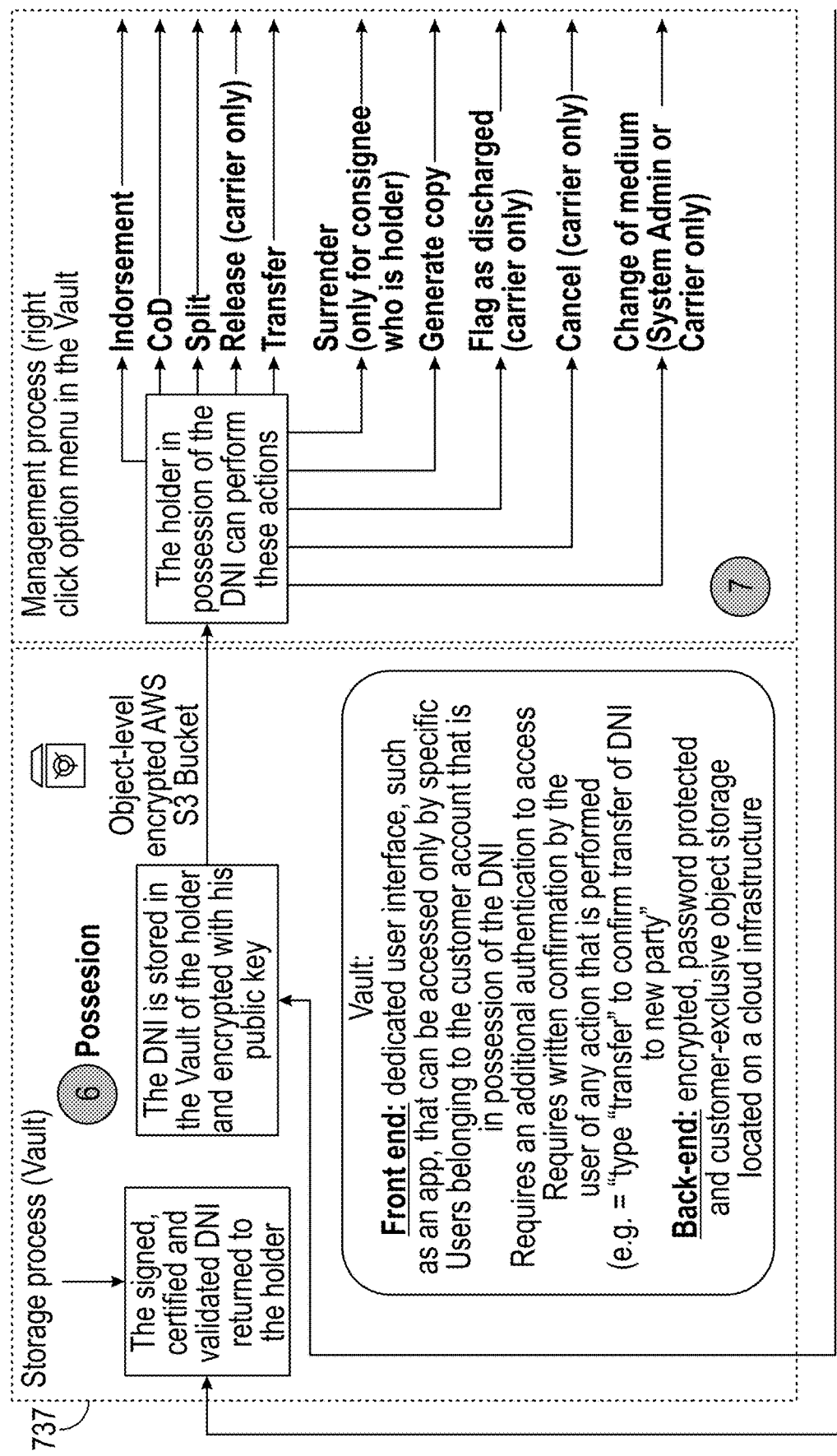
Figure 7C:
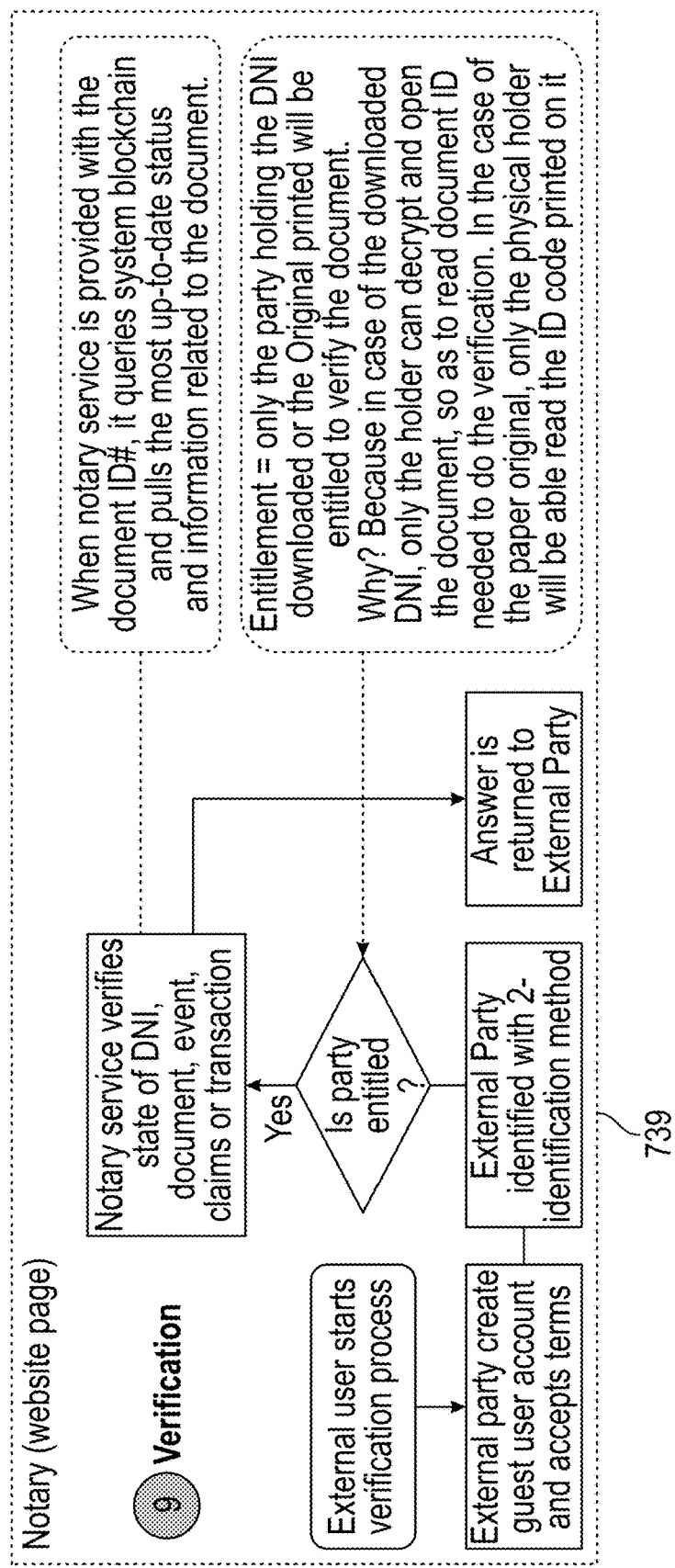

Referring now to FIGS. 7C-7H, the signed and encrypted document in step 735 may be released into a suitable vault, and associated functionality to establish such vault may be a cloud-based, secure, fully-encrypted, and tamper-proof repository (reference blocks 737, FIG. 7C).

Notarization and verification functionality 739 allows not only the customer, but also the customers of such customer as well as partners to verify at any given time the authenticity and integrity of every DNI generated by system 21, the foregoing being subject to prior authorization or security protocols. Such functionality may be important when the DNIs and associated underlying transactions involve exports outside the system 21, including those handled by customers outside system 21's purview, because such external interactions may expose the underlying transaction to alterations of associated documents, forgery, duplication, and other fraud-related activities.

Thus, notarization functionality (739) mitigates the foregoing risks by allowing the holder of an encrypted PDF or printed original generated by system 21 to verify that the subsequently presented document has not been altered from its notarized and vault-stored form. The vault-secured document likewise is matchable to associated blockchain technology to assure authenticity.

The processes of verification (739) may include the creation of guest user profiles for use by selected parties normally outside of system 21, and which profiles allows for authentication of documents associated with such guest user.

In certain implementations of system 21, there is one vault for each customer account, so that the customer has dedicated control within customer's organization of access. As such, the customer becomes the legitimate holder of the DNI and can perform all functions associated with the instrument in digital form as readily as traditional, paper-based negotiable instruments. Companion services to the vault functionality (737) may include the above-referenced notarized verification programming (739).

Figure 7D:
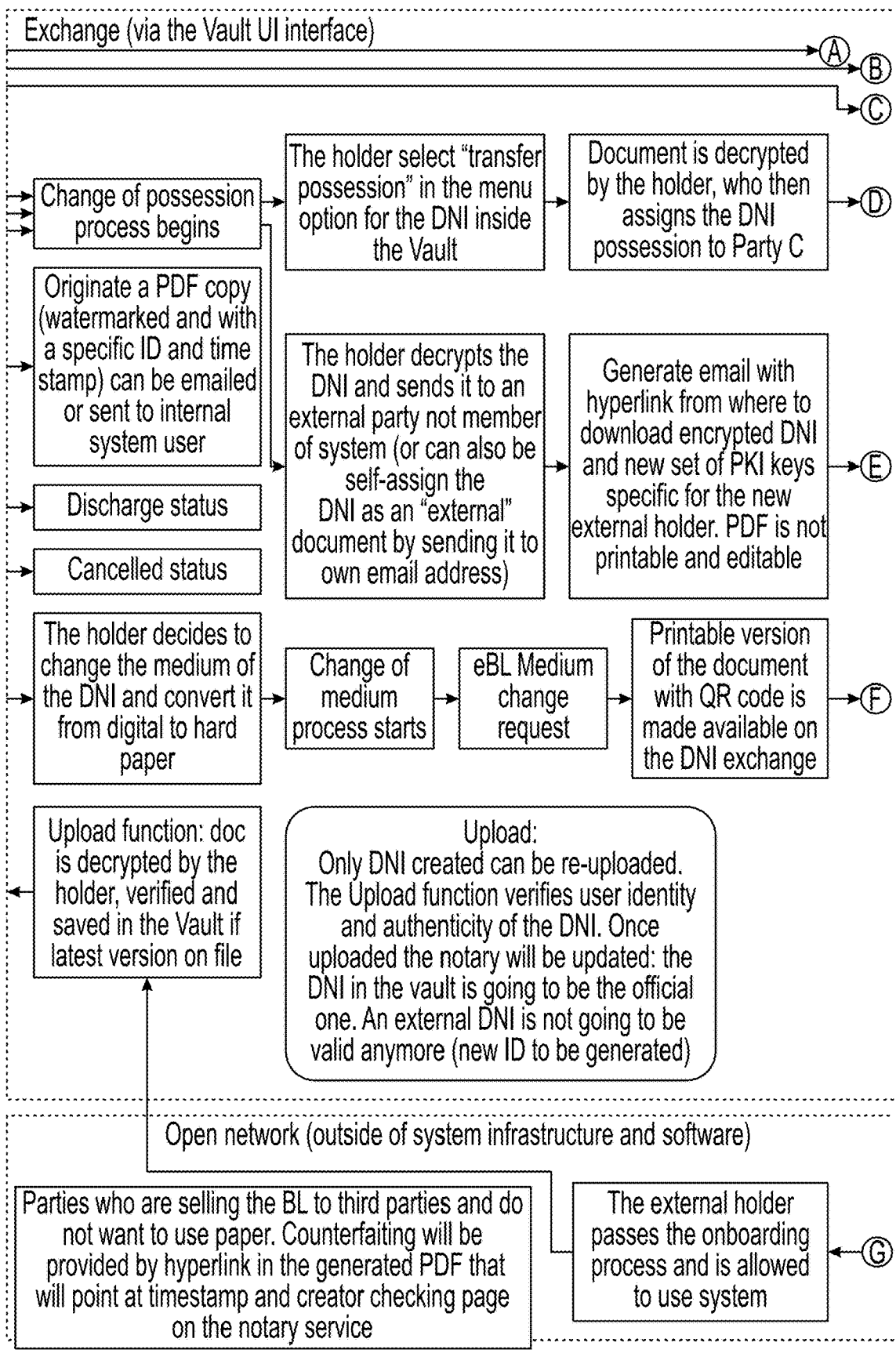
Figure 7D:
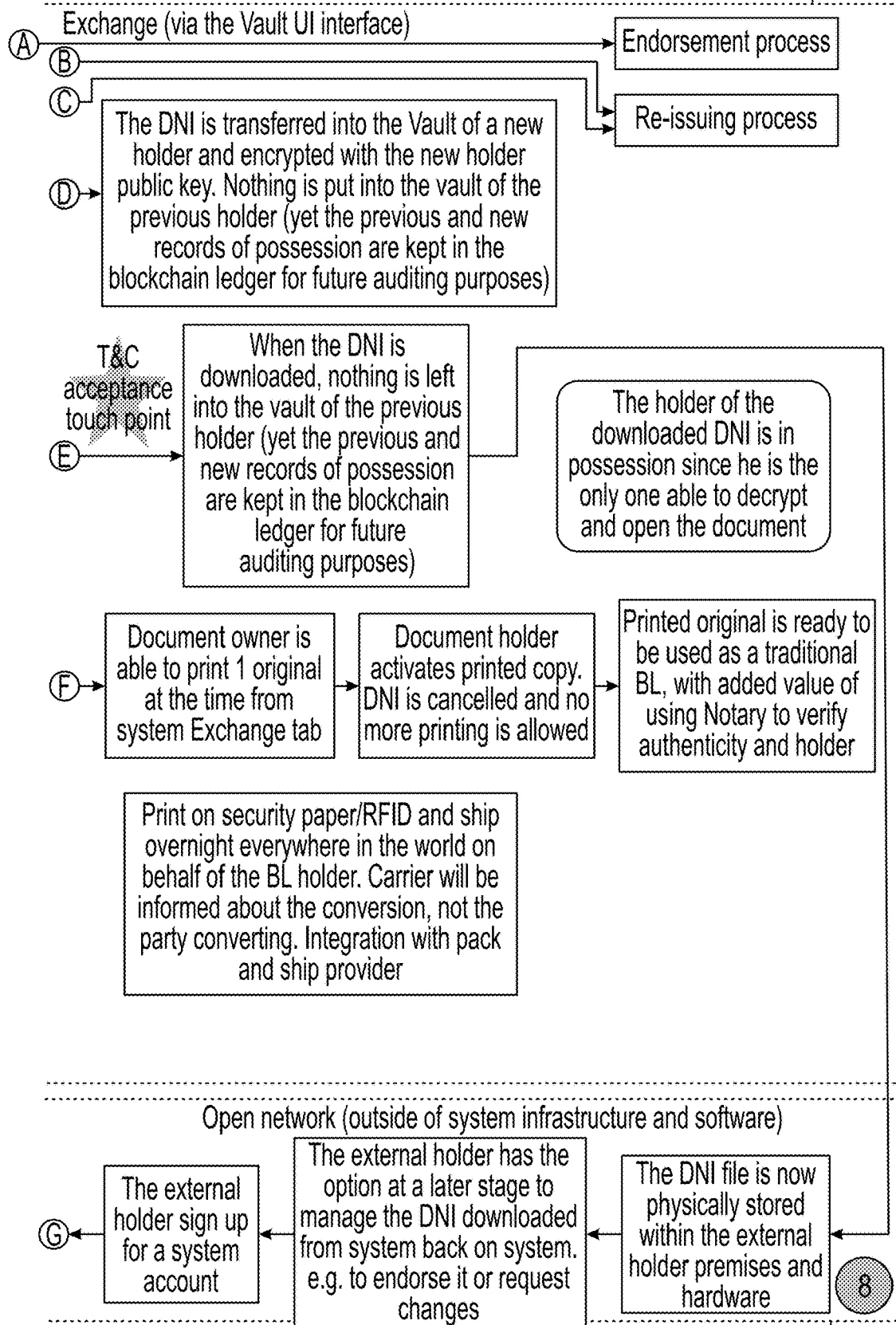
Figure 7E:
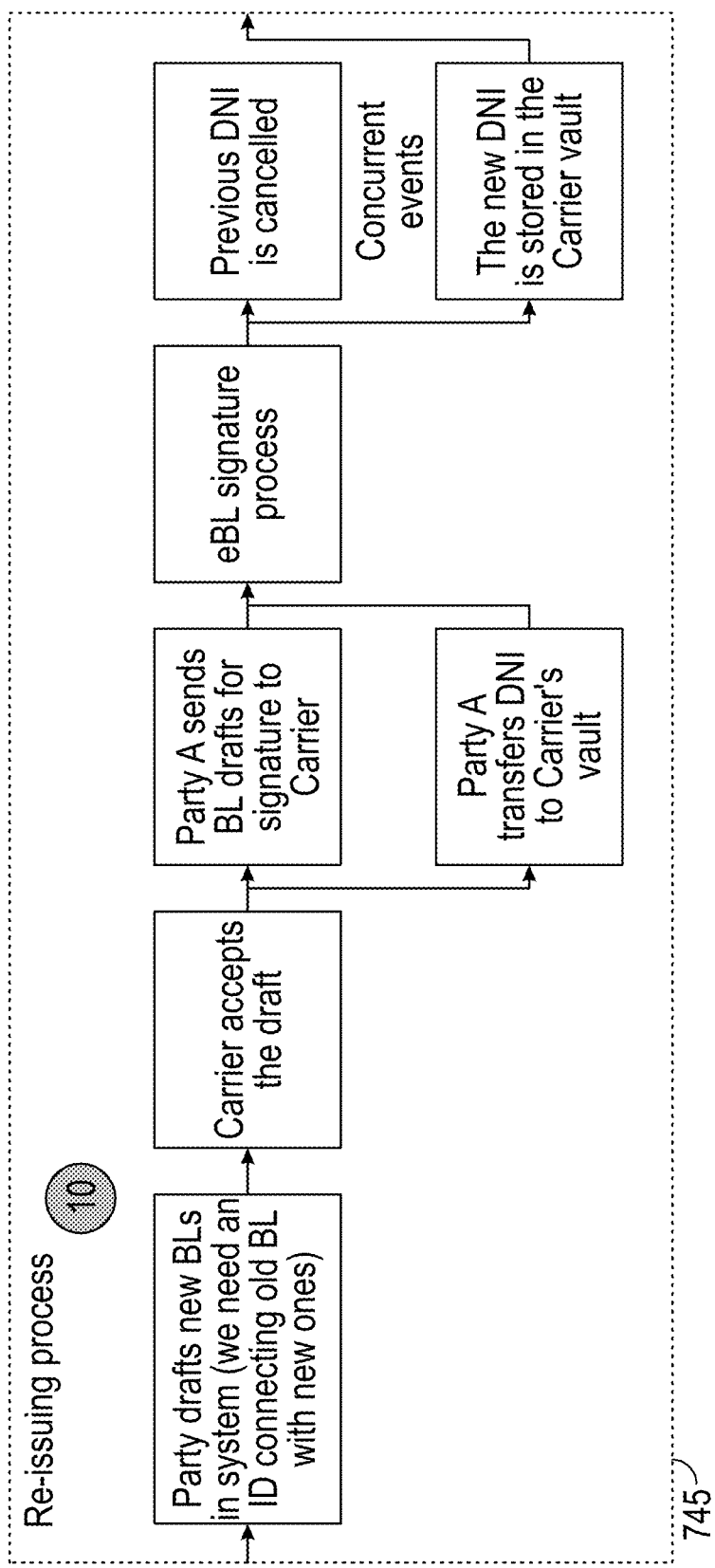
Figure 7F:
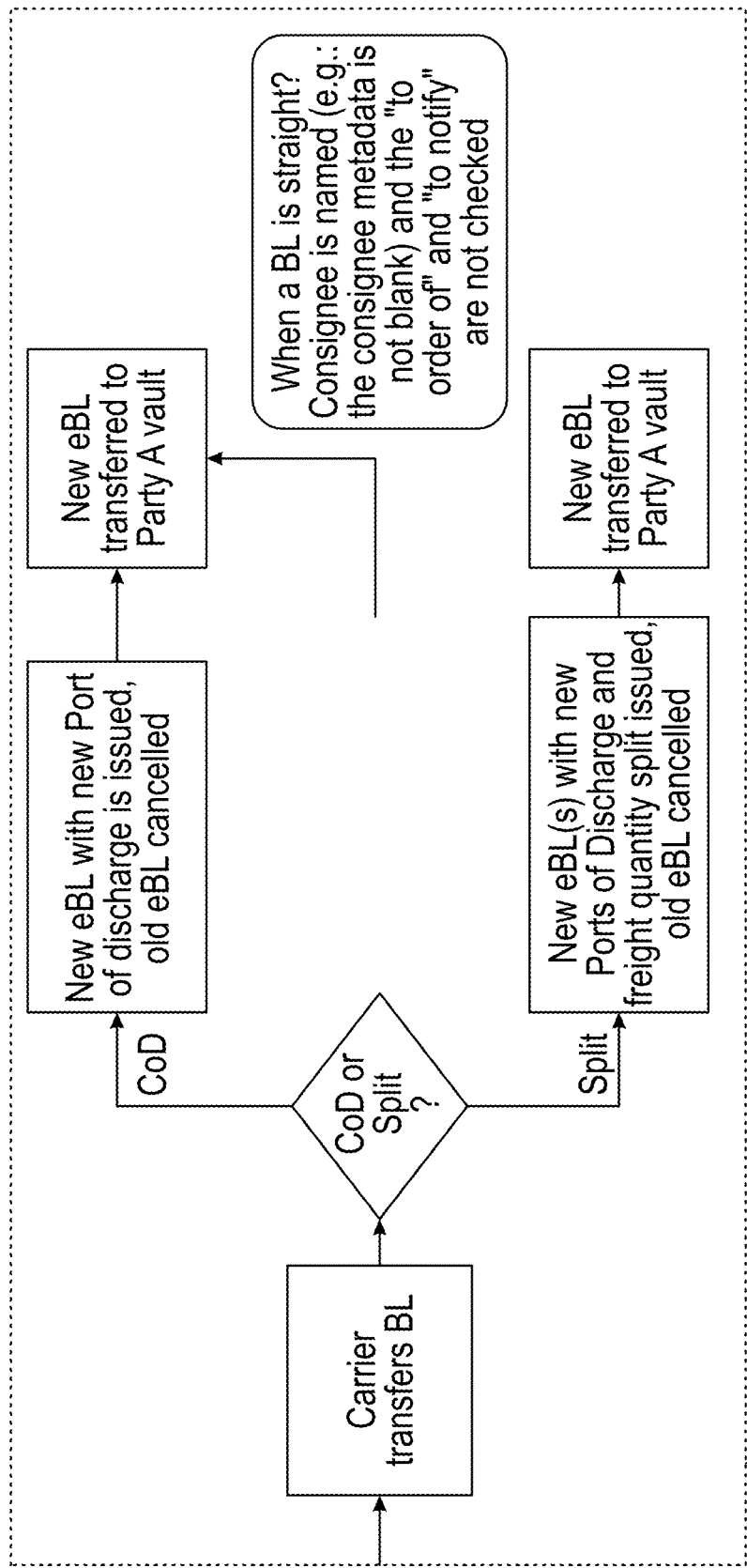

Among the functions available to legitimate holders of a DNI are exchanges or transfers of the DNI occurring in the course of the associated trading of goods and commodities transactions being generated and managed by system 21. As shown in FIG. 7D, in response to suitable selections in the user interface, such as that associated with vault functionality (737), a customer can start the transfer process through user-selectable computer-based subroutines, which can accommodate the needs of both simple and complex transfer of goods and commodities, as shown in programming of FIG. 7D (741).

One potential transfer occurs between two authorized users of system 21, in which case an internal platform transfer may occur between two respective customers' vaults. In the case of the new holder of the DNI not being authorized by system 21, such customer can be invited upon suitable verification into system 21 or as guests as discussed above. Alternately, customer can perform an off-platform transfer (743).

Referring to FIGS. 7E-7H, sample functionality related to generation and management of electronic bills of lading allows users of system 21 to request, via the vault interface, to have the customer's DNI reissued by the carrier for various reasons, such as to allow splits or changes of destination (745). The programming permits user-friendly reissuing and related functionality by means of suitable inputs through selections through the user interface, since the verified and authenticated DNIs to be handled are readily available through the system, rather than needing to be pulled from separate sources. As such, the reissuing gives the customer at any given point in the process tight control and automates the surrendering and cancelling which may be associated with reissuing, split, change of destination, and other functionalities. As a result, there is no case where new and old originals coexist, and the likelihood of mistakes or fraud is mitigated.

The system functionality in 7E (745) includes generating a request to reissue to the carrier, generation of an associated new DNI, its signature, and invalidation of the previous DNI. Thereafter, the carrier releases the new DNI to the customer or the shipper, as appropriate for the underlying transfer of goods and commodities. Other functionalities involve transfer of the bill of lading in the form of COD or splitting, functionality for accomplishing such operations shown in FIG. 7F (reference blocks 747).

Figure 7G:
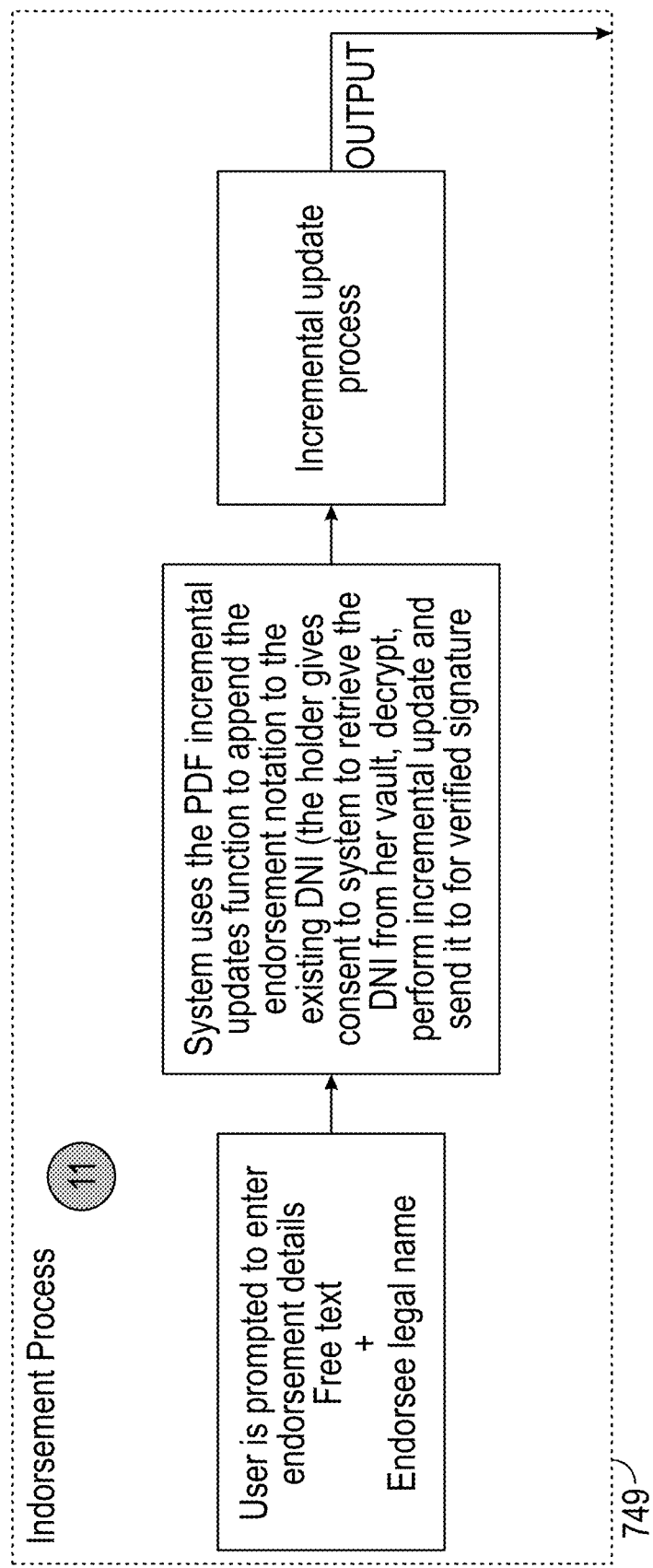
Figure 7H:
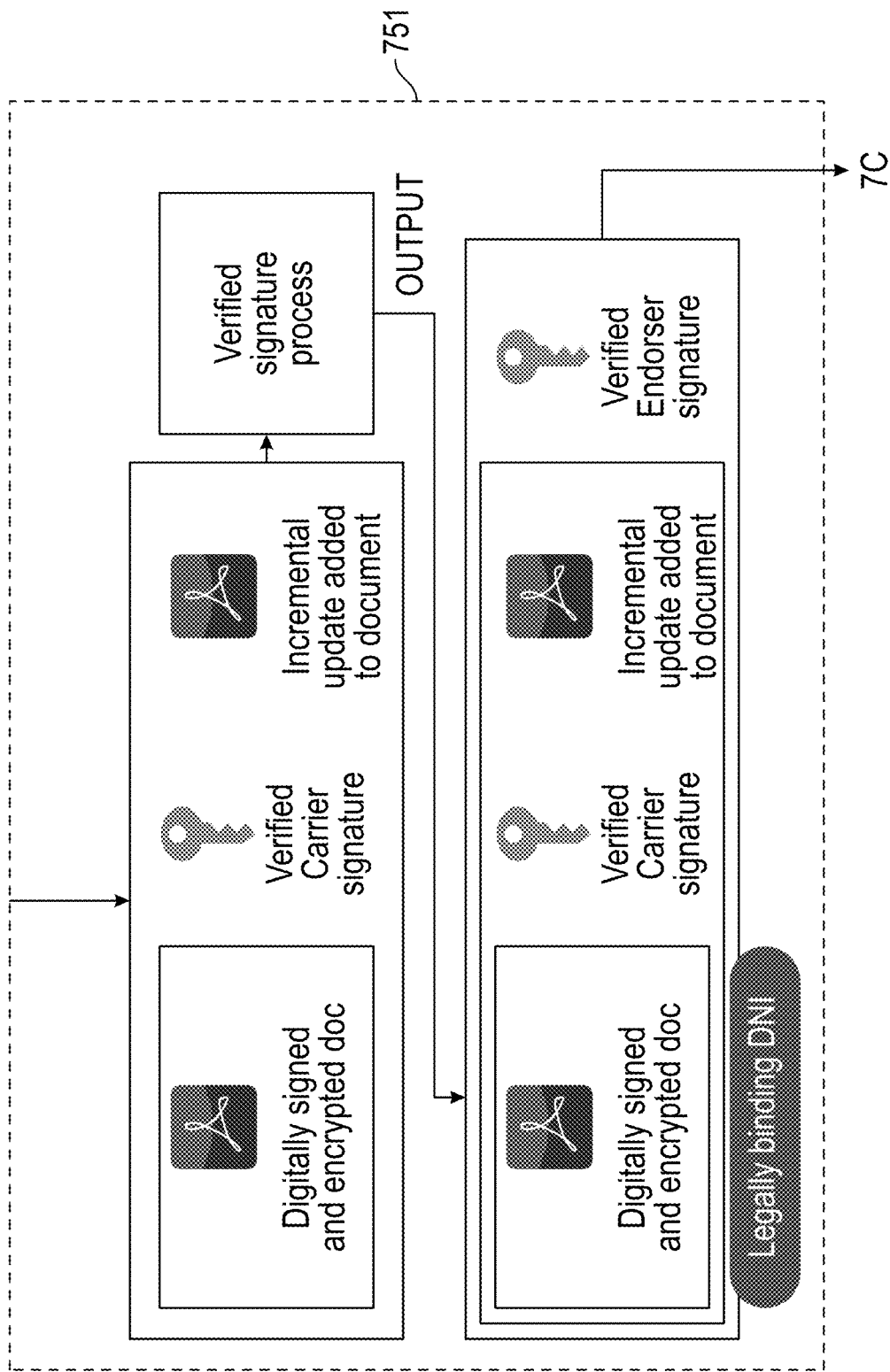

The DNI (electronic bill of lading) functionality shown in FIGS. 7A-7H likewise permits endorsement of associated DNIs (FIG. 7G, reference blocks 749). Such endorsement functionality allows the addition of signatures and remarks to the DNI, change of status of such DNI from negotiable to non-negotiable, the addition or changing of consignees, and notification of associated parties, all accomplished readily by authorized users through the associated user interface and invoking the digital signature process referenced above in FIG. 7B, as well as suitable verifications shown in the programming (751) associated with flowchart of FIG. 7H.

Figure 8A:
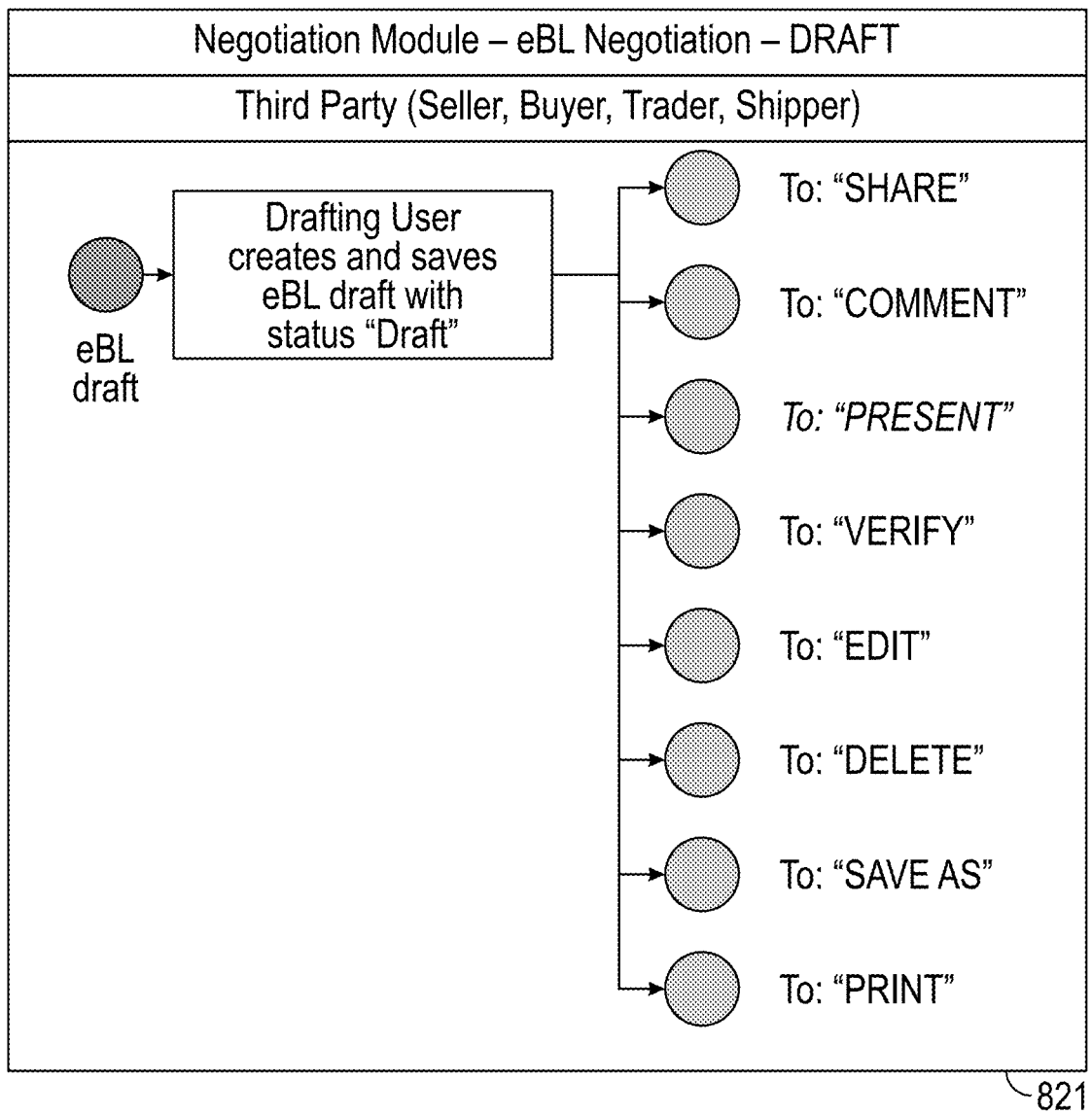
FIGS. 8A-8O are flow charts of one possible implementation of a computer process of electronic bill of lading negotiation and management in a system for international trading of goods and commodities and management thereof.
Figure 8B:
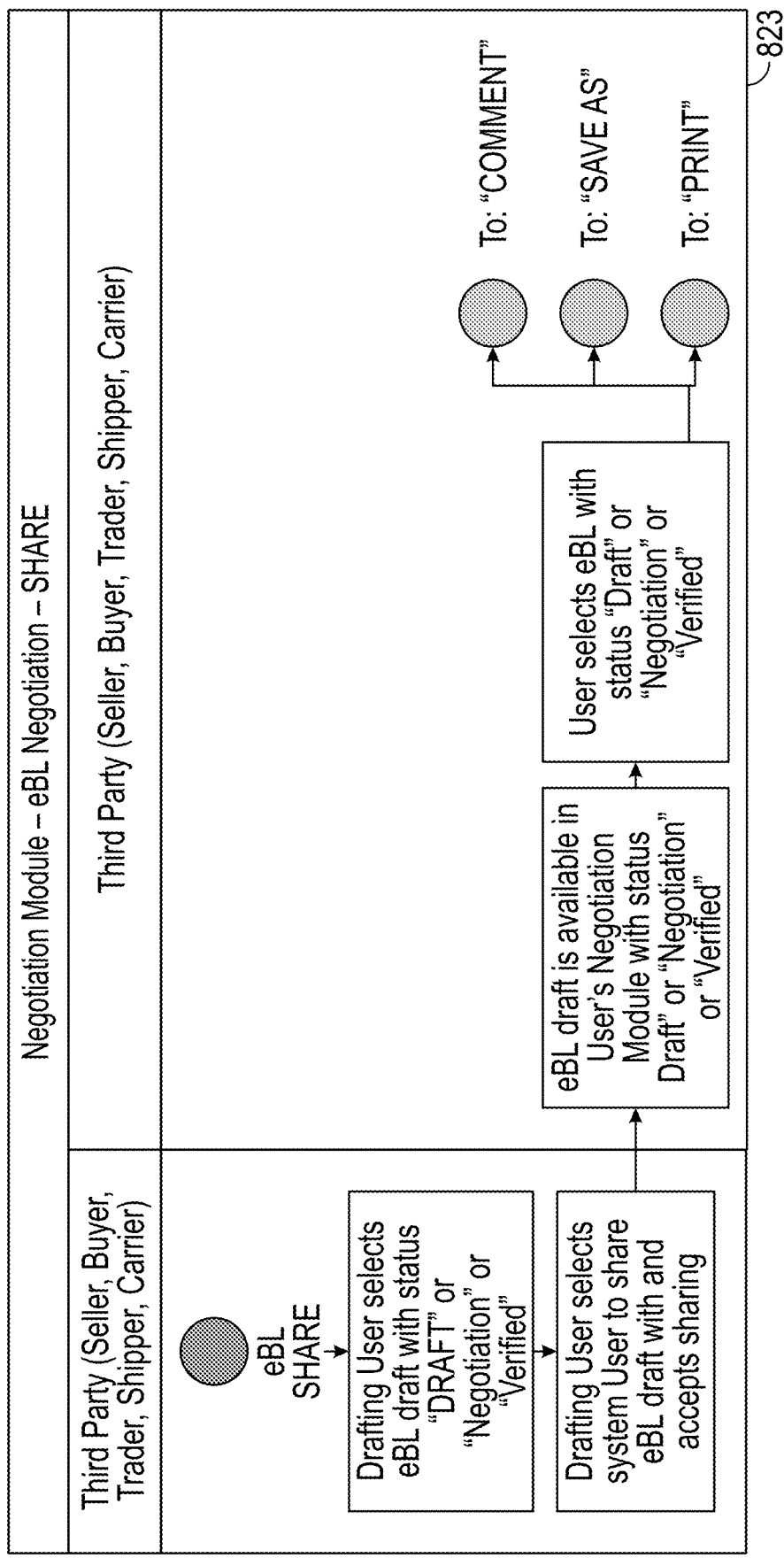
Figure 8C:
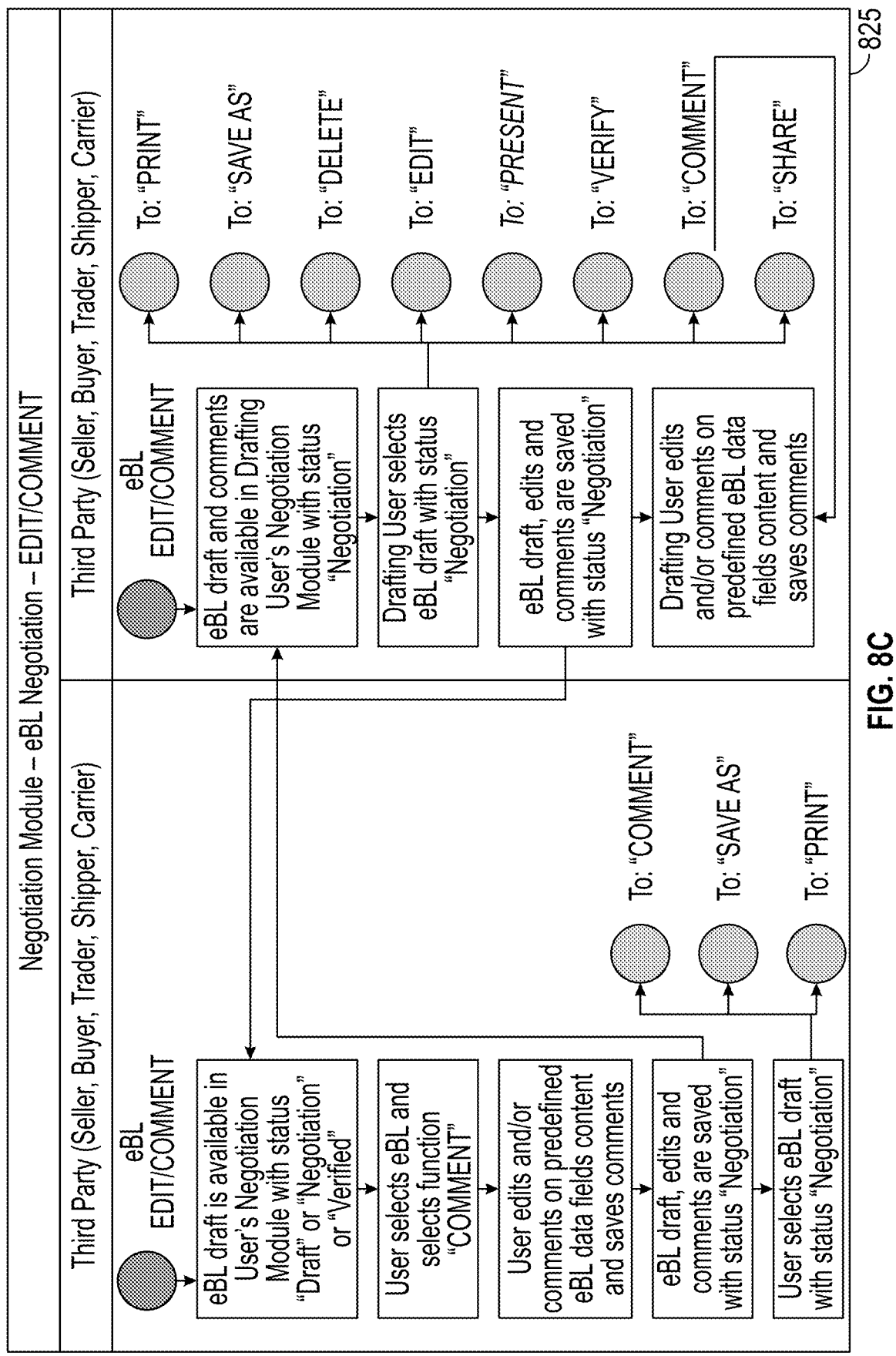
Figure 8D:
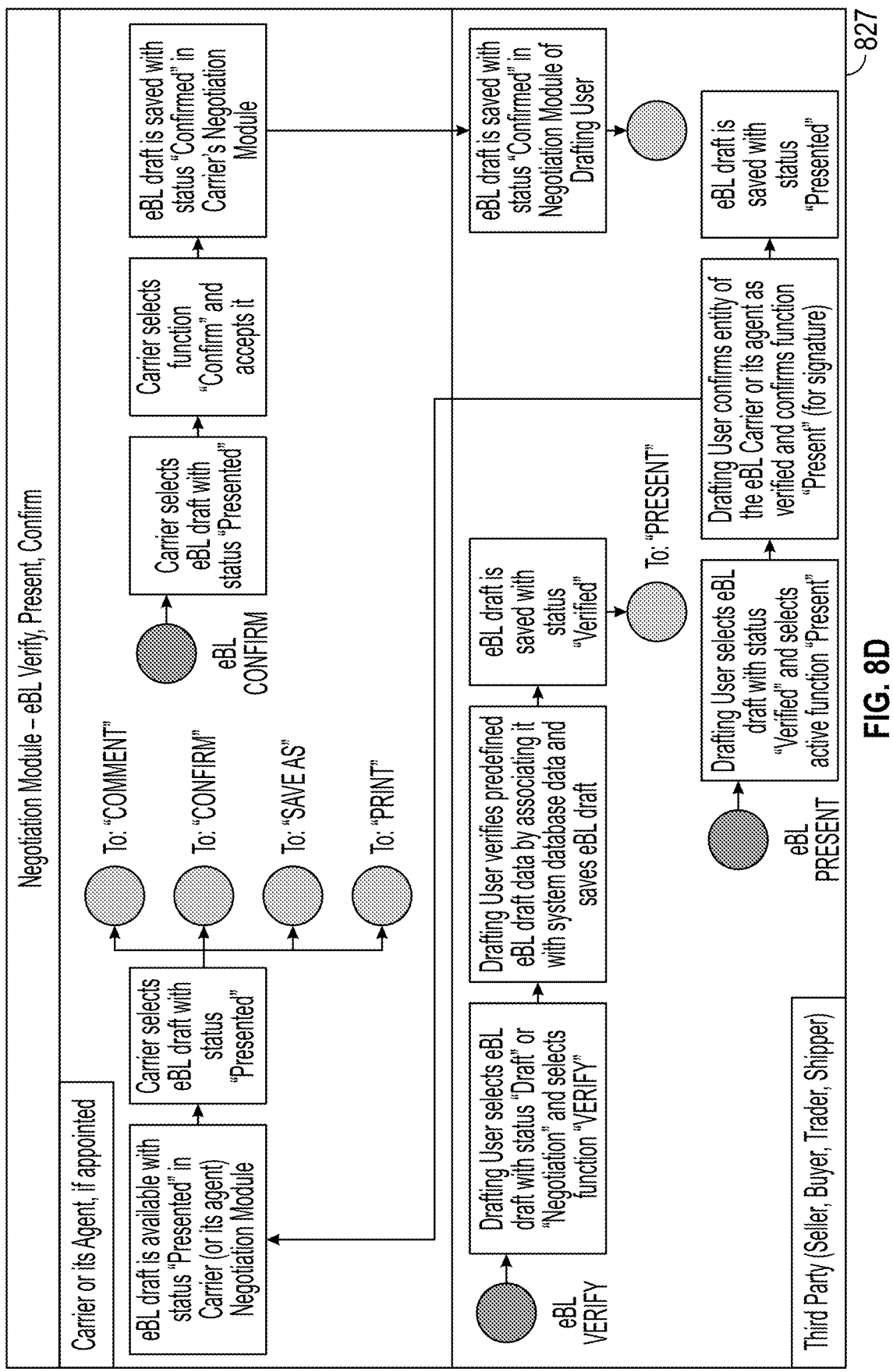
Figure 8E:
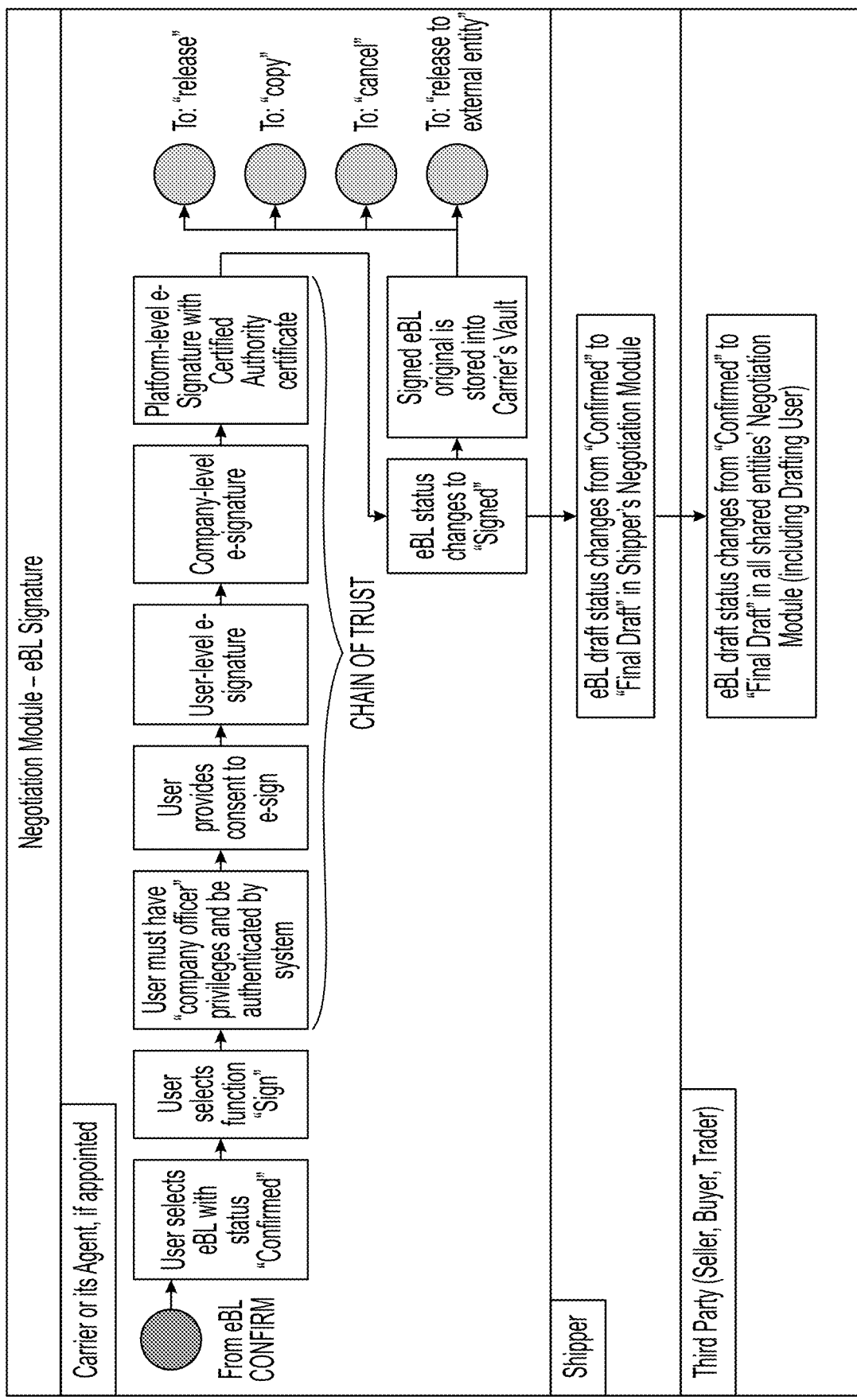

FIGS. 8A-8P are flowcharts of computer-implemented processing of electronic bill of lading negotiation and management in one suitable implementation of the disclosed system. FIGS. 8A-8P set out further details of computer programming and related subroutines for managing electronic bills of lading associated with trading transactions and doing so in a manner which is compliant with applicable regulations. The flowcharts indicate user-initiated actions related to such electronic bills of lading and programmed steps taken in response to desired eBL management functions. To that end, FIGS. 8A-8E show subroutines and programming for a negotiation module, including programming to perform the functions of drafting (821, FIG. 8A), sharing (823. FIG. 8B), commenting (825, FIG. 8C), verify/present/confirm (827, FIG. 8D), and signature (829, FIG. 8E).

Figure 8F:
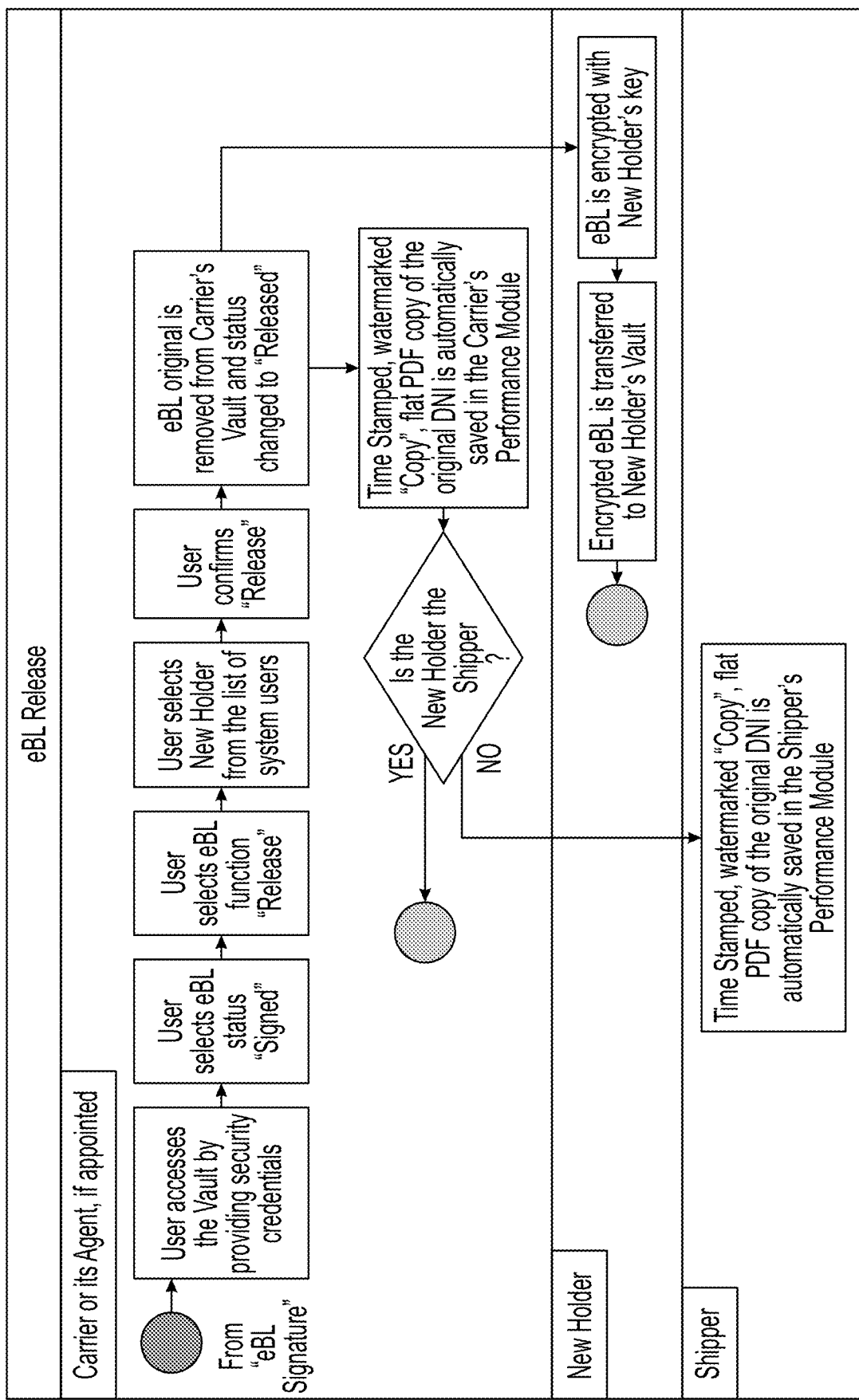
Figure 8G:
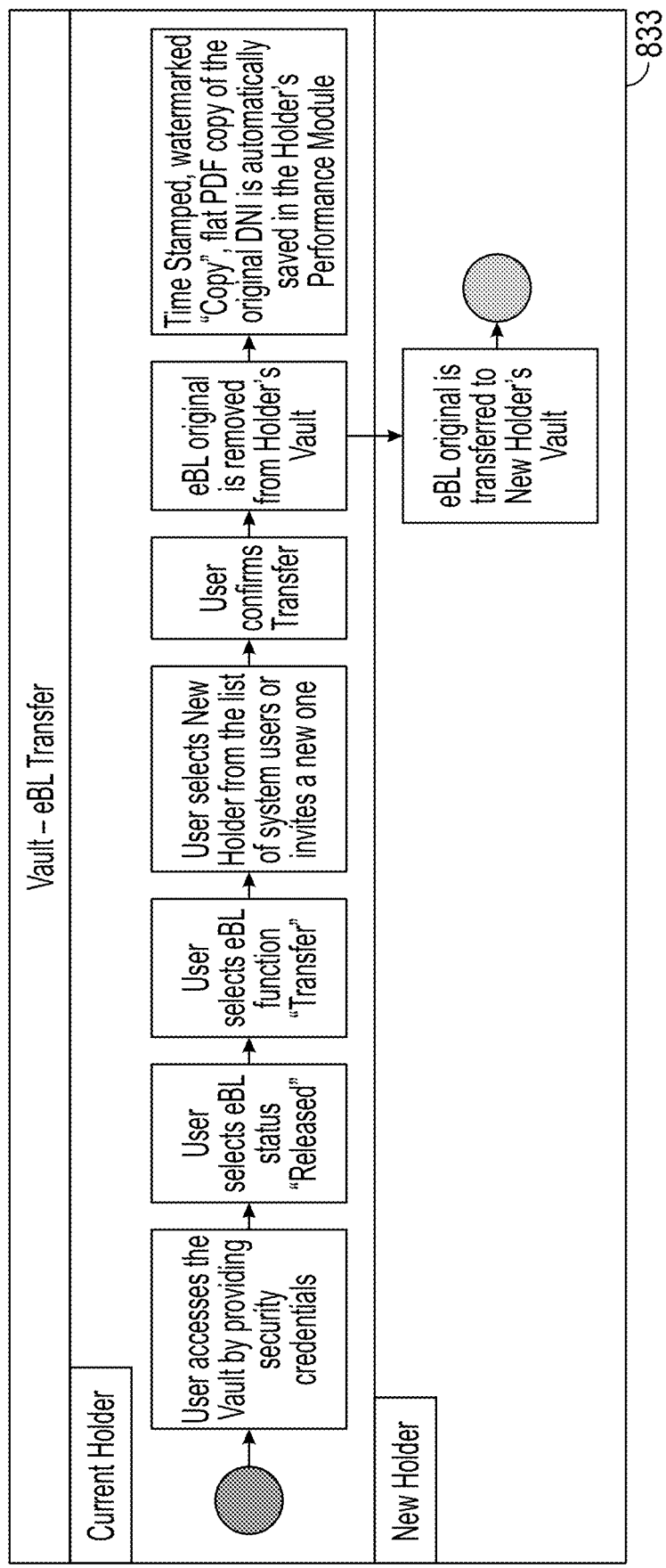
Figure 8H:
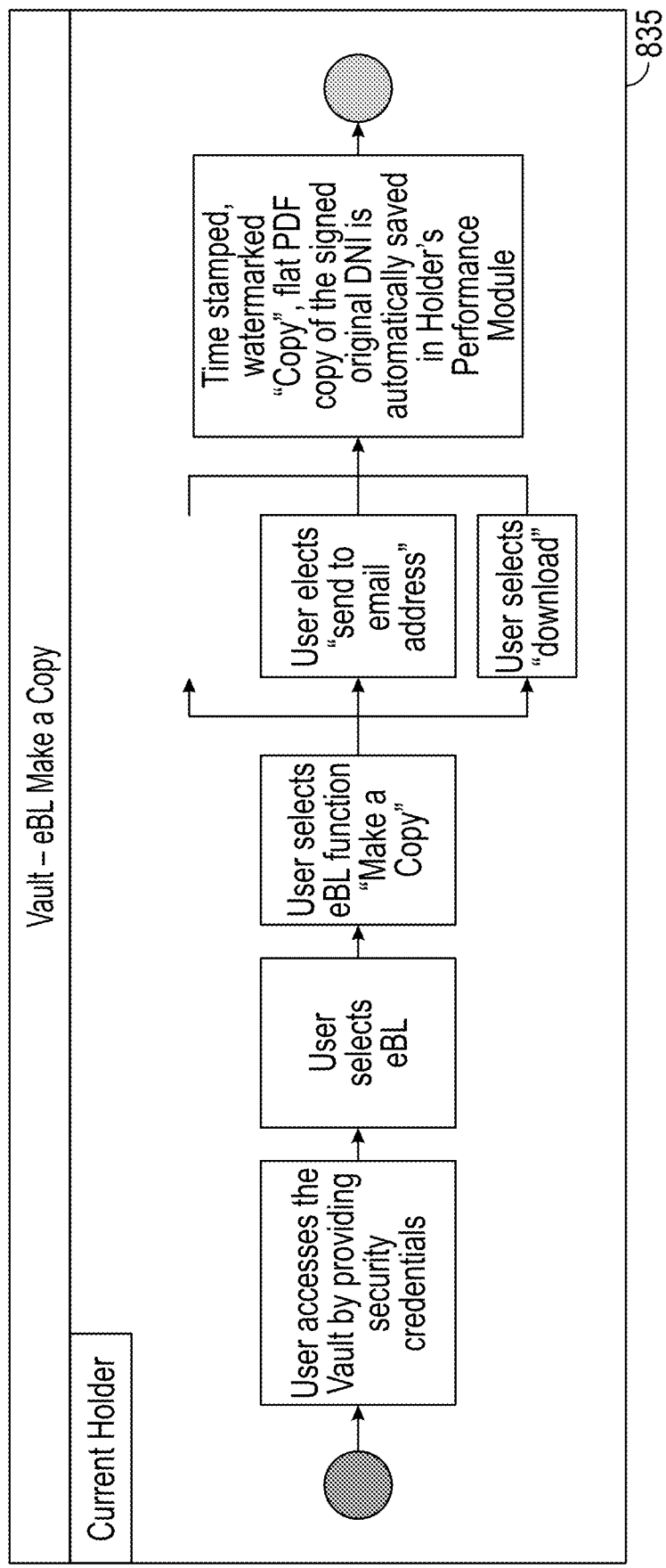
Figure 8I:
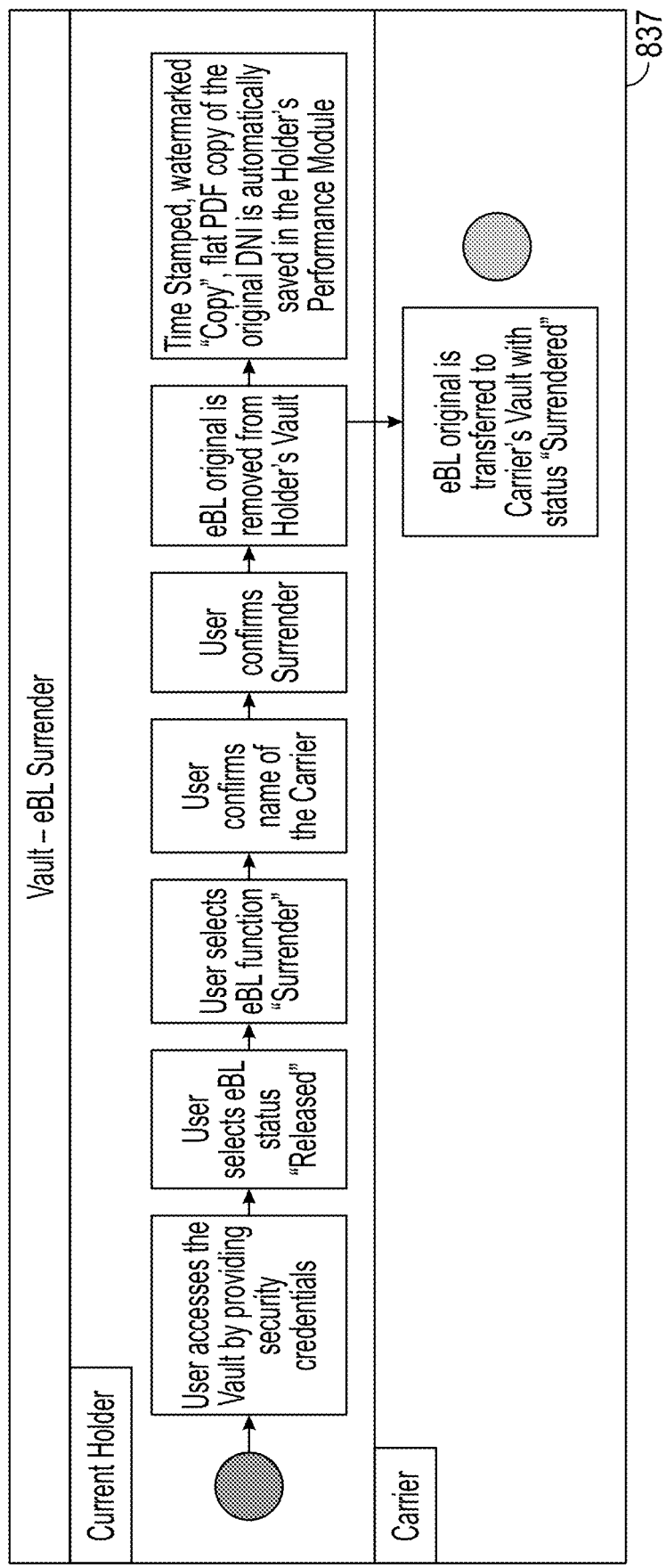
Figure 8J:
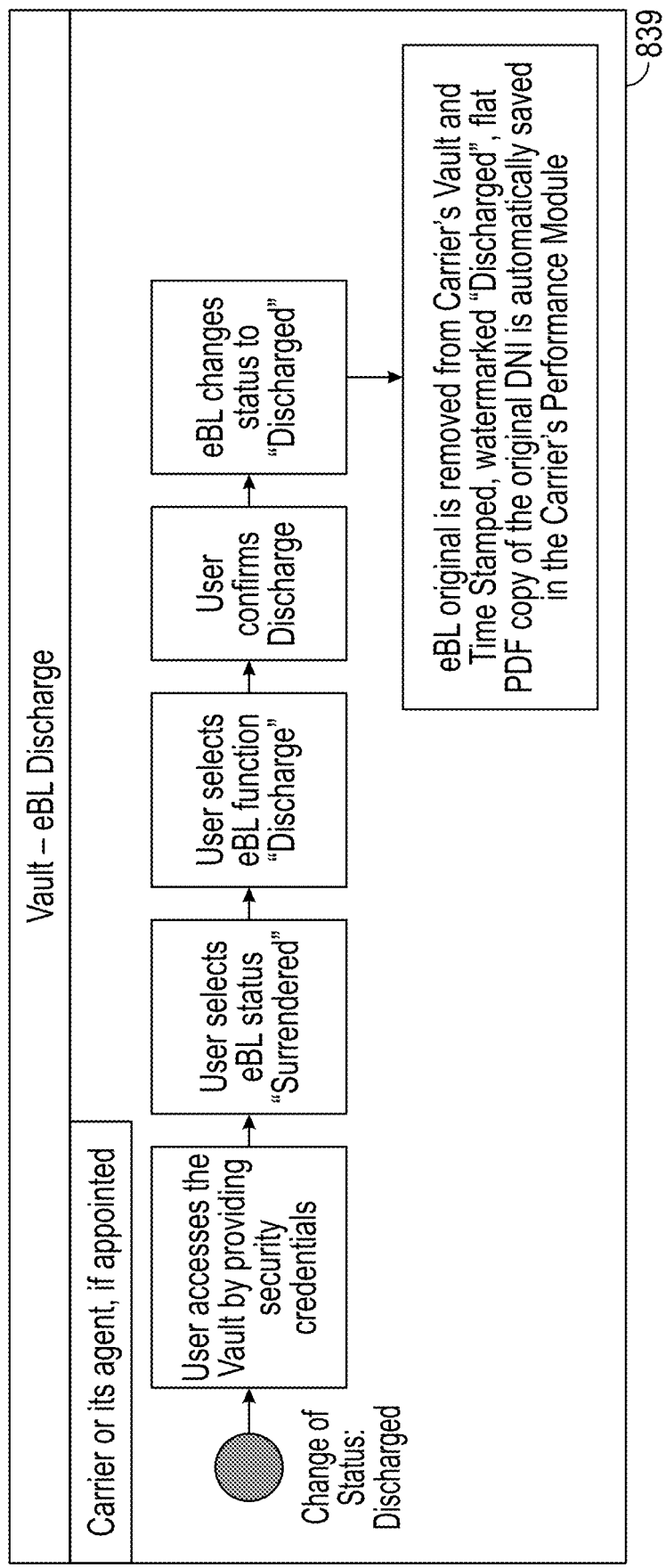
Figure 8K:
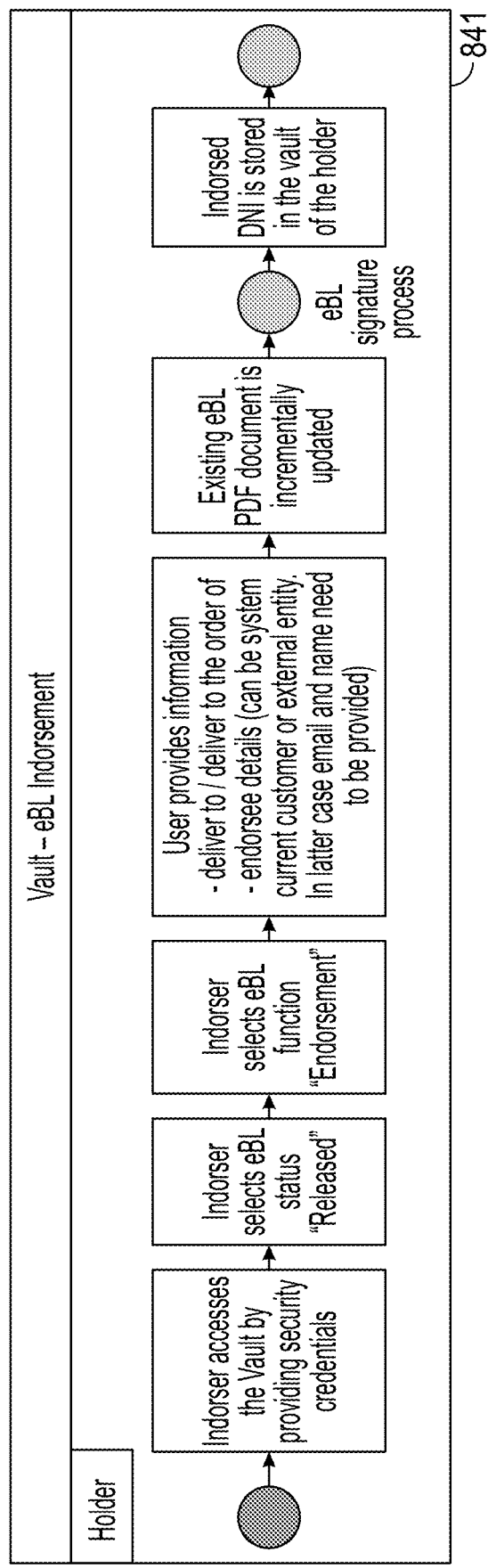
Figure 8L:
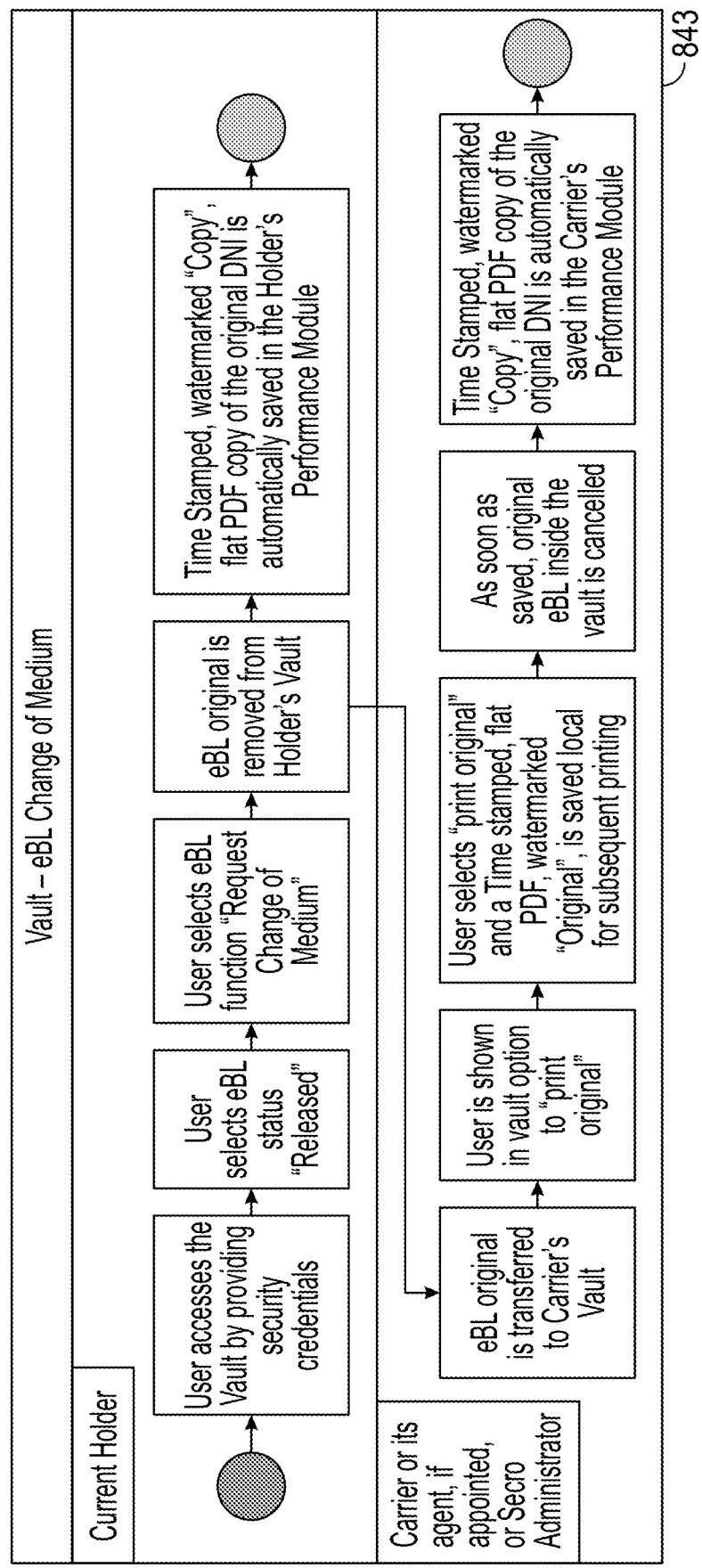
Figure 8M:
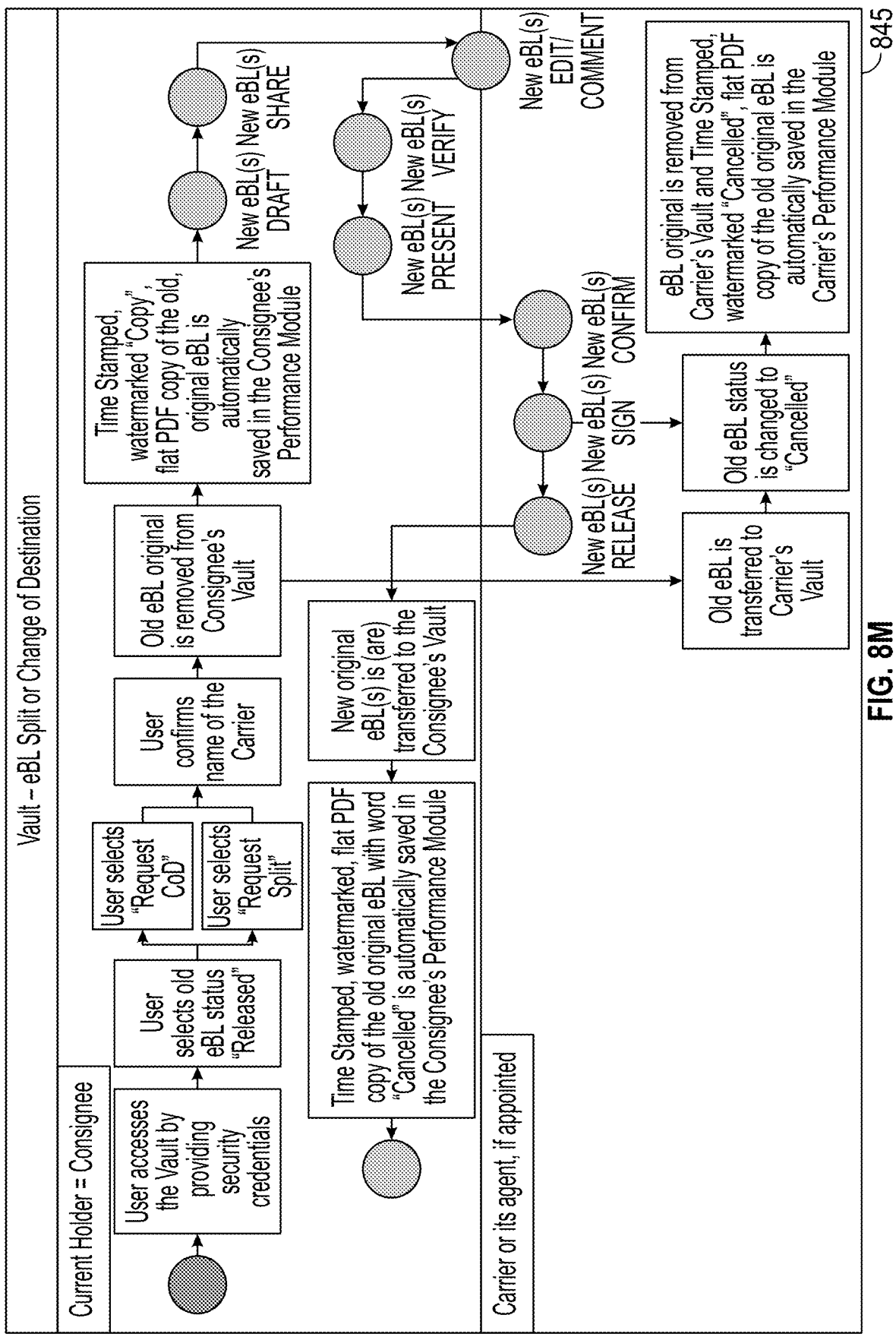
Figure 8N:
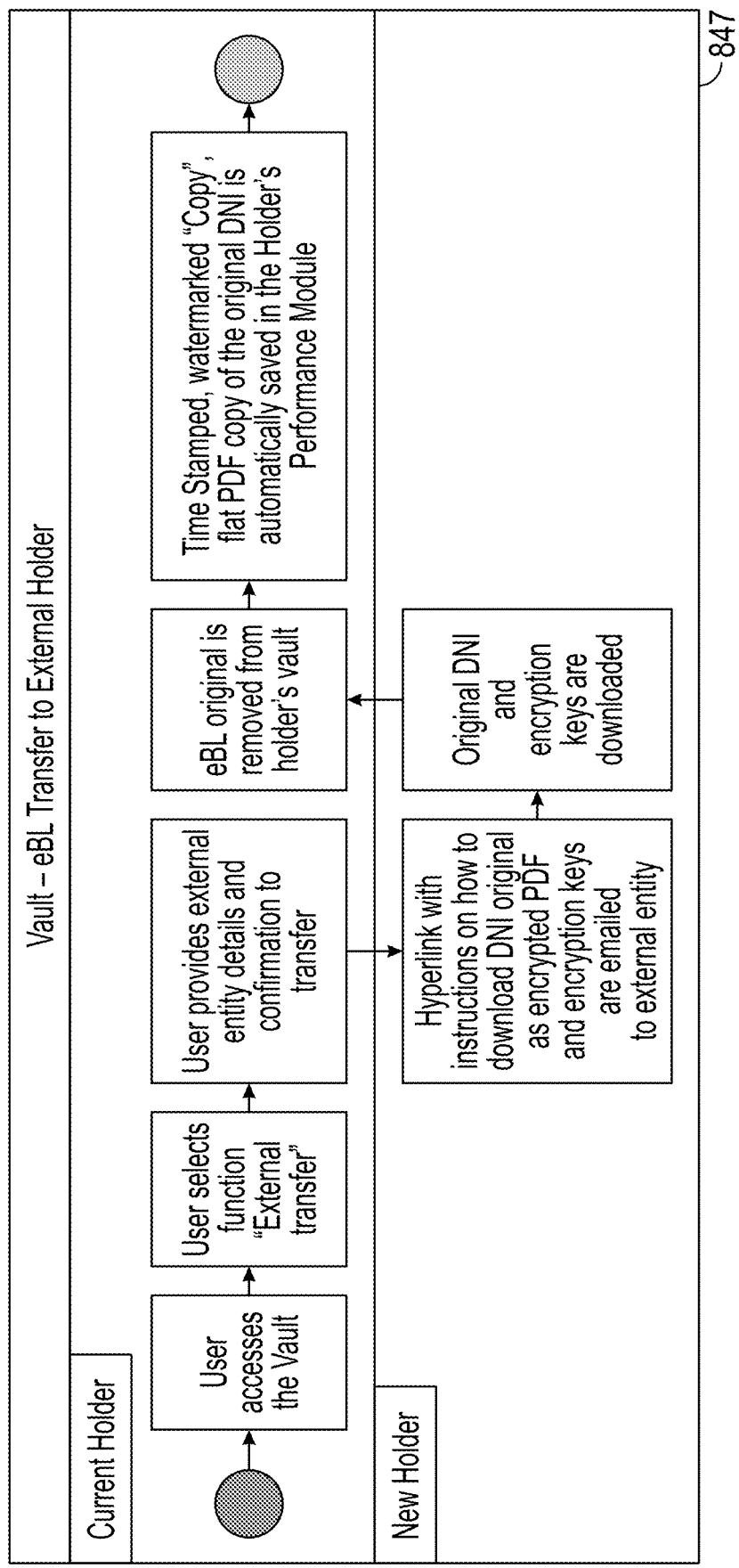
Figure 80:
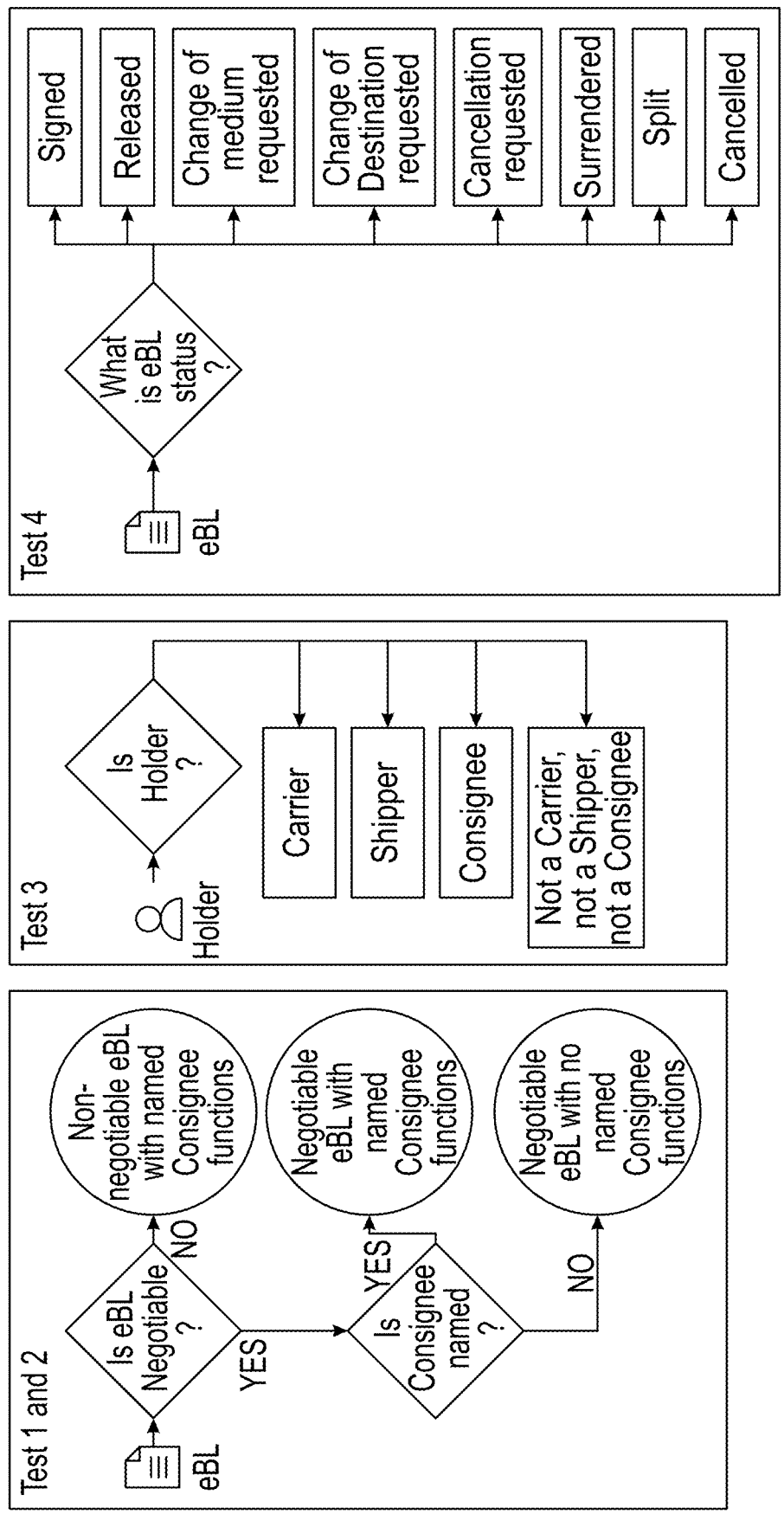

Programming and related user inputs and selections are shown in reference to the electronic bill of lading release model in FIG. 8F (reference blocks 831). Similarly, in FIG. 8G, the vault module may be selectively accessed in relation to electronic bill of lading transfer operations, as discussed previously with respect to FIGS. 7A-7H. Further details with regard to processing and associated functions accessible to a user of system 21 through the vault module are shown in FIGS. 8H-8N, including the submodules of making a copy of eBL (835, FIG. 8H), eBL surrender (837, FIG. 8I), eBL discharge (839, FIG. 8J), eBL endorsement (841, FIG. 8K), eBL change of medium (843, FIG. 8L), eBL split or change of destination (845, FIG. 8M), and eBL surrender (847, FIG. 8N).

Exemplary operations related to system 21's management of eBLs and holders of such eBLs are shown with reference to flowcharts in the form of "tests" in FIG. 8O, including system determination of whether the eBL is negotiable, and allowing certain operations depending on whether the answer to such query is yes or no (test 1 and 2), the status of the holder of the eBL and associated permissions and operations permitted depending on such status (test 3), and a series of functions available to the user dependent on the eBL status (test 4).

Figure 9A:
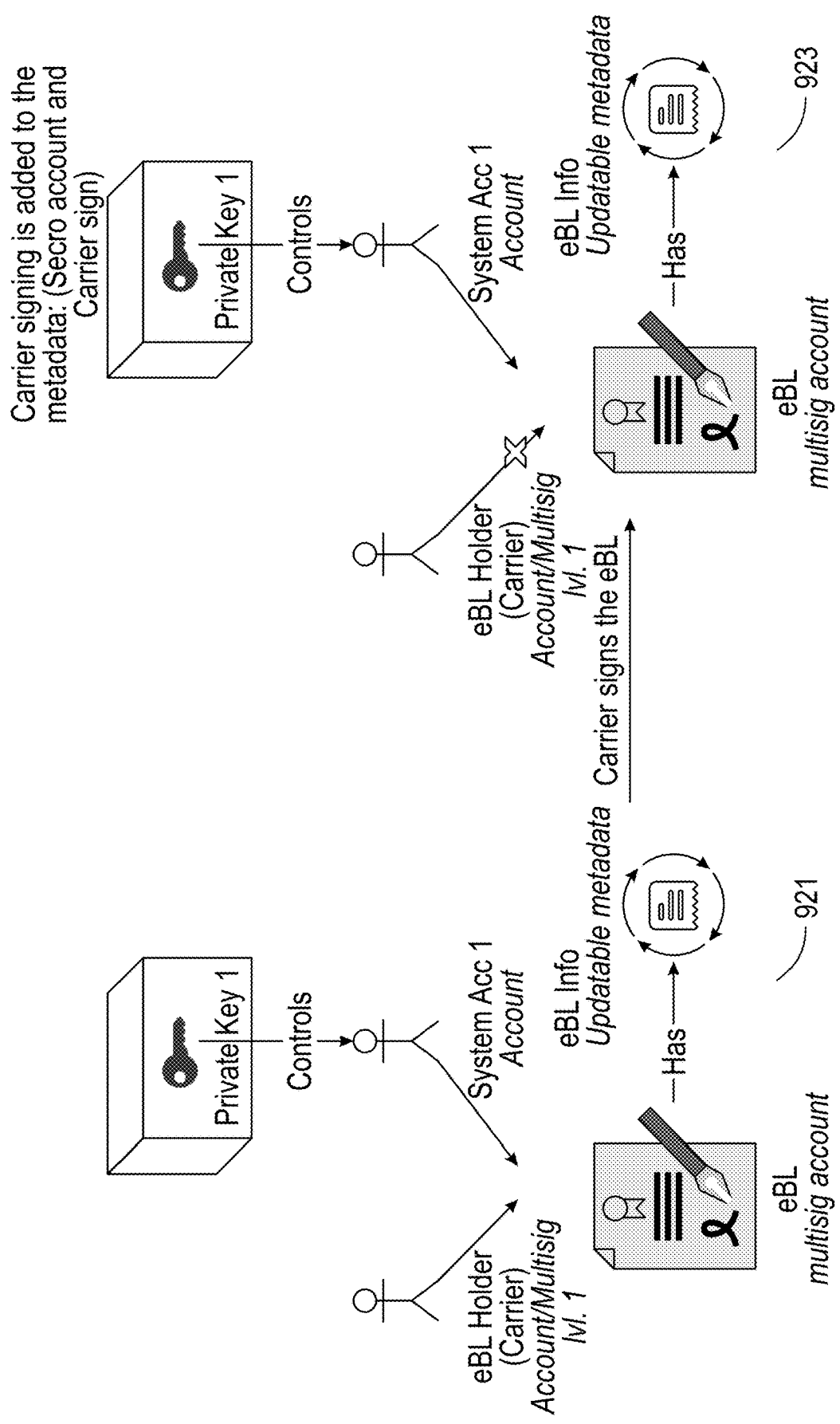
FIGS. 9A-9B are system architecture schematics of a blockchain-implemented electronic bill of lading model according to certain implementations of the systems disclosed in FIGS. 1-8 herein.
Figure 9A:
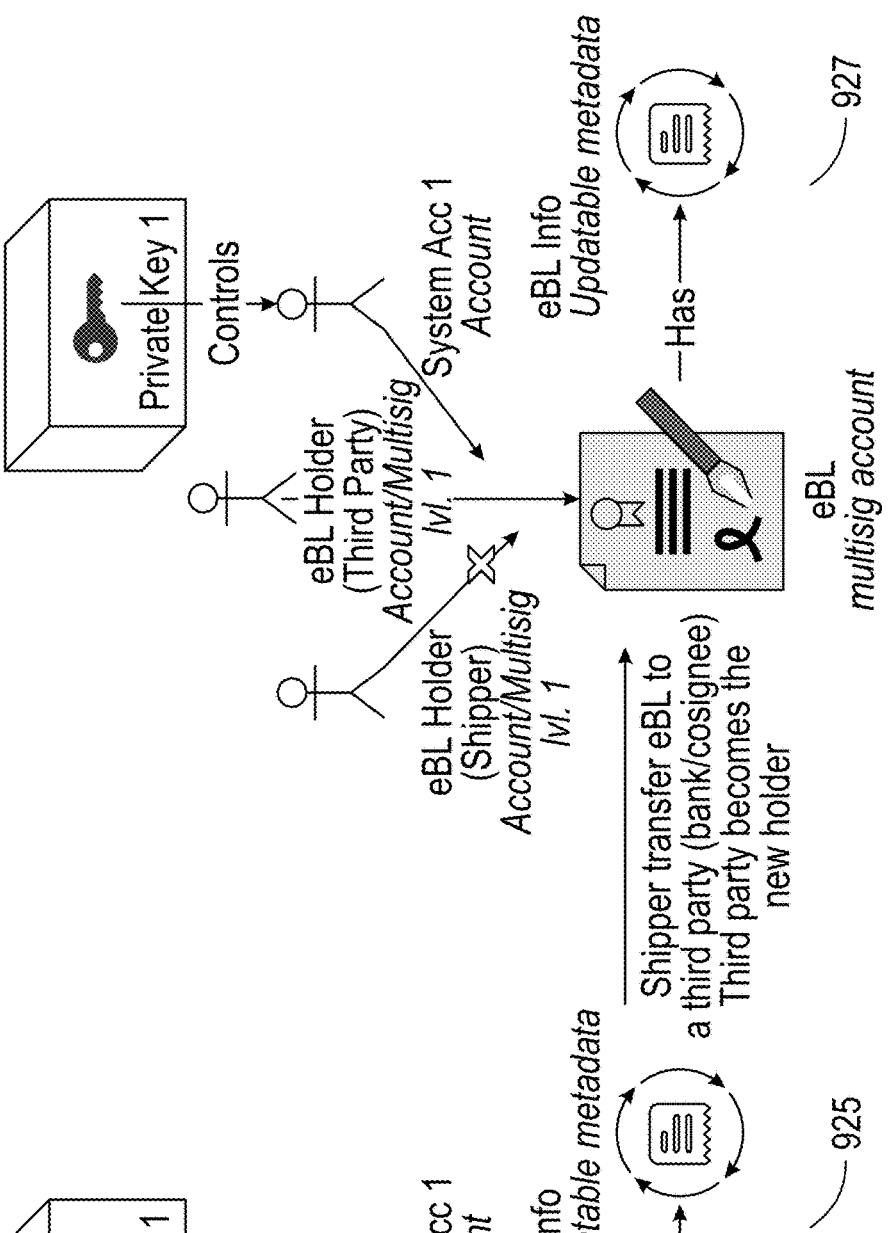
Figure 9B:
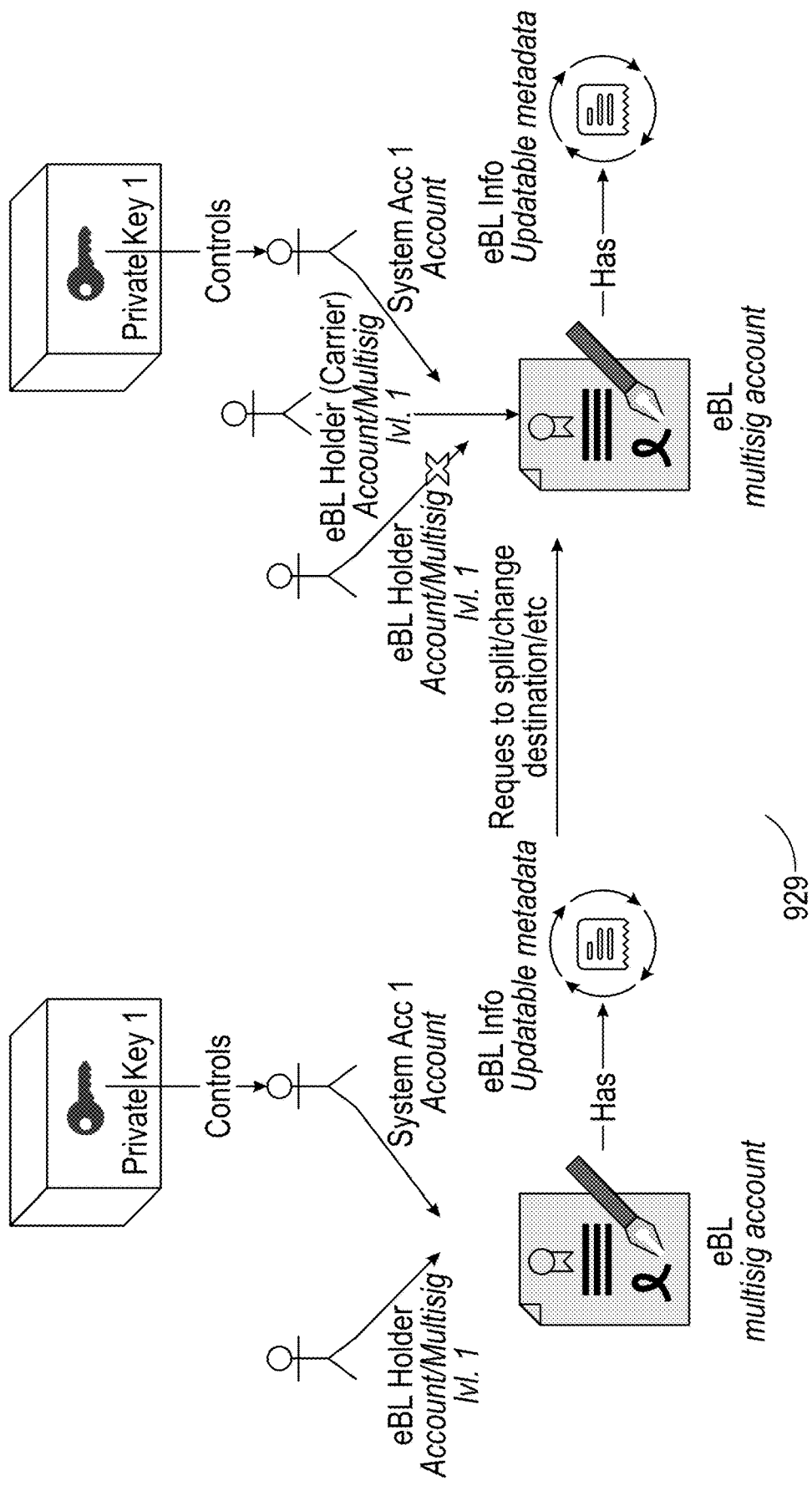

FIGS. 9A-9B are system architecture schematics of a blockchain-implemented electronic bill of lading (DNI) model in certain implementations of system 21. As seen with reference to FIGS. 9A-9B, the following information is stored on the blockchain or blockchains associated with system 21: the entities associated with the trading transaction, including records for the eBL shipper, the eBL carrier and its validated representative; companies recorded as permitted eBL consignees; one or more endorsees; and any or all of the foregoing may likewise be recorded as current or previous eBL holders entitled to access and operations associated with such status.

Blockchain of system 21 may likewise include status information including the eBL status itself; and each change to such eBL status, whether it is draft, presented, signed, released, surrendered, cancelled, or discharged, as well as negotiability status; that is, whether the status is negotiable or non-negotiable depending on the circumstances and associated transaction.

Blockchain-based information and records of this implementation of system 21 likewise include process records, such as signature records, in which signatures are associated with each action, including those of the original signature of the carrier, endorsement signatures, whether by the holder/endorser or consignee. Similarly, process records in the form of function records, such as release, transfer, surrender, change of medium, cancel, and discharge, are suitably implemented and stored on the blockchain. Encryption/decryption records are likewise on a blockchain as well as suitable timestamps for any and all of the actions above.

Blockchain implementation of system 21 likewise includes information and associated records necessary for identification of any of the foregoing parties, including IDs for consignment, shipment, charter parties, SMP contract managers, and identifications associated with the electronic bills of lading and other DNI managed by system 21. Furthermore, eBL security records, meaning decryption or encryption keys and hashes to enable or disable previous or current eBL versions are managed and stored in the blockchain.

The foregoing blockchain-based eBL management operations are discussed in more detail with reference to FIGS. 9A-9B, in the form of use cases. In the case of use case 1, FIG. 9A, user 1 is a carrier, who signs the eBL as shown in programming associated with reference blocks 921. Thereafter, once the carrier signs and releases the eBL to the shipper, such shipper becomes holder upon suitable agreement (923). Thereafter, depending on the details of the associated trading transaction, the shipper decides to transfer the electronic bill of lading to a third party, such as a bank or other consignee (925). Still further, such third party may transfer the eBL to the vault module and its associated storage as discussed previously and becomes the currently authorized holder of the associated eBL or other DNI (927). The encrypted blockchain-recorded eBL and its associated MultiSig account is suitably updated for processes 921-927, information stored as metadata of an object and the mosaic of blockchain-related components associated with suitable MultiSig accounts with keys stored in separate places.

Programming operations and related functions implemented by the blockchain-based electronic bill of lading management is shown in another series of operations, termed use case 2, in which system 21 includes programming to handle requests from the holder to perform the following management operations associated with the electronic bill of lading: split, change of destination, cancel, surrender, change the medium of the eBL (i.e., conversion to paper), or send the eBL out-of-system in the form of an encrypted PDF. When the holder of the eBL decides to perform any of the above-mentioned functions, through suitable inputs, the programming of system 21 sends back the electronic bill of lading to the attention of the carrier (reference blocks 929, FIG. 9B), and the system gives such carriers suitable access and permissions through user input interfaces to perform the requested functions. For example, the carriers noted in the metadata as the current holder after such request is received, as well as the associated MultiSig account, may be modified such that the current holder is removed and replaced with the carrier having requisite authorization to modify the electronic bill of lading or other DNI. The foregoing handoff to the carrier is managed by suitable programming to record consent of both holder and carrier to the request for such modification.

The process steps for endorsement of the eBL, discussed with reference to FIGS. 7A-7H and 8A-8O, are now discussed with reference to blockchain-based implementations of system 21. As in the case of FIG. 9A, the buyer in this case is the holder and decides to endorse the eBL in an operation involved with trading of goods and commodities. Upon such decision to endorse by the buyer, front-end modules of system 21 incrementally update the original electronic bill of lading in the form of a PDF and add any new information, such as that associated with the endorsement, such as a new consignee, and suitable programming to operate a signature process is executed. To that end, buyer adds a new signature to the eBL next to endorsement information, specifies a new consignee of the associated electronic bill of lading, and the information is suitably recorded in the blockchain. In this case, the buyer may remain a holder but there is a change of the consignee and the addition of a signature associated with such endorsement. Programming and steps associated with endorsement permit the current holder to agree to the endorsement or change in the eBL associated with such endorsement, and there is not a requirement for a separate agreement between the parties associated with such endorsement in this scenario.

There may be a use case of a change of status of the electronic bill of lading and its associated blockchain-implemented processing in which actions from one specific user trigger a change of status, such as cancellation, surrender, or completion. Such change of status may occur after a request to split or change destinations or at other points in the trading transaction where the foregoing status changes have occurred. Status changes may be triggered by the programming of system 21 in response to input from the carrier in connection with endorsements.

Figure 10:
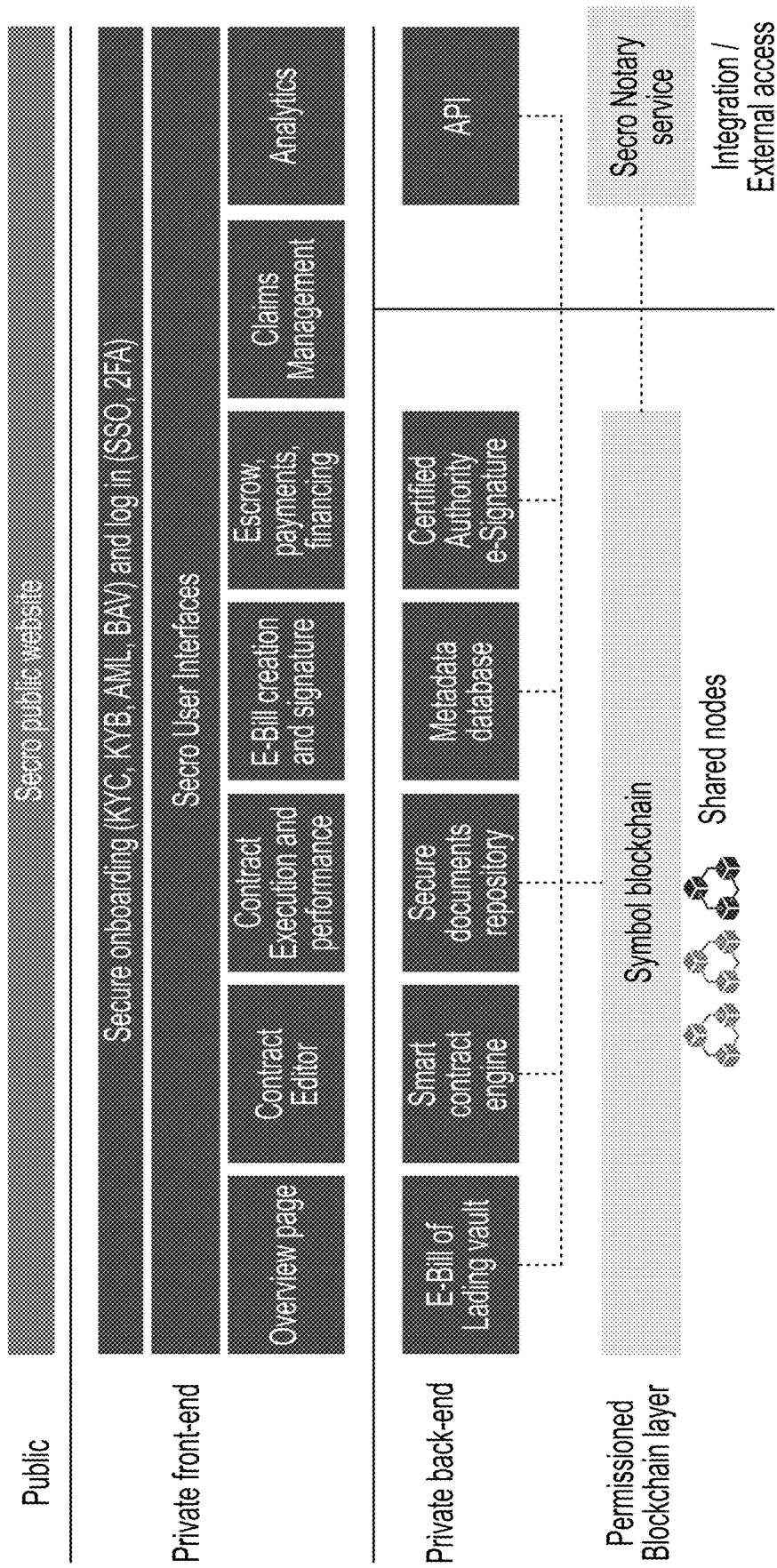
FIG. 10 is an architectural schematic of another possible implementation of a system for international trading of goods and commodities and management thereof, along with related methods.

FIG. 10 is an architecture schematic of system 21 in an implementation that is compliant with digital trade laws, including the Singapore Electronic Transaction Act, amendments to the Singapore Electronic Transactions Act on 19 Mar. 2021 and the UK Electronic Trade Documents Act 2022. Such laws are intended to implement the UNCITRAL Model Law on Electronic Transferable Records, as adopted by the United Nations Commission on International Trade Law (UNCITRAL) on 13 Jul. 2017, to enable the creation and use, domestically and internationally, of electronic forms of transferable documents or instruments, otherwise known as "electronic transferable records." This implementation of system 21, as detailed below in reference to FIGS. 10 and 11A-11I, and in accordance with the blockchain-based architecture discussed in FIGS. 1-9B, is compliant with the requirements of the Singapore Electronic Transactions Act, including the 2021 amendments introduced as a new Part 16 of the Singapore Electronic Transactions Act and the UK Electronic Trade Documents Act 2022

FIGS. 11A-11I comprise a table setting out the programming of system 21 discussed in reference to FIGS. 1-10 herein, which, when implemented by blockchain as described herein, when implemented by equivalent secure protocols now known or to be developed, may be deemed by regulators or other trade authorities, such as those in Singapore and UK, to comply with security and other requirements of electronic transactions, including transactions for trading goods and commodities and electronic bills of lading. Accordingly, system 21 may be suitably configured as set out herein to lead to appropriate certification by government authorities as compliant with applicable regulations, including such Singapore Electronic Transactions Act, as amended on Mar. 19, 2021 and the UK Electronic Trade Documents Act 2022.

Computer System Hardware and Software

System 21 may be implemented on any suitable computer platform, using either stand-alone or networked architecture. Personal electronic devices and related processors, other hardware, and software are likewise considered computers for purposes of this disclosure and may comprise some or all of the platform system and programming. In one version, there may be one or more stations, modules, subroutines, terminals, interfaces and the like, any or all of the foregoing in communication with a database or other data storage means, one or more servers or processors, either through a local-area or wide-area network, world-wide web or other internet based communications systems.

A client-server architecture using the world-wide web may also be used. In the event computer work-stations are involved, whether as stand-alone versions of system 10 or as housing subsystems 25, such workstations may comprise a computer system which includes a processor (e.g., a central processing unit (CPU), a graphics processing unit (GPU, or both), a main memory and a static memory, which communicate with each other via a bus. The computer system may further include a video display unit (e.g., a liquid crystal display (LCD), a flat panel, a solid state display, or a cathode ray tube (CRT)). The computer system may include an input device (e.g., a keyboard), a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, or within the processor, or a combination thereof, during execution thereof by the computer system. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs in the broad sense to include, without limitation, computer coding, microcode, firmware, or other programming, such software running on a computer processor or other microprocessor. Furthermore, software implementations can include distributed processing or component/object distributed processing, parallel processing, or visual machine processing can also be constructed to implement the methods described herein. The instructions may further be transmitted or received over the communications network via the network interface device.

While the machine-readable medium is in the singular, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Accordingly, the specification and drawings are to be regarded in an illustrative rather than a restrictive sense.

What is claimed is:

1. A computer-implemented method of securely processing electronic transferable records, such as a digital negotiable instrument (DNI), such electronic transferable records associated with exchanging at least one of goods and commodities, the method comprising the computer-implemented steps of:
   generating an encrypted corporate certificate and associated keys in response to system administrator input, storing the corporate certificate in computer-accessible storage, and requiring renewal of the certificate at least every two years from date of generation of the certificate;
   verifying persons permitted to invoke the processing of the electronic transferable records by comparing inputted personal information to a security standard, wherein the verifying also includes two-factor authentication;
   establishing verified persons, the verified persons selected from the group consisting of a holder, a charter party, a shipper, a carrier, and an endorser;
   securing electronic signatures of respective ones of the verified persons;
   generating a respective one of the digital negotiable instruments for a respective goods and commodities transaction in response to inputs from at least one of the shipper and the carrier, the inputs corresponding to the steps of:
      (a) generating a DNI draft identified with a corresponding one of the electronic transferable records, establishing a holder of the DNI draft, the holder being one of the verified users, requesting performance of obligations of the DNI draft, wherein generating the DNI draft includes identifying the verified persons authorized to control the corresponding electronic transferable record, and preventing unauthorized replication of the DNI draft; and
      (b) generating an executed DNI from the DNI draft, wherein the executed DNI has an associated encryption and signature key architecture, the executed DNI being generated by encrypting the DNI draft, restricting access to the encrypted DNI by generation of user keys associated with the DNI draft, and verifying signatures of the verified users associated with the DNI draft and the executed DNI, wherein the inputs are stored on a blockchain ledger;
   storing the executed DNI in a customer exclusive object storage vault associated with a vault encryption key on a cloud infrastructure;
   endorsing the executed DNI in response to user input, wherein the endorsing step includes:
      (a) receiving as user input digital information corresponding to an endorser; and
      (b) updating the executed DNI to append an electronic endorsement notation thereto upon execution by the endorser;
   at least one of releasing, transferring, and surrendering of the executed DNI to create a new holder of the executed DNI and a previous holder of the executed DNI;
   wherein the step of performing at least one of releasing, transferring, and surrendering the endorsed DNI includes decrypting the executed DNI and assigning the executed DNI to the new holder in response to user input from the previous holder, and transferring the executed DNI to a second customer object storage vault corresponding to the new holder and generating a new holder private key associated with the new holder, wherein access to the executed DNI by the previous holder is terminated;
   restricting access by users other than the verified users by preventing verification of the executed DNI by any of the verified users other than the holder;
   verifying authenticity of the executed DNI by performing notary steps, the notary steps comprising timestamping of the executed DNI, and authenticating content and signature of the executed DNI by QR code;
   reissuing the executed DNI by performing the steps of cancellation of the electronic transferable record corresponding to the executed DNI to create a cancelled DNI, generating a second DNI draft identical to the cancelled DNI; and transferring the DNI draft to a second new holder upon generating a second executed DNI;
   maintaining immutability of the executed DNI by use of the blockchain ledger recording every processing step done on the executed DNI;
   authorizing at least two contracting parties comprising a party A and a party B to access the blockchain ledger through a computer-implemented gateway;

storing first data values corresponding to contract status states on the blockchain ledger, the first data values corresponding to contract statuses, the contract statuses including an executed state, an in-process state, and a terminated state;

processing inputs from the two contracting parties to generate second data values corresponding to contract events, the data values comprising metadata stored on the blockchain ledger, the contract status and the contract events corresponding to a predetermined signed contract associated with a goods and commodities transaction;

storing the second data values of the contract events as metadata on the blockchain ledger;

permitting user access to the metadata of the contract events only upon validation of user-inputted credentials to create validated users, the validated users including at least the party A and the party B; and updating the second data values in response to input from at least one of the validated users to assign an event status indicator to a corresponding one of the contract events, the event status indicators including third data values corresponding to a non-executed event, an executed event, a validated event, and a non-validated event.

2. The method of claim 1, wherein the steps of generating the first and second data values further comprise generating data corresponding to a sale and purchase agreement; and wherein the step of processing inputs for contract events further comprises processing inputs corresponding to five data files having data of five corresponding contracts, the five contracts associated by suitable computer-readable indicia with a single corresponding transaction for goods and commodities, the five contracts including the sale and purchase agreement;

two, party-B-charter-party agreements, and two, electronic bills of lading between the party A and at least one vessel owner.

3. The method of claim 2, wherein the steps of generating the second data values and updating the second data values corresponding to the contract events include the steps of generating and updating second data values corresponding to consignments, shipments, vessels, and voyages corresponding to the goods and commodities transaction.

4. The method of claim 1, wherein the step of verifying the persons permitted to invoke the processing of the electronic transferable records includes the step of using at least one method selected from the group consisting of KYC, KYB, AML, and Bank Account Verification.

5. The method of claim 3, further comprising computer-implemented steps of:
(a) positively verifying permission of one of the verified users so as to define a drafting user, the drafting user being permitted to access electronic bill of lading templates stored in a secured database;
(b) permitting access to a selected one of the templates in response to first input by the drafting user;
(c) generating a draft electronic bill of lading for the respective goods and commodities transaction in response to second input; and
(d) sharing the draft electronic bill of lading with one of the verified users other than the drafting user, thereby defining a negotiating user, and receiving third input from the negotiating user corresponding to modifications to the draft electronic bill of lading, the modifications being received and identified as at least one of comments, save as, and print;

(e) wherein the negotiating user comprises a carrier, the system, and in response to receiving fourth inputs from the carrier, updating status of the draft electronic bill of lading to a status of confirmed.

6. The method of claim 5, wherein the step of generating the draft electronic bill of lading comprises the steps of verifying, in response to user selection, predefined electronic bill of lading draft data by associating the predefined draft data with goods and commodities transaction data separately stored; and wherein the step of sharing the draft electronic bill of lading comprises the step of confirming, in response to user selection, status of the negotiating user as one of the verified users.

7. A computer-implemented system of securely processing electronic transferable records, such as a digital negotiable instrument (DNI), such electronic transferable records associated with exchanging at least one of goods and commodities, the system comprising programming and at least one processor capable of performing the following steps:

generating an encrypted corporate certificate and associated keys in response to system administrator input, storing the corporate certificate in computer-accessible storage, and requiring renewal of the certificate at least every two years from date of generation of the certificate;

verifying persons permitted to invoke the processing of the electronic transferable records by comparing inputted personal information to a security standard, wherein the verifying also includes two-factor authentication;

establishing verified persons, the verified persons selected from the group consisting of a holder, a charter party, a shipper, a carrier, and an endorser;

securing electronic signatures of respective ones of the verified persons;

generating a respective one of the digital negotiable instruments for a respective goods and commodities transaction in response to inputs from at least one of the shipper and the carrier, the inputs corresponding to the steps of:

(a) generating a DNI draft identified with a corresponding one of the electronic transferable records, establishing a holder of the DNI draft, the holder being one of the verified users, requesting performance of obligations of the DNI draft, wherein generating the DNI draft includes identifying the verified persons authorized to control the corresponding electronic transferable record, and preventing unauthorized replication of the DNI draft; and (b) generating an executed DNI from the DNI draft, wherein the executed DNI has an associated encryption and signature key architecture, the executed DNI being generated by encrypting the DNI draft, restricting access to the encrypted DNI by generation of user keys associated with the DNI draft, and verifying signatures of the verified users associated with the DNI draft and the executed DNI, wherein the inputs are stored on a blockchain ledger;

storing the executed DNI in a customer exclusive object storage vault associated with a vault encryption key on a cloud infrastructure;

endorsing the executed DNI in response to user input, wherein the endorsing step includes:
(a) receiving as user input digital information corresponding to an endorser; and
(b) updating the executed DNI to append an electronic endorsement notation thereto upon execution by the endorser;

at least one of releasing, transferring, and surrendering of the executed DNI to create a new holder of the executed DNI and a previous holder of the executed DNI;

wherein the step of performing at least one of releasing, transferring, and surrendering the endorsed DNI includes decrypting the executed DNI and assigning the executed DNI to the new holder in response to user input from the previous holder, and transferring the executed DNI to a second customer object storage vault corresponding to the new holder and generating a new holder private key associated with the new holder, wherein access to the executed DNI by the previous holder is terminated;

restricting access by users other than the verified users by preventing verification of the executed DNI by any of the verified users other than the holder;

verifying authenticity of the executed DNI by performing notary steps, the notary steps comprising timestamping of the executed DNI, and authenticating content and signature of the executed DNI by QR code;

reissuing the executed DNI by performing the steps of cancellation of the electronic transferable record corresponding to the executed DNI to create a cancelled DNI, generating a second DNI draft identical to the cancelled DNI; and transferring the DNI draft to a second new holder upon generating a second executed DNI; and maintaining immutability of the executed DNI by use of the blockchain ledger recording every processing step done on the executed DNI;

authorizing at least two contracting parties comprising a party A and a party B to access the blockchain ledger through a computer-implemented gateway;

storing first data values corresponding to contract status states on the blockchain ledger, the first data values corresponding to contract statuses, the contract statuses including an executed state, an in-process state, and a terminated state;

processing inputs from the two contracting parties to generate second data values corresponding to contract events, the data values comprising metadata stored on the blockchain ledger, the contract status and the contract events corresponding to a predetermined signed contract associated with a goods and commodities transaction;

storing the second data values of the contract events as metadata on the blockchain ledger;

permitting user access to the metadata of the contract events only upon validation of user-inputted credentials to create validated users, the validated users including at least the party A and the party B; and updating the second data values in response to input from at least one of the validated users to assign an event status indicator to a corresponding one of the contract events, the event status indicators including third data values corresponding to a non-executed event, an executed event, a validated event, and a non-validated event.

8. The system of claim 7, wherein the programming capable of generating the first and second data values further comprise generating data corresponding to a sale and purchase agreement; and wherein the programming capable of processing inputs for contract events further comprises programming for processing inputs corresponding to five data files having data of five corresponding contracts, the five contracts associated by suitable computer-readable indicia with a single corresponding transaction for goods and commodities, the five contracts including the sale and purchase agreement; two, party-B-charter-party agreements, and two, electronic bills of lading between the party A and at least one vessel owner.

9. The system of claim 7, wherein the programming capable of generating the second data values and updating the second data values corresponding to the contract events include the steps of generating and updating second data values corresponding to consignments, shipments, vessels, and voyages corresponding to the goods and commodities transaction.

10. The system of claim 7, wherein the programming capable of verifying the persons permitted to invoke the processing of the electronic transferable records includes programming capable of using at least one method selected from the group consisting of KYC, KYB, AML, and Bank Account Verification.

11. The system of claim 9, further comprising programming capable of implemented steps of:

(a) positively verifying permission of one of the verified users so as to define a drafting user, the drafting user being permitted to access electronic bill of lading templates stored in a secured database;

(b) permitting access to a selected one of the templates in response to first input by the drafting user;

(c) generating a draft electronic bill of lading for the respective goods and commodities transaction in response to second input; and (d) sharing the draft electronic bill of lading with one of the verified users other than the drafting user, thereby defining a negotiating user, and receiving third input from the negotiating user corresponding to modifications to the draft electronic bill of lading, the modifications being received and identified as at least one of comments, save as, and print; and (e) wherein the negotiating user comprises a carrier, the system, and in response to receiving fourth inputs from the carrier, updating status of the draft electronic bill of lading to a status of confirmed.

12. The system of claim 11, wherein the programming capable of generating the draft electronic bill of lading comprises the steps of verifying, in response to user selection, predefined electronic bill of lading draft data by associating the predefined draft data with goods and commodities transaction data separately stored; and wherein the programming capable of sharing the draft electronic bill of lading comprises the step of confirming, in response to user selection, status of the negotiating user as one of the verified users.

* * * * *